United States Patent
Kim et al.

(10) Patent No.: US 11,917,727 B2
(45) Date of Patent: *Feb. 27, 2024

(54) ELECTRONIC DEVICE FOR OPERATING A CELLULAR COMMUNICATION AND METHOD FOR THE SAME

(71) Applicant: SAMSUNG ELECTRONICS CO., LTD., Suwon-si (KR)

(72) Inventors: Junsuk Kim, Suwon-si (KR); Sangho Lee, Suwon-si (KR); Jangbok Lee, Suwon-si (KR); Wonsuk Chung, Suwon-si (KR); Sohmann Kim, Suwon-si (KR); Byunggil Lee, Suwon-si (KR); Seonmi Kim, Suwon-si (KR); Jongmin Baik, Suwon-si (KR); Kyunghoon Lee, Suwon-si (KR); Jookwan Lee, Suwon-si (KR); Suyoung Park, Suwon-si (KR); Sunmin Hwang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/937,640

(22) Filed: Oct. 3, 2022

(65) Prior Publication Data

US 2023/0039731 A1 Feb. 9, 2023

Related U.S. Application Data

(63) Continuation of application No. 16/840,066, filed on Apr. 3, 2020, now Pat. No. 11,464,076.

(30) Foreign Application Priority Data

Apr. 4, 2019 (KR) .................. 10-2019-0039794
Apr. 12, 2019 (KR) .................. 10-2019-0042940

(Continued)

(51) Int. Cl.
*H04W 76/30* (2018.01)
*H04W 76/27* (2018.01)
(Continued)

(52) U.S. Cl.
CPC .......... *H04W 88/06* (2013.01); *H04W 24/10* (2013.01); *H04W 52/0251* (2013.01);
(Continued)

(58) Field of Classification Search
CPC . H04W 88/06; H04W 24/10; H04W 52/0251; H04W 52/0274; H04W 76/27;
(Continued)

(56) References Cited

U.S. PATENT DOCUMENTS 5,546,382 A 8/1996 Fujino
9,210,625 B1 12/2015 Lovlekar et al.
(Continued)

FOREIGN PATENT DOCUMENTS

CN 101426278 A 5/2009
CN 103621149 A 3/2014
(Continued)

OTHER PUBLICATIONS

Intel corporation, "Support overheating indication for EN-DC," 3GPP TSG-RAN WG2 Meeting #101, R2-1802983, Athens, Greece, Feb. 26-Mar. 2, 2018, pp. 1-2. (Year: 2018).*
(Continued)

*Primary Examiner* — Un C Cho
*Assistant Examiner* — Lalita W Pace

(57) ABSTRACT

An electronic device includes a communication processor including a first communication circuitry, a second communication circuitry, and a temperature measurement sensor. The electronic device further includes an application processor that receives information via the second communication circuitry and determines whether to request the com-
(Continued)

munication processor change modes. The communication processor receives a signal to change modes, release an RRC connection, and control the second communication circuitry to enter a sleep state.

20 Claims, 40 Drawing Sheets

(30) Foreign Application Priority Data

| | | |
|---|---|---|
| May 14, 2019 | (KR) | 10-2019-0056395 |
| Aug. 19, 2019 | (KR) | 10-2019-0101413 |
| Mar. 3, 2020 | (KR) | 10-2020-0026806 |

(51) Int. Cl.
    *H04W 52/02*     (2009.01)
    *H04W 88/06*     (2009.01)
    *H04W 24/10*     (2009.01)

(52) U.S. Cl.
    CPC ....... *H04W 52/0274* (2013.01); *H04W 76/27* (2018.02); *H04W 76/30* (2018.02)

(58) Field of Classification Search
    CPC ............. H04W 76/30; H04W 52/0261; H04W 52/027; H04W 76/28; H04W 52/0225; H04W 76/15; H04W 76/16; H04W 76/34; Y02D 30/70
    See application file for complete search history.

(56) References Cited

U.S. PATENT DOCUMENTS

| | | | |
|---|---|---|---|
| 9,210,632 | B2 | 12/2015 | Jeong et al. |
| 10,187,091 | B2 | 1/2019 | Kim et al. |
| 10,750,413 | B1 | 8/2020 | Raghunathan et al. |
| 11,019,548 | B2 | 5/2021 | Kim et al. |
| 11,177,681 | B2 | 11/2021 | Kim et al. |
| 11,464,076 | B2 * | 10/2022 | Kim ............... H04W 76/27 |
| 2008/0253312 | A1 | 10/2008 | Park |
| 2011/0208984 | A1 | 8/2011 | Naware et al. |
| 2011/0243002 | A1 | 10/2011 | Tsuruoka |
| 2012/0281558 | A1 | 11/2012 | Anderson et al. |
| 2013/0121172 | A1 | 5/2013 | Cheng et al. |
| 2013/0210481 | A1 | 8/2013 | Sane |
| 2013/0329637 | A1 | 12/2013 | Kodali et al. |
| 2013/0332720 | A1 | 12/2013 | Gupta et al. |
| 2014/0235242 | A1 | 8/2014 | Granzow et al. |
| 2015/0245186 | A1 | 8/2015 | Park et al. |
| 2015/0264602 | A1 | 9/2015 | Hageltorn et al. |
| 2015/0349836 | A1 | 12/2015 | Ponukumati et al. |
| 2016/0242191 | A1 | 8/2016 | Liao et al. |
| 2017/0070894 | A1 | 3/2017 | Kumar et al. |
| 2017/0086119 | A1 | 3/2017 | Xu et al. |
| 2017/0099204 | A1 | 4/2017 | Park et al. |
| 2017/0353898 | A1 | 12/2017 | Karakkad Kesavan Namboodiri et al. |
| 2018/0014341 | A1 | 1/2018 | Jung |
| 2018/0270809 | A1 | 9/2018 | Park et al. |
| 2018/0278099 | A1 | 9/2018 | Hong et al. |
| 2019/0028916 | A1 | 1/2019 | Kashyap et al. |
| 2019/0041926 | A1 | 2/2019 | Guy et al. |
| 2019/0059051 | A1 | 2/2019 | Astrom et al. |
| 2019/0082363 | A1 | 3/2019 | Park et al. |
| 2019/0357275 | A1 | 11/2019 | Tsai et al. |
| 2019/0364492 | A1 | 11/2019 | Azizi et al. |
| 2020/0029237 | A1 | 1/2020 | Kim et al. |
| 2020/0100181 | A1 | 3/2020 | Jia et al. |
| 2020/0120708 | A1 | 4/2020 | Liu et al. |
| 2020/0163131 | A1 | 5/2020 | Youtz et al. |
| 2020/0275526 | A1 | 8/2020 | Sharma et al. |
| 2020/0351638 | A1 | 11/2020 | Kim et al. |
| 2020/0351771 | A1 | 11/2020 | Geekie et al. |
| 2020/0351791 | A1 | 11/2020 | Stauffer et al. |
| 2020/0351792 | A1 | 11/2020 | Ghelichi et al. |
| 2020/0383046 | A1 | 12/2020 | Nayak et al. |
| 2021/0029643 | A1 | 1/2021 | Stauffer et al. |

FOREIGN PATENT DOCUMENTS

| | | |
|---|---|---|
| CN | 104335178 A | 2/2015 |
| CN | 108029066 A | 5/2018 |
| CN | 108139785 A | 6/2018 |
| EP | 3867996 A1 | 8/2021 |
| KR | 10-1593269 B1 | 2/2016 |
| KR | 10-2018-0010381 A | 1/2018 |
| WO | 2015/0126198 A1 | 8/2015 |
| WO | 2018/125686 A2 | 7/2018 |
| WO | 2019103527 A1 | 5/2019 |
| WO | 2020085866 A1 | 4/2020 |

OTHER PUBLICATIONS

3GPP TS 36.300 V14.8.0, 3rd Generation 3rd Generation Partnership Project; Technical Specification Group Radio Access Network; Evolved Universal Terrestrial Radio Access (E-UTRA) and E-UTRAN; Overall description; Stage 2 (Release 14); Sep. 2018 pp. 1-331 (Year: 2018).

Apple Inc., "UE overheating for EN-DC," 3GPP TSG-RAN WG2 Meeting #101, R2-1802414, Athens, Greece, Feb. 26-Mar. 2, 2018, pp. 1-3 (Year: 2018).

Qualcomm Incorporated, "Clarification on LTE Overheating mechanism in EN-DC," 3GPP TSG-RAN WG2 Meeting #102, R2-1806679, Busan, Korea, May 21-25, 2018, pp. 1-6 (Year: 2018).

Apple Inc., "UE overheating for EN-DC," 3GPP TSG-RAN WG2 Meeting #101, R2-1802415, Athens, Greece, Feb. 26-Mar. 2, 2018, pp. 1-10 (Year: 2018).

China National Intellectual Property Office, "The Second Office Action," dated Jun. 10, 2022, in connection with Chinese Patent Application No. 202010258134.9, 17 pages.

European Patent Office, "Supplementary European Search Report," dated May 4, 2022, in connection with European Patent Application No. 21213815.0, 9 pages.

European Search Report dated Aug. 7, 2020 in connection with European Patent Application No. 20 16 8022, 7 pages.

International Search Report dated Jul. 6, 2020 in connection with International Patent Application No. PCT/KR2020/004370, 3 pages.

Written Opinion of the International Searching Authority dated Jul. 6, 2020 in connection with International Patent Application No. PCT/KR2020/004370, 7 pages.

IP Australia, "Examination Report No. 1 for Standard Patent Application," dated Nov. 28, 2022, in connection with Australian Patent Application No. 2022200411, 3 pages.

European Patent Office, "Supplementary European Search Report," dated Nov. 25, 2022, in connection with European Patent Application No. 21213815.0, 5 pages.

Summons to Attend Oral Proceedings dated Dec. 13, 2023, in connection with European Patent Application No. 21213815.0, 5 pages.

\* cited by examiner

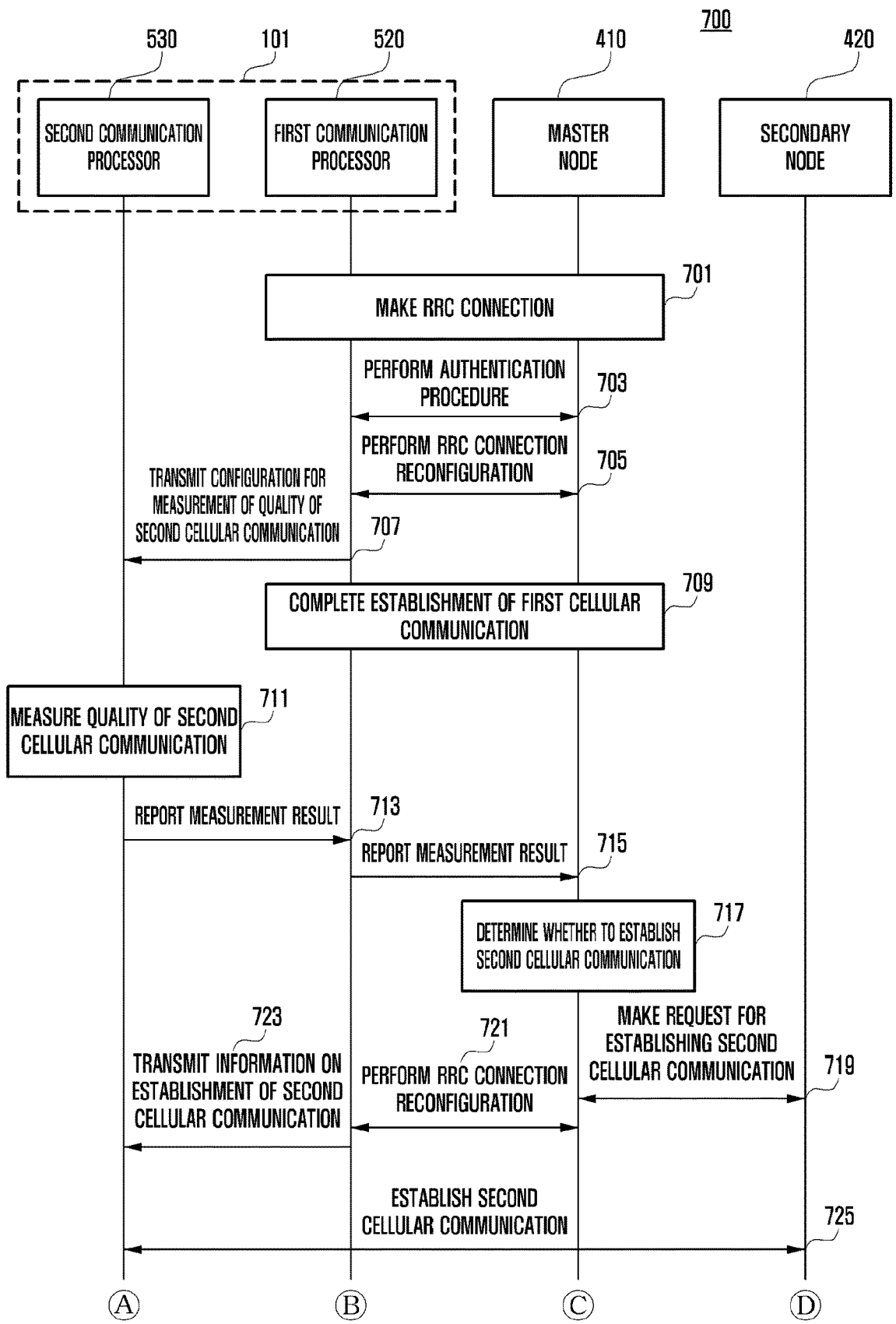

ELECTRONIC DEVICE FOR OPERATING A CELLULAR COMMUNICATION AND METHOD FOR THE SAME

CROSS-REFERENCE TO RELATED APPLICATIONS

This application is a continuation of application Ser. No. 16/840,066, now U.S. Pat. No. 11,464,076 issued Oct. 4, 2022, which is based on and claims priority under 35 U.S.C. 119 to Korean Patent Application No. 10-2019-0039794 filed on Apr. 4, 2019, Korean Patent Application No. 10-2019-0042940 filed on Apr. 12, 2019, Korean Patent Application No. 10-2019-0056395 filed on May 14, 2019. Korean Patent Application No. 10-2019-0101413 filed on Aug. 19, 2019, and Korean Patent Application No. 10-2020-0026806 filed on Mar. 3, 2020 in the Korean Intellectual Property Office, the disclosures of which are herein incorporated by reference in their entirety.

BACKGROUND

1. Field

The disclosure relates to an electronic device and a method of operating an electronic device and, more particularly, to a technology for reporting a communication quality measurement result.

2. Description of Related Art

As various electronic devices such as smart phones, tablet personal computers (PCs), portable multimedia players (PMPs), personal digital assistants (PDAs), laptop PCs, and wearable devices are distributed, various wireless communication technologies used for communication by various electronic devices are being developed.

In order to meet wireless data traffic demands that have increased after $4^{th}$ Generation (4G) communication system commercialization, efforts to develop an improved $4^{th}$ Generation (5G) communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance.

The above information is presented as background information only to assist with an understanding of the disclosure. No determination has been made, and no assertion is made, as to whether any of the above might be applicable as prior art with regard to the disclosure.

SUMMARY

A frequency band supported by 5G may be higher than that of the conventional communication schemes. When an electronic device uses a 5G frequency band, power consumption may increase in comparison with conventional communication schemes.

As power consumption increases, the operating temperature of the electronic device may increase as well. Due to the increased temperature of the electronic device and the increased power consumption, the use time or battery life of the electronic device may degrade. Further, if the temperature of the electronic device becomes excessive, internal components of the electronic device may be damaged. Similarly, higher power consumption may result as the threshold voltage for operating the internal components of the device increases.

A communication scheme supporting both $4^{th}$-generation communication and a 5th-generation communication may use a base station supporting the $4^{th}$-generation communication as a master node, and use a base station supporting the $5^{th}$-generation communication as a secondary node.

When an operation for data transmission or reception through the 5th-generation communication is not generated, an electronic device supporting both the $4^{th}$-generation communication and the $5^{th}$-generation communication may switch a communication processor supporting the $5^{th}$-generation communication to a sleep state, thereby reducing power consumption. In order to switch the communication processor supporting the $5^{th}$-generation communication to the sleep state, establishment of the $5^{th}$-generation communication may be released. The master node may transmit a signal indicating release of establishment of the $5^{th}$-generation communication in order to release the establishment of the $5^{th}$-generation communication. The master node may simultaneously transmit the signal indicating the release and a signal indicating measurement of a quality of the 5th-generation communication. According to an embodiment, when all of the two signals are received, the electronic device may transmit a measurement result of the quality of the $5^{th}$-generation communication to the master node while the establishment of the $5^{th}$-generation communication is released. After receiving the result of the quality of the $5^{th}$-generation communication, the master node may establish the $5^{th}$-generation communication again, so that the release and re-establishment of the $5^{th}$-generation communication may be repeated. Due to repetition of the establishment and the release of the $5^{th}$-generation communication, power consumption of the electronic device may increase.

In accordance with an aspect of the disclosure, an electronic device is provided. The electronic device includes: a first communication processor configured to support a first cellular communication connection with a first network, and a second communication processor configured to support a second cellular communication connection with a second network, a temperature measurement sensor configured to measure a temperature of at least one of the first communication processor or the second communication processor, an application processor, and a memory. The memory stores instructions that, when executed by at least one of the application processor or the second communication processor, cause the at least one of the application processor or the second communication processor to receive, by the application processor, information related to the temperature from the temperature measurement sensor or information related to data transmitted or received via the second cellular communication from the second communication processor, determine, by the application processor, to enter a low power mode based on the temperature or the data satisfying at least one of dedicated conditions, receive, by the second communication processor, a signal indicating to enter the low power mode from the application processor, wherein the second communication processor is in a RRC (radio resource control) connected state being capable of data transmission through at least one of the first network or the second network, in response to entering the lower power mode, release, by the second communication processor, an RRC connection between the electronic device and the second network, and control, by the application processor, the second communication processor to enter a sleep state after releasing the RRC connection.

In accordance with another aspect of the disclosure, an electronic device is provided. The electronic device includes a first communication processor configured to support a first cellular communication with a first network, a second communication processor configured to support a second cellular communication with a second network, a temperature measurement sensor configured to measure a temperature of at least one of the first communication processor or the second communication processor, an application processor, a memory. The memory stores instructions that, when executed by at least one of the application processor or the second communication processor, cause the at least one of the application processor or the second communication processor to receive, by the application processor, information related to the temperature from the temperature measurement sensor or information related to data transmitted or received via the second cellular communication from the second communication processor, determine, by the application processor, to enter a low power mode based on the temperature or the data satisfying at least one of dedicated conditions, receive, by the second communication processor, a signal indicating to enter the low power mode from the application processor, wherein the second communication processor is in a RRC (radio resource control) release state not being capable of data transmission through the second network, in response to entering the lower power mode, ignore, by the second communication processor, a signal indicating at least one measurement associated with the second network, and control, by the application processor, the second communication processor to enter a sleep state or maintain the sleep state.

In accordance with another aspect of the disclosure, an electronic device is provided. The electronic device includes a first communication processor configured to perform first cellular communication with a first node, a second communication processor configured to perform second cellular communication with a second node, a temperature measurement sensor configured to measure a temperature of at least one of the first communication processor or the second communication processor, an application processor, and a memory. The memory stores instructions that, when executed by at least one of the application processor or the second communication processor, cause the at least one of the application processor or the second communication processor to receive, by the application processor, information related to the temperature from the temperature measurement sensor, determine, by the application processor, to enter a low power mode based on the temperature satisfies at least one of dedicated conditions, receive, by the second communication processor, a signal indicating to enter a lower power mode from the application processor, in response to entering the lower power mode, perform, by the second communication processor, at least one operation for releasing RRC connection between the electronic device and the second node or maintaining RRC released connection state, and control, by the application processor, the second communication processor to enter a sleep state of the second communication processor.

Through the electronic device according to certain embodiments of the disclosure, it is possible to prevent repetition of release and re-establishment of second cellular communication by preventing a measurement result of the quality of the second cellular communication from being directly transmitted to a master node but transmitting the measurement result of the quality of the second cellular communication when a preset condition is satisfied.

Through the electronic device according to certain embodiments of the disclosure, it is possible to prevent repetition of release and re-establishment of second cellular communication by preventing the quality of the second cellular communication from being directly measured but measuring the quality of the second cellular communication when a preset condition is satisfied.

Through the electronic device according to certain embodiments of the disclosure, it is possible to prevent repetition of release and re-establishment of second cellular communication since the master node determines to establish the second cellular communication when a preset condition is satisfied even though the master node receives the measurement result of the quality of the second cellular communication.

Through the electronic device according to certain embodiments of the disclosure, it is possible to reduce power consumption due to repetition of release and re-establishment of second cellular communication by preventing the repetition.

Through the electronic device according to certain embodiments of the disclosure, it is possible to reduce power consumption generated due to the use of second cellular communication by maintaining the release of the second cellular communication when there is no data transmission or reception through the second cellular communication.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM) a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7A is a flowchart illustrating release and re-establishment of second cellular communication in an electronic device according to another embodiment of the disclosure.

DETAILED DESCRIPTION

FIGS. 1 through 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
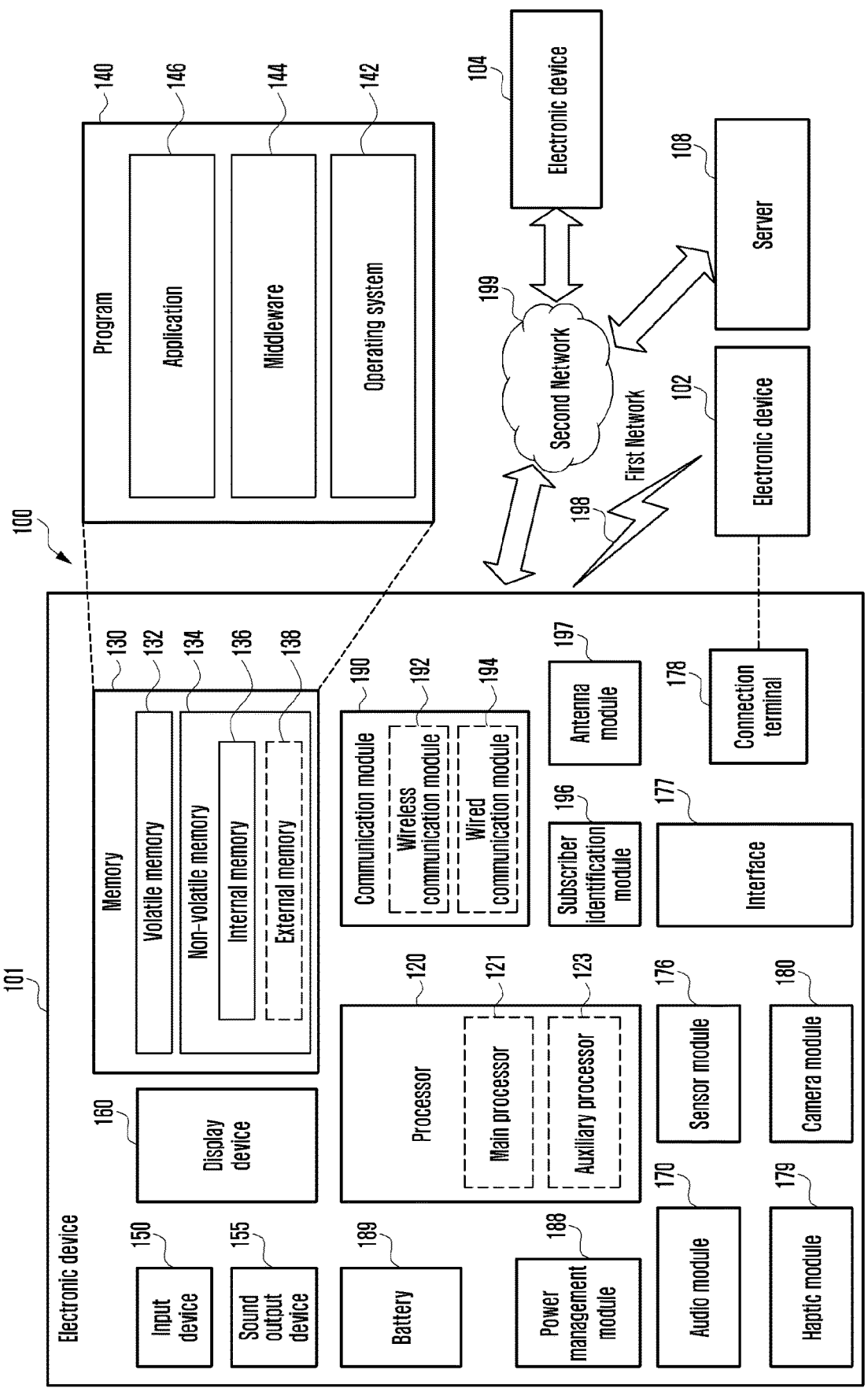
FIG. 1 is a block diagram of an electronic device according to certain embodiments of the disclosure.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RTIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
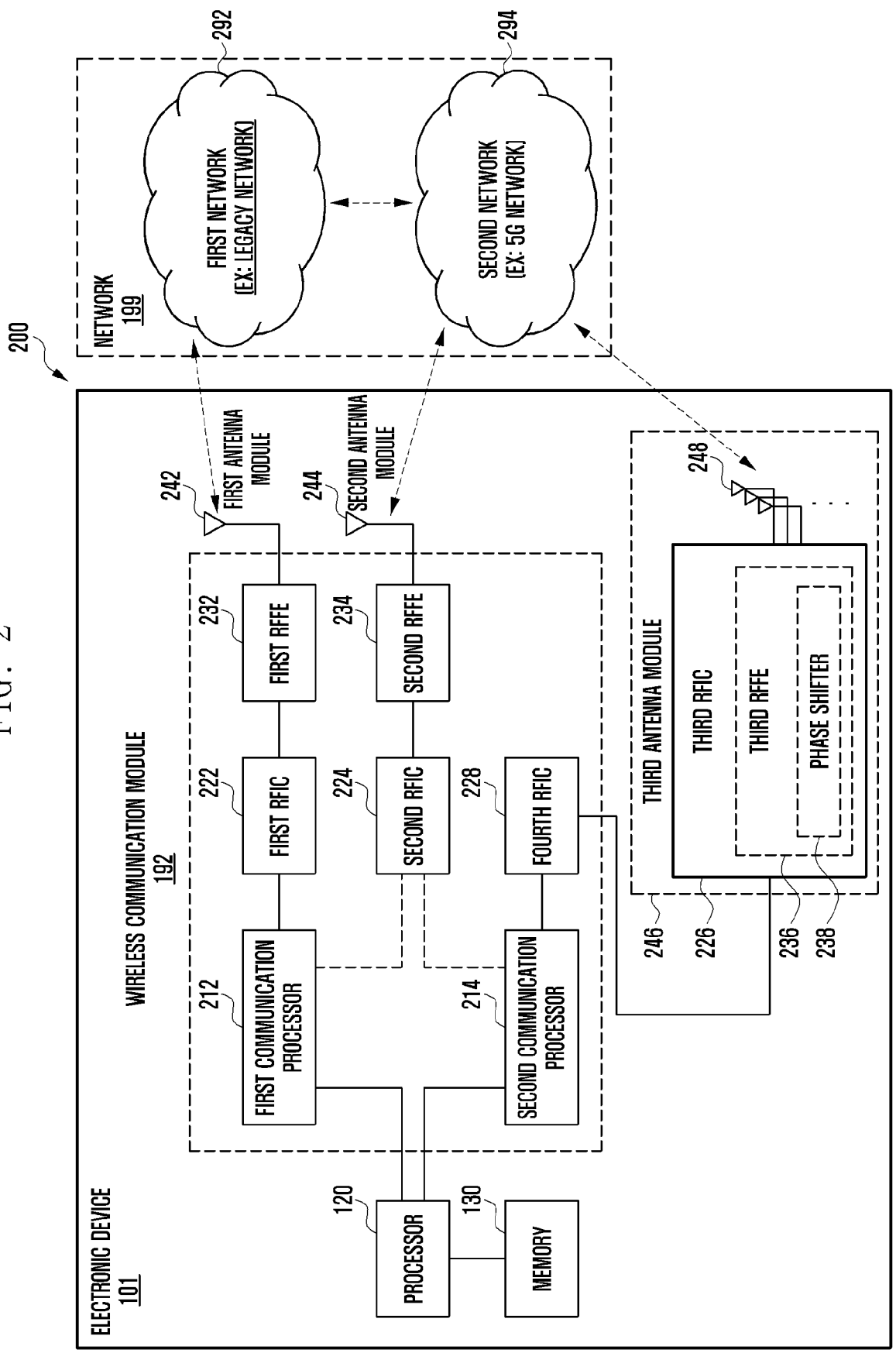
FIG. 2 is a block diagram illustrating an electronic device for supporting legacy network communication and 5G network communication according to certain embodiments.

FIG. 2 is a block diagram 200 of an electronic device 101 for supporting legacy network communication and 5G network communication according to certain embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first network 292 and a second network 294. According to another embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be included as at least a part of the wireless communication module 192. According to another embodiment, the fourth RFIC 228 may be omitted or may be included as a part of the third RFIC 226.

The first communication processor 212 may establish a communication channel of a band to be used for wireless communication with the first network 292, and may support legacy network communication via the established communication channel. According to certain embodiments, the first network may be a legacy network including 2G, 3G, 4G, or long term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established channel. According to certain embodiments, the second network 294 may be a 5G network defined in 3GPP. Additionally, according to an embodiment, the first communication processor 212 or the second communication processor 214 may establish a communication channel corresponding to another designated band (e.g., lower than 6 GHz) among bands to be used for wireless communication with the second network 294, and may support 5G network communication via the established channel. According to an embodiment, the first communication processor 212 and the second communication processor 214 may be implemented as first communication circuitry and second communication circuitry in a single chip or a single package. According to certain embodiments, the first communication processor 212 or the second communication processor 214 may be implemented in a single chip or a single package, together with the processor 120, the sub-processor 123, or the communication module 190.

According to an embodiment, the first communication processor 212 may transmit and receive data to and from the second communication processor 214. For example, data classified as data to be transmitted through the second cellular network 294 may be changed to be transmitted through the first cellular network 292.

In this case, the first communication processor 212 may receive transmission data from the second communication processor 214. For example, the first communication processor 212 may transmit and receive data to and from the second communication processor 214 through an interface between processors. The interface 213 between processors may be implemented as, for example, a universal asynchronous receiver/transmitter (UART) (for example, a high speed-UART (HS-UART) or a peripheral component interconnect bus express (PCIe) interface), but there is no limitation on the type thereof. Alternatively, the first communication processor 212 and the second communication processor 214 may exchange control information and packet data information through, for example, a shared memory. The first communication processor 212 may transmit and receive various pieces of information such as sensing information, information on an output intensity, and resource block (RB) allocation information to and from the second communication processor 214.

According to implementation, the first communication processor 212 may not be directly connected to the second communication processor 214. In this case, the first communication processor 212 may transmit and receive data to and from the second communication processor 214 through the processor 120 (for example, an application processor).

For example, the first communication processor 212 and the second communication processor 214 may transmit and receive data to and from the processor 120 (for example, an application processor) through an HS-UART interface or a PCIe interface, but there is no limitation on the type thereof. Alternatively, the first communication processor 212 and the second communication processor 214 may exchange control information and packet data information with the processor 120 (for example, an application processor) through a shared memory. According to an embodiment, the first communication processor 212 and the second communication processor 214 may be implemented as first communication circuitry and second communication circuitry within a single chip or a single package. According to various embodiments, the first communication processor 212 or the second communication processor 214 may be constructed with the processor 120, the auxiliary processor 123, or the communication module 190 within a single chip or a single package. For example, as illustrated in FIG. 2B, the integrated communication processor 260 may support all functions for communication with the first cellular network and the second cellular network.

In the case of transmission, the first RFIC 222 may convert a baseband signal generated by the first communication processor 212 into a radio frequency (RF) signal in a range of approximately 700 MHz to 3 GHz used for the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the base band signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHz) used for the second network 294 (e.g., 5G network). In the case of reception, a 5G Sub6 RF signal is obtained from the second network 294 (e.g., a 5G network) via an antenna (e.g., the second antenna module 244), and may preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second network 294 (e.g., 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal to a baseband signal so that the base band signal is processed by the second communication processor 214. According to an embodiment, the third RFFE 236 may be implemented as a part of the third RFIC 226.

According to an embodiment, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal to a 5G Above6 RF signal. In the case of reception, a 5G Above6 RF signal is received from the second network 294 (e.g., a 5G network) via an antenna (e.g., the antenna 248), and may be converted into an IF signal by the third RFFE 226. The fourth RFIC 228 may convert the IF signal to a baseband signal so that the base band signal is processed by the second communication processor 214.

According to an embodiment, the first RFIC 222 and the second RFIC 224 may be implemented as a single chip or at least a part of the single package. According to an embodiment, the first RFFE 232 and the second RFFE 234 may be implemented as a single chip or at least a part of the single package. According to an embodiment, at least one antenna module of the first antenna module 242 or the second antenna module 244 may be omitted, or may be combined with another antenna module so as to process RF signals in a plurality of bands.

According to an embodiment, the third RFIC 226 and the antenna 248 may be disposed in the same substrate, and may form the third antenna module 246. For example, the wireless communication module 192 or the processor 120 may be disposed in a first substrate (e.g., main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHz) used for 5G network communication, the loss being caused by a transmission line. Accordingly, the electronic device 101 may improve the quality or speed of communication with the second network 294 (e.g., 5G network).

According to an embodiment, the antenna 248 may be implemented as an antenna array including a plurality of antenna elements which may be used for beamforming. In this instance, the third MC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission or reception via beamforming between the electronic device 101 and the outside.

The second network 294 (e.g., 5G network) may operate independently (e.g., Stand-Along (SA)) from the first network 292 (e.g., a legacy network), or may operate by being connected thereto (e.g., Non-Stand Alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230, and may be accessed by another component (e.g., the processor 120, the first communication processor 212, or the second communication processor 214).

Figure 3:
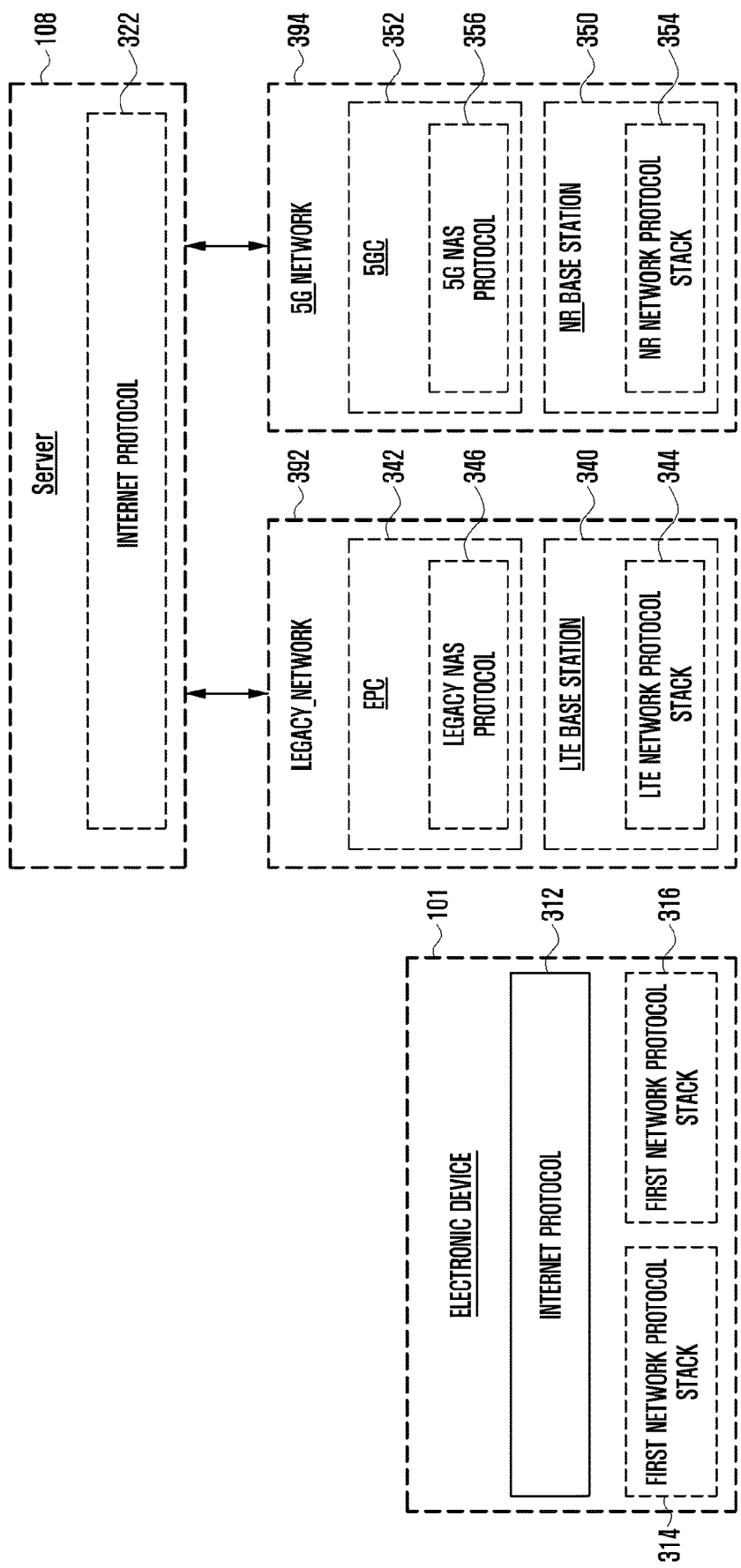
FIG. 3 illustrates a protocol stack structure of the network 100 of legacy communication and/or 5G communication according to an embodiment.

FIG. 3 illustrates a protocol stack structure of the network 100 of legacy communication and/or 5G communication according to an embodiment.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment, the electronic device 101 may perform Internet communication associated with the server 108 through the Internet protocol 312 (for example, a TCP, a UDP, or an IP). The Internet protocol 312 may be executed by, for example, a main processor (for example, the main processor 121 of FIG. 1) included in the electronic device 101.

According to another embodiment, the electronic device 101 may perform wireless communication with the legacy network 392 through the first communication protocol stack 314. According to another embodiment, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to another embodiment, the server 108 may include an edge computing server (or a mobile edge computing NEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment, the control plane protocol and the user plane protocol may include a physical (PHY) layer, a medium access control (MAC) layer, a radio link control (RIX) layer, or a packet data convergence protocol (PDCP) layer. The PRY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARQ) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4A:
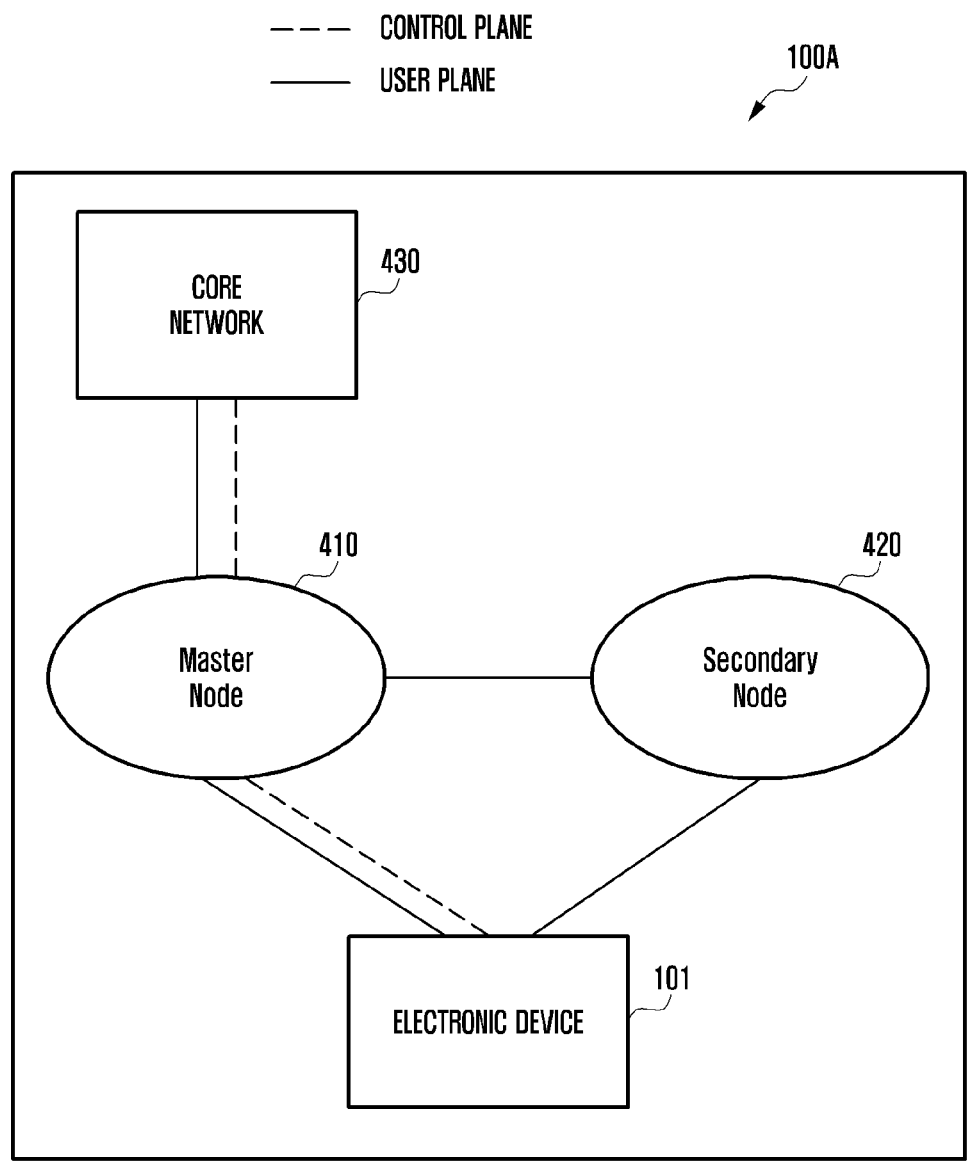
FIG. 4A illustrates a wireless communication system providing a network of legacy communication and/or 5G communication according to certain embodiments.
Figure 4B:
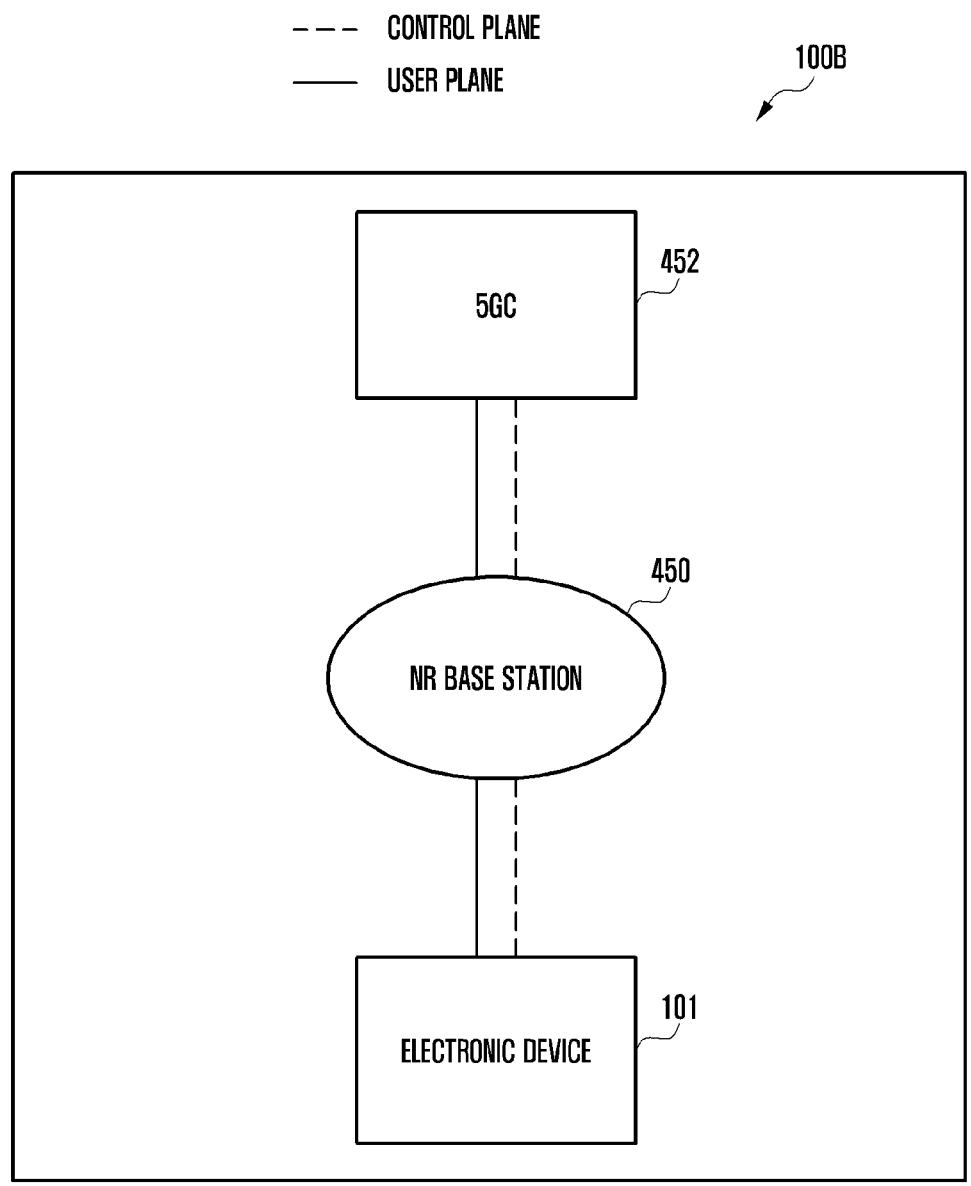
FIG. 4B illustrates a wireless communication system providing a network of legacy communication and/or 5G communication according to certain embodiments.
Figure 4C:
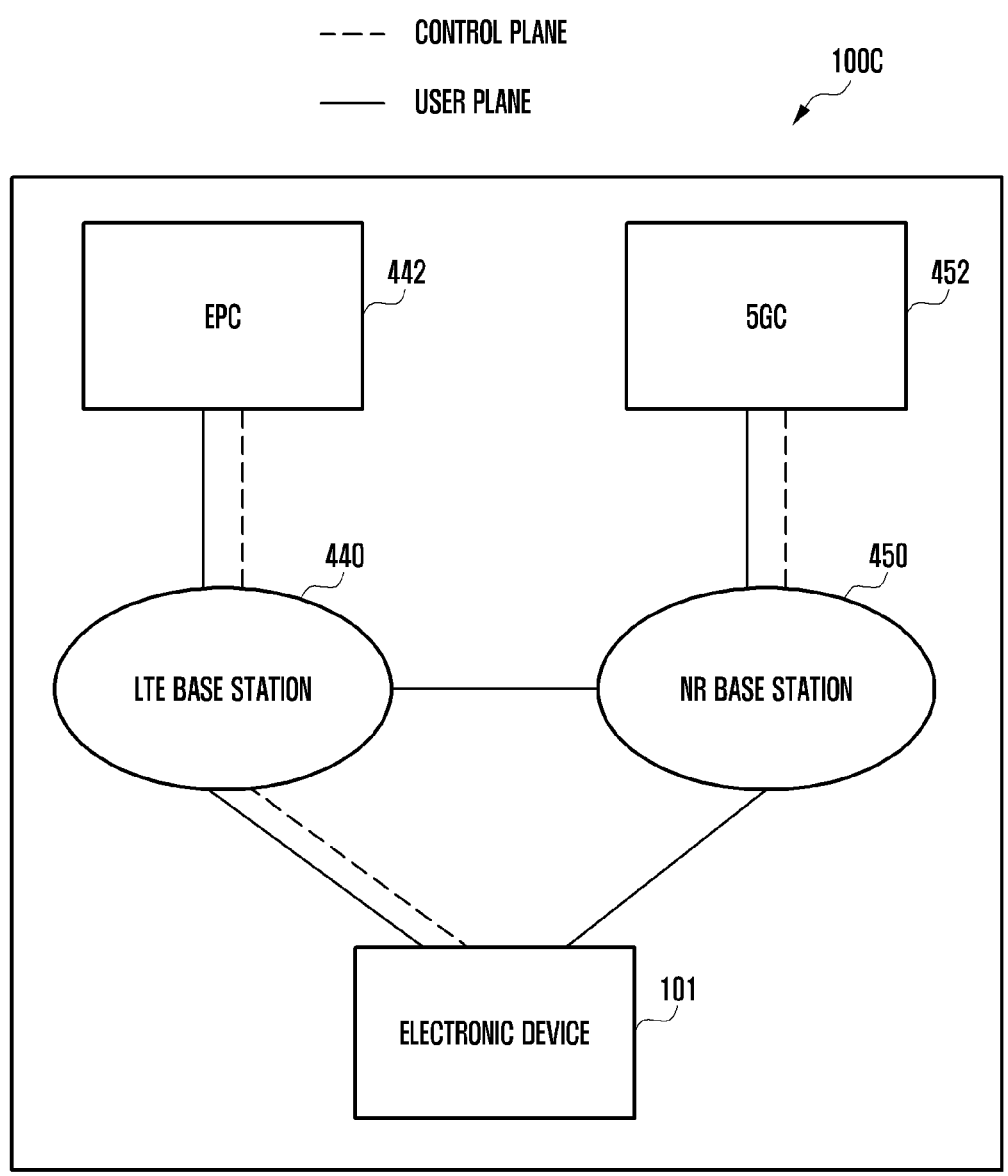
FIG. 4C illustrates a wireless communication system providing a network of legacy communication and/or 5G communication according to certain embodiments.

FIG. 4A illustrates a wireless communication system providing a network of legacy communication and/or 5G communication according to certain embodiments, FIG. 4B illustrates a wireless communication system providing a network of legacy communication and/or 5G communication according to certain embodiments, and FIG. 4C illustrates a wireless communication system providing a network of legacy communication and/or 5G communication according to certain embodiments. Referring to FIGS. 4A to 4C, network environments 100A to 100C may include at least one of a legacy network and a 5G network. The legacy network may include, for example, a 4G or LTE eNB 450 (for example, an eNodeB (eNB)) of the 3GPP standard supporting radio access with the electronic device 101 and an evolved packet core (EPC) 451 for managing 4G communication. The 5G network may include, for example, a new radio (NR) gNB 450 (for example, a gNodeB (gNB)) supporting radio access with the electronic device 101 and a 5$^{th}$ generation core (5GC) 452 for managing 5G communication of the electronic device 101.

According to certain embodiments, the electronic device 101 may transmit and receive a control message and user data through legacy communication and/or 5G communication. The control message may include, for example, a control message related to at least one of security control of the electronic device 101, bearer setup, authentication, registration, or mobility management. The user data may be, for example, user data other than a control message transmitted and received between the electronic device 101 and a core network 430 (for example, the EPC 442).

Referring to FIG. 4A, the electronic device 101 according to an embodiment may transmit and receive at least one of a control message or user data to and from at least some of the 5G network (for example, the NR gNB 450 and the 5GC 452) using at least some of the legacy network (for example, the LTE eNB 440 and the EPC 442).

According to certain embodiments, the network environment 100A may include a network environment for providing wireless communication dual connectivity (multi-radio access technology (RAT) dual connectivity (MR-DC)) to the LTE eNB 440 and the NR gNB 450 and transmitting and receiving a control message to and from the electronic device 101 through one core network 430 of the EPC 442 or the 5GC 452.

According to certain embodiments, one of the MR-DC environment, the LTE eNB 440 or the NR gNB 450 may operate as a master node (MN) 410, and the other may operate as a secondary node (SN) 420. The MN 410 may be connected to the core network 430 and transmit and receive a control message. The MN 410 and the SN 420 may be connected to each other through a network interface and transmit and receive a message related to radio resource (for example, communication channel) management.

According to certain embodiments, the MN 410 may include the LTE eNB 440, the SN 420 may include the NR gNB 450, and the core network 430 may include the EPC 442. For example, a control message may be transmitted and received through the LTE eNB 440 and the EPC 442, and user data may be transmitted and received through the LTE eNB 440 and the NR gNB 450.

Referring to FIG. 4B, according to certain embodiments, the 5G network may independently transmit and receive a control message and user data to and from the electronic device 101.

Referring to FIG. 4C, the legacy network and the 5G network according to certain embodiments may independently provide data transmission and reception. For example, the electronic device 101 and the EPC 442 may transmit and receive a control message and user data through the LTE eNB 450. According to another embodiment, the electronic device 101 and the 5GC 452 may transmit and receive a control message and user data through the NR gNB 450.

According to certain embodiments, the electronic device 101 may be registered in at least one of the EPC 442 or the 5GC 450 and transmit and receive a control message.

According to certain embodiments, the EPC 442 or the 5GC 452 may interwork and manage communication of the electronic device 101. For example, movement information of the electronic device 101 may be transmitted and received through an interface between the EPC 442 and the 5GC 452.

Figure 5:
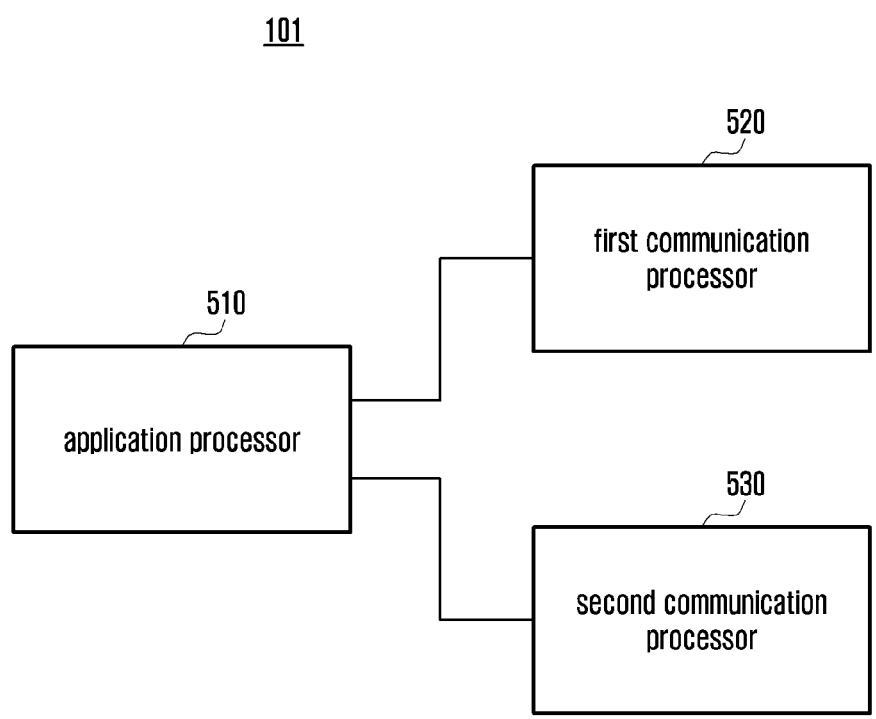
FIG. 5 is a block diagram of an electronic device according to certain embodiments of the disclosure.

FIG. 5 is a block diagram of an electronic device according to certain embodiments of the disclosure.

Referring to FIG. 5, an electronic device 500 (for example, the electronic device 101 of FIG. 1) according to certain embodiments of the disclosure may include an application processor 510 (for example, the processor 120 of FIG. 1), a first communication processor 520 (for example, the first communication processor 212 of FIG. 2), and a second communication processor 530 (for example, the second communication processor 214 of FIG. 2).

According to certain embodiments of the disclosure, the application processor 510 may be electrically connected to the first communication processor 520 and the second communication processor 530. The application processor 510 may transmit or receive data to and from an external electronic device (not shown) through the first communication processor 520 or the second communication processor 530. The application processor 510 may control various applications installed in the electronic device 101 on the basis of transmitted or received data. According to an embodiment, the first communication processor 520 and the second communication processor 520 may be implemented as first communication circuitry and second communication circuitry within a single chip or a single package.

According to certain embodiments of the disclosure, the first communication processor 520 may perform first cellular communication with a first node (for example, the master node 410 of FIG. 4A). The first communication processor 520 may transmit or receive a control message and data to and from the first node 410 while performing the first cellular communication. The first cellular communication may be one of various cellular communication schemes supported by the electronic device 101. For example, the first cellular communication may be one of $4^{th}$ generation mobile communication schemes, such as for example, long-term evolution (LTE), LTE-advanced (LTE-A), and LTE-advanced pro (LTE-A pro) and may correspond to, for example, a communication scheme on the first cellular network of FIG. 2 (e.g., a 4G network). The first node 410 may be a base station supporting first cellular communication.

According to certain embodiments of the disclosure, the second communication processor 530 may perform second cellular communication with a second node (for example, the secondary node 420 of FIG. 4A). The second communication processor 530 may transmit or receive data to or from the second node 420 through second cellular communication. The second cellular communication may be one of various cellular communication schemes supported by the electronic device 101 and may correspond to a communication scheme on the second cellular network 294 of FIG. 2. For example, the second cellular communication may be one of $5^{th}$ generation mobile communication schemes (e.g., a 5G network). The second node 420 may be a base station supporting second cellular communication.

According to certain embodiments of the disclosure, an E-UTRAN-NR dual connectivity (EN-DC) environment in which the first cellular communication is a $4^{th}$ generation mobile communication scheme and the second cellular communication is a $5^{th}$ generation mobile communication scheme is mainly described, but the disclosure is not limited thereto. For example, certain embodiments of the disclosure may be applied to an NR-E-UTRAN dual connectivity (NE-DC) environment in which the first cellular communication is a $5^{th}$ generation mobile communication scheme and the second cellular communication is a $4^{th}$ generation mobile communication scheme and an environment in which both the first cellular communication scheme and the second cellular communication scheme are a $5^{th}$ generation mobile communication scheme but they support different frequency bands.

According to certain embodiments of the disclosure, the application processor 510 may transmit or receive data through the first cellular communication or the second cellular communication by controlling the first communication processor 520 and the second communication processor 530.

According to certain embodiments of the disclosure, the electronic device 101 may release the connection of the second cellular communication in the state in which both the first cellular communication and the second cellular communication are established. For example, if there is no data transmitted or received using the second cellular communication or the second cellular communication cannot be used in a communication service used by the electronic device 101, the electronic device 101 may release the connection of the second cellular communication on the basis of the control of at least one of the first node 410 or the second node 420. As the second node 420 providing the second cellular communication identifies that there is no transmission or reception of data through the second cellular communication for a preset time or longer, the second node 420 may activate a tinier for releasing the second cellular communication with the electronic device 101. As the second node 420 identifies that the electronic device 101 has no transmission or reception of data using the second cellular communication for a time set to the activated timer, the second node 420 may transmit a signal indicating release of the second cellular communication to the electronic device 101 via the first node 410. As the electronic device 101 receives the signal indicating the release of the second cellular communication transmitted by the second node 420, the electronic device 101 may release the establishment of the second cellular communication. According to an embodiment, the first node 410 may transmit together the signal indicating the release of the second cellular communication and a signal indicating measurement of a quality of the second cellular communication.

According to certain embodiments of the disclosure, the signal indicating the release of establishment of the second cellular communication and the configuration of measurement of the communication quality may be included in a RRC connection reconfiguration signal. The RRC connection reconfiguration signal may further include configuration data related to a configuration of a radio bearer of the first cellular communication, configuration data related to measurement and a result report, and configuration data related to paging or mobility management. According to an embodiment, the RRC connection reconfiguration signal may further include configuration data related to measurement of the second cellular communication and a result report thereon, configuration data related to the configuration of the radio bearer, or configuration data related to mobility management. The first communication processor 520 may receive the RRC connection reconfiguration signal and transmit the signal making a request for releasing establishment of the second cellular communication to the second communication processor 530 on the basis of the RRC connection reconfiguration signal. The second communication processor 530 may release establishment of the second cellular communication on the basis of the RRC connection reconfiguration signal. After the release of establishment of the second cellular communication is completed, the first communication processor 520 may transmit or receive data through the first cellular communication.

According to certain embodiments of the disclosure, the configuration for measurement of the communication quality may include a configuration for measurement of a quality of communication with a second cellular base station for the connection with the second cellular base station (for example, a configuration including a quality reference of communication with the second cellular base station to be included in a report transmitted to the first node for the connection with the second cellular base station (B1 event configuration)) (hereinafter, referred to as a measurement configuration). The terminal may consider the signal including the configuration for measurement of the communication quality as a signal making a request for measuring the quality of the second cellular communication. Upon receiving the signal making a request for measuring the quality of the second cellular communication, the first communication processor 520 may allow the second communication processor 530 to measure the quality of the second cellular communication. For example, the received signal may be transmitted to the second communication processor 530.

According to certain embodiments of the disclosure, the second communication processor 530 may measure the quality of the second cellular communication according to reception of the configuration for measurement of the communication quality. The second communication processor 530 may transmit the result of measurement of the quality of the second cellular communication to the first communication processor 520.

According to certain embodiments of the disclosure, the first communication processor 520 may transmit the result of the measurement of the quality of the second cellular communication, received from the second communication processor 530, to the first node 410. The first node 410 may determine whether to establish the second cellular communication between the second node 420 and the electronic device 101 on the basis of the result of the measurement of the quality of the second cellular communication.

According to certain embodiments of the disclosure, the second communication processor 530 may transmit the result of the measurement of the quality of the second cellular communication to the second node 420. The second node 420 may transfer the result of the quality of the second cellular communication to the first node 410. The first node 410 may determine whether to establish the second cellular communication between the second node 420 and the electronic device 101 on the basis of the result of the measurement of the quality of the second cellular communication.

If there is no transmission or reception of data through the second cellular communication for a preset time or longer, the second node 420 may determine to release establishment of the second cellular communication and transmit a release signal of the second cellular communication to the first node 410. If the first communication processor 520 receives together the release signal of the second cellular communication and the configuration for the measurement of the communication quality, the first communication processor 520 may transmit the received signal to the second communication processor 530 and the second communication processor 530 may measure the quality of the second cellular communication. The result of the measurement of the quality of the second cellular communication may include a measurement result indicating a quality with which the second cellular communication can be established. If the result of the measurement of the quality of the second cellular communication includes the measurement result indicating the quality with which the second cellular communication can be established, the first node 410 may determine to establish the second cellular communication between the second node 420 and the electronic device 101. In a comparative example, if the result of the measurement of the quality of the second cellular communication includes the measurement result indicating the quality with which the second cellular communication can be established in the state in which there is no transmission or reception of data through the second cellular communication, the second cellular communication may be unnecessarily established between the electronic device 101 and the second node 420. Further, if the state in which the electronic device 101 has no data transmission or reception through the second cellular communication is maintained, the release of the second cellular communication may occur again. For example, switching between the state in which the second cellular communication is established and the state in which the second cellular communication is released may be repeated. Although there is no data transmission or reception through the second cellular communication, the electronic device 101 may perform the operation for establishing or releasing the second cellular communication, and power consumption of the electronic device 101 may increase. Hereinafter, a method of preventing the second cellular communication from being unnecessarily established will be described.

According to certain embodiments of the disclosure, the first communication processor 520 may receive the configuration for measurement of the communication quality and the signal indicating release of the second cellular communication from the first node 410 through one message. In response to reception of the signal indicating the release of the second cellular communication, the first communication processor 520 may transmit the signal indicating the release of the second cellular communication to the second communication processor 530.

According to certain embodiments of the disclosure, the first communication processor 520 may identify the configuration for the measurement of the quality of the second cellular communication included in the RRC connection reconfiguration signal related to the first cellular communication, and the second communication processor 530 may measure the quality of the second cellular communication.

According to certain embodiments of the disclosure, the second communication processor 530 may measure the quality of the second cellular communication in response to reception of the signal making a request for measuring the quality of the second cellular communication. The second communication processor 530 may generate a measurement result of the quality of the second cellular communication and transmit the measurement result of the quality of the second cellular communication to the first communication processor 520.

According to certain embodiments of the disclosure, the second communication processor 530 may measure the quality of the second cellular communication in response to reception of the configuration for the measurement of the communication quality. The second communication processor 530 may generate a measurement result of the quality of the second cellular communication and transmit the measurement result of the quality of the second cellular communication to the first communication processor 520.

According to certain embodiments of the disclosure, after transmitting the measurement result of the quality of the second cellular communication to the first communication processor 520, the second communication processor 530 may release establishment of the second cellular communication in response to the request for releasing the second cellular communication and maintain the state in which the second cellular communication is released. The second communication processor 530 may switch to a sleep state or a power-off state while the second cellular communication is released. If the second communication processor 530 switches to the sleep state or the power-off state, the first communication processor 520 may transmit or receive data through the first cellular communication.

According to certain embodiments of the disclosure, the first communication processor 520 may not directly transmit the signal making a request for measuring the quality of the second cellular communication to the second communication processor 530. The first communication processor 520 may identify whether the electronic device 101 satisfies a preset condition and transmits the measurement request signal to the second communication processor 530 in response to identification that the electronic device 101 satisfies the preset condition.

According to certain embodiments of the disclosure, the first communication processor 520 may receive the measurement result of the quality of the second cellular communication from the second communication processor 530. The received measurement result may be stored in a memory of the first communication processor 520.

According to certain embodiments of the disclosure, the first communication processor 520 may store the configuration for measurement of the quality of the second cellular communication in the memory of the first communication processor 520.

According to certain embodiments of the disclosure, the first communication processor 520 may not directly transmit the received measurement result to the first node 410. The first communication processor 520 may identify whether the electronic device 101 satisfies a preset condition and transmit the measurement result to the first node 410 in response to identification that the electronic device 101 satisfies the preset condition. According to certain embodiments of the disclosure, the first communication processor 520 may not directly transmit the received measurement configuration to the second communication processor 530. The first communication processor 520 may identify whether the electronic device 101 satisfies a preset condition and transmit the configuration for measurement of the quality of the second cellular communication to the second communication processor 530 in response to identification that the electronic device 101 satisfies the preset condition.

According to certain embodiments of the disclosure, the preset condition may be a condition corresponding to a need for data transmission or reception through the second cellular communication. The first communication processor 520 may receive a signal indicating the need for data transmission or reception through the second cellular communication from the application processor 510. According to an embodiment, the first communication processor 520 may determine that a preset condition is satisfied in response to reception of the signal indicating the need for data transmission or reception through the second cellular communication, and transmit the measurement result of the quality of the second cellular communication to the first node 410. According to an embodiment, the first communication processor 520 may determine that a preset condition is satisfied in response to reception of the signal indicating the need for data transmission or reception through the second cellular communication, and transmit the configuration for measurement of the quality of the second cellular communication to the second communication processor 530.

According to certain embodiments of the disclosure, the preset condition may include a condition corresponding to expiration of a time set to a timer in the first communication processor 520 or the second communication processor 530. The first communication processor 520 may activate a timer in response to reception of the signal making a request for measuring the quality of the second cellular communication and the signal indicating release of the second cellular communication. The timer may be an element for generating an interrupt after a preset time. The timer may be implemented in the memory of the first communication processor 520 in software, but may also be implemented as a separate physical circuit. The timer may transmit the interrupt to the first communication processor 520 in response to identification that the preset time has passed after the timer is activated.

According to certain embodiments of the disclosure, the first communication processor 510 may not transmit the measurement result of the quality of the second cellular communication to the first node 410 for a preset time set to the timer. After the time set to the timer has passed, the first communication processor 520 may determine that a preset condition is satisfied and transmit the measurement result of the quality of the second cellular communication to the first node 410.

According to certain embodiments of the disclosure, the first communication processor 510 may not transmit the configuration for the quality of the second cellular communication to the second communication processor 530 for a preset time set to the timer. The first communication processor 520 may determine that the time set to the timer has passed or the preset condition is satisfied, and transmit the configuration for the measurement of the quality of the second cellular communication to the second communication processor 530.

According to certain embodiments of the disclosure, in response to identification of the need for data transmission or reception through the second cellular communication before the time set to the timer expires, the first communication processor 520 may transmit the measurement result of the quality of the second cellular communication to the first node 410.

According to certain embodiments of the disclosure, in response to identification of the need for data transmission or reception through the second cellular communication before the time set to the timer expires, the first communication processor 520 may transmit the configuration for the measurement of the quality of the second cellular communication to the second communication processor 530. In response to reception of the configuration for the measurement of the quality of the second cellular communication, the second communication processor 530 may measure the quality of the second cellular communication and transmit the measurement result of the quality of the second cellular communication to the first communication processor 520.

According to certain embodiments of the disclosure, the preset condition may include a condition related to the remaining capacity of a battery of the electronic device 101. For example, the condition related to the remaining capacity of the battery may be a condition corresponding to the remaining capacity of the battery that is higher than (or lower than) a preset value. The first communication processor 520 may receive data related to the remaining capacity of the battery from the application processor 510. The first communication processor 520 may identify that the condition related to the remaining capacity of the battery is satisfied and transmit the measurement result of the quality of the second cellular communication to the first node 410.

According to certain embodiments of the disclosure, the preset condition may include a condition corresponding to at least two receptions of a specific message from the first node 410. The specific message may be an RRC connection reconfiguration signal including measurement configuration information of the quality of the second cellular communication. If the first communication processor 520 receives again the RRC connection reconfiguration signal including a message indicating measurement of the quality of the second cellular communication from the first node 410, the first communication processor 520 may determine that the preset condition is satisfied and transmit the measurement result of the quality of the second cellular communication to the first node 410. According to an embodiment, if the first communication processor 520 receives again the RRC connection reconfiguration signal including a message indicating measurement of the quality of the second cellular communication from the first node 410, the first communication processor 520 may determine that the preset condition is satisfied and transmit the configuration for the measurement of the quality of the second cellular communication to the second communication processor 530.

According to certain embodiments of the disclosure, the first node 410 may determine whether to establish the second cellular communication between the second node 420 and the electronic device 101 on the basis of the measurement result of the quality of the second cellular communication. If the first node 410 cannot receive the measurement result of the quality of the second cellular communication, the first node 410 may not determine whether to establish the second cellular communication between the second node and the electronic device 101. The operation of the first communication processor 510 may establish the second cellular communication established when a preset condition is satisfied. If the preset condition is not satisfied, the first communication processor 510 does not transmit the measurement result of the quality of the second cellular communication to the first node 410 to prevent the establishment of the second cellular communication. If the electronic device 101 does not satisfy the preset condition, the second communication processor 530 may maintain the state in which the establishment of the second cellular communication is released. The second communication processor 530 may switch to a sleep state or a power-off state while the release of the establishment of the second cellular communication is maintained. Through the above operation, the second communication processor 530 may reduce power consumption and thus increase the operating time of the electronic device 101.

According to certain embodiments of the disclosure, the first communication processor 520 may identify whether a signal making a request for establishing the second cellular communication is received from the first node 410 within a preset time. In response to reception of the signal making a request for establishing the second cellular communication within the preset time, the first communication processor 520 may transmit the configuration for measurement of the quality of the second cellular communication to the second communication processor 530 to allow the second communication processor 530 to establish the second cellular communication.

The above-described embodiments describe that the first communication processor 520 transmits the quality measurement result in response to identification that the preset condition is satisfied after the second communication processor 530 measures the quality of the second cellular communication while establishment of the second cellular communication is released, but the disclosure is not limited to the embodiments.

According to another embodiment of the disclosure, the first communication processor 520 may transmit the configuration for the measurement of the communication quality to the second communication processor 530 in response to identification that the electronic device 101 satisfies the preset condition. After releasing the establishment of the second cellular communication, the second communication processor 530 may measure the quality of the second cellular communication in response to a request from the first communication processor 520 and transmit the measurement result of the quality of the second cellular communication to the first communication processor 520 in the state in which the second communication processor 530 switches to the sleep state or the power-off state. The first communication processor 520 may transmit the measurement result of the quality of the second cellular communication to the first node 410.

Figure 6A:
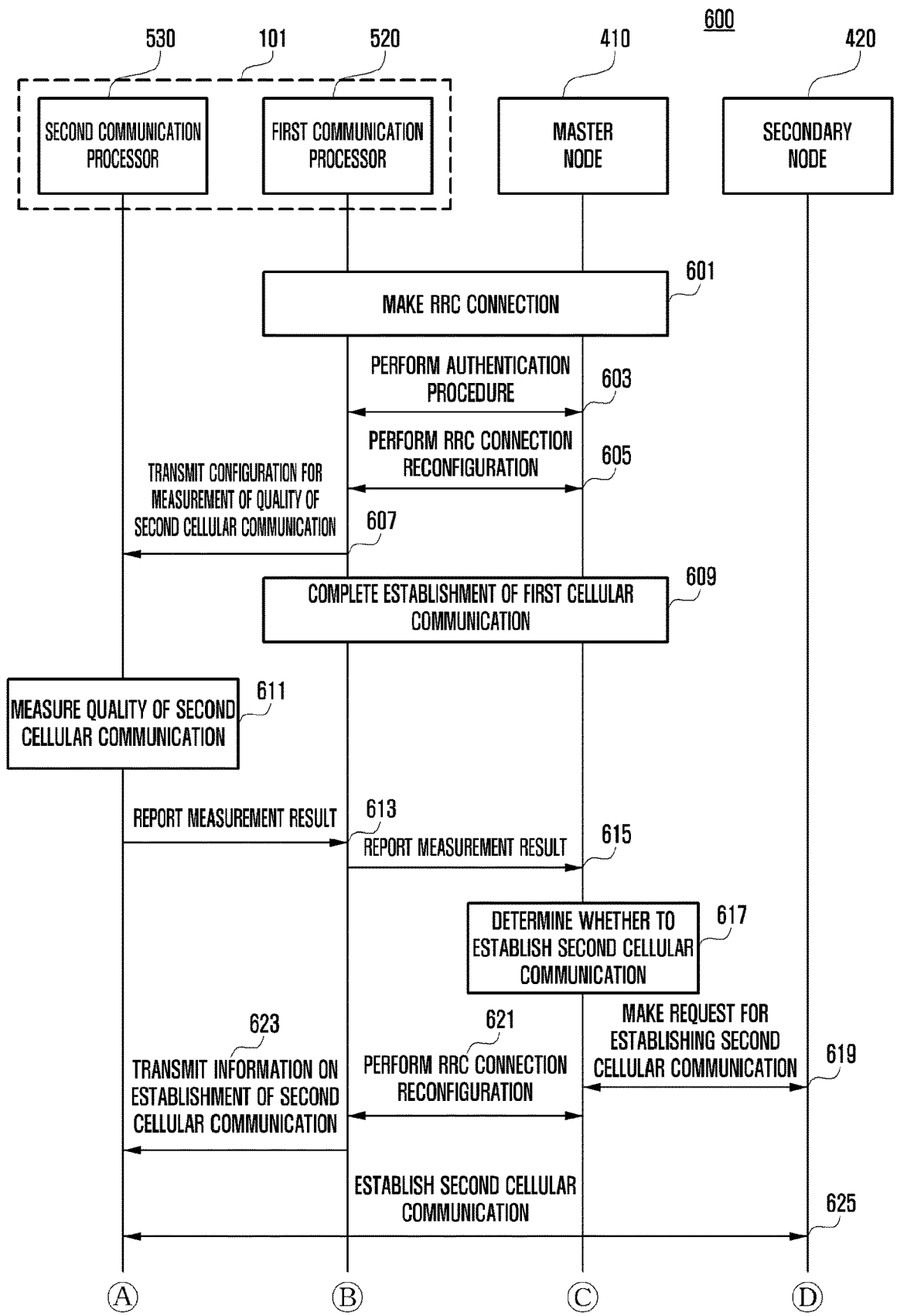
FIG. 6A is a flowchart illustrating release and re-establishment of second cellular communication in an electronic device according to certain embodiments of the disclosure.
Figure 6B:
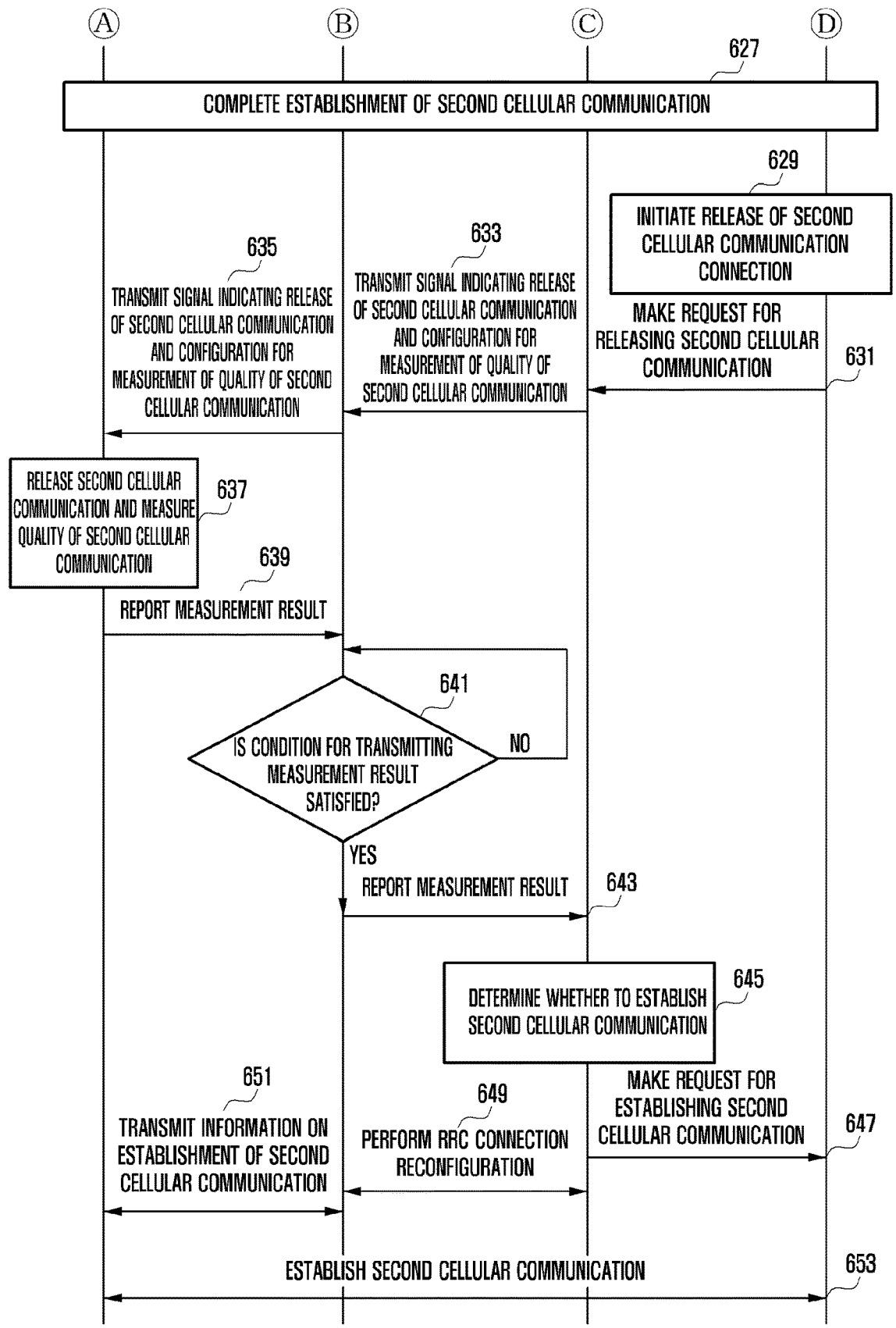
FIG. 6B is a flowchart illustrating release and re-establishment of second cellular communication in an electronic device according to certain embodiments of the disclosure.

FIG. 6A illustrates flow of an operation 600 for release and re-establishment of the second cellular communication in the electronic device according to certain embodiments of the disclosure, and FIG. 6B illustrates flow of an operation 600 for release and re-establishment of the second cellular communication in the electronic device according to certain embodiments of the disclosure.

An electronic device (for example, the electronic device 101 of FIG. 1) illustrated in FIGS. 6A and 6B may be an electronic device capable of supporting multi-radio access technology (multi-RAT) dual connectivity (MR-DC) for the simultaneous establishment of the first cellular communication and the second cellular communication. A master node (for example, the master node 410 of FIG. 4) supporting the first cellular communication and a secondary node (for example, the secondary node 420 of FIG. 4A) supporting the second cellular communication may be base stations supporting MR-DC.

According to certain embodiments of the disclosure, in operation 601, the first communication processor 520 and the master node 410 may establish a radio resource control (RRC) connection of the first cellular communication. The master node which supports the first cellular communication may transmit information identifying the master node as a base station supporting MR-DC, as indicated through system information (for example, system information 1 (SIB1) and system information 2 (SIB2)).

According to certain embodiments of the disclosure, the first communication processor 520 and the master node 410 may transmit or receive control data related to radio bearer configuration, paging, or mobility management while making the RRC connection.

According to certain embodiments of the disclosure, in operation 603, the first communication processor 520 and the master node 410 may perform an authentication procedure.

According to certain embodiments of the disclosure, the authentication procedure involve providing an identification for determining whether the electronic device 101 is permitted to utilize the first cellular communication or the second cellular communication to a server of a service provider of the first and/or the second cellular communication connections.

According to certain embodiments of the disclosure, in operation 605, the first communication processor 520 and the master node 410 may reconfigure the RRC connection.

According to certain embodiments of the disclosure, the master node 410 may reconfigure the RRC connection based an event (event B1) that generating a request for measuring a quality of the second cellular communication connection and transmit the same to the first communication processor 520.

According to certain embodiments of the disclosure, in operation 607, the first communication processor 520 may transmit the configuration (e.g., a configuration information) for measurement of the communication quality, to the second communication processor 530.

According to certain embodiments of the disclosure, in operation 609, the first communication processor 520 may complete the establishment of the first cellular communication connection with the master node 410. Operation 609 may be generated by operations 601 and 603 and may be performed separately from operations 605 and 607.

According to certain embodiments of the disclosure, in operation 611, the second communication processor 530 may receive the configuration for measuring the communication quality, as transmitted by the first communication processor 520, and thus measure the quality of the second cellular communication.

According to certain embodiments of the disclosure, in operation 613, the second communication processor 530 may transmit a result of the measurement of the quality of the second cellular communication to the first communication processor 520.

According to certain embodiments of the disclosure, in operation 615, the first communication processor 520 may transmit the result of the measurement of the quality of the second cellular communication to the master node 410.

According to certain embodiments of the disclosure, in operation 617, the master node 410 may identify the result of the measurement of the quality of the second cellular communication and determine whether the second cellular communication is connected between the secondary node 420 and the electronic device 101.

According to certain embodiments of the disclosure, the master node 410 may identify the result of the measurement of the quality of the second cellular communication measured in operation 613 and, if the quality of the second cellular communication measured by the electronic device 101 is higher than or equal to a preset value, determine that the second cellular communication is connected.

According to certain embodiments of the disclosure, in operation 619, the master node 410 may transmit a request for connecting the second cellular communication to the secondary node 420.

According to certain embodiments of the disclosure, in operation 619, the master node 410 may transmit a request for connecting the second cellular communication to the secondary node 420. Operation 619 may be generated by operation 617 and may be performed separately from operations 621 and 623. For example, operation 619 may be performed before or after operations 621 and 623 or performed at the same time.

According to certain embodiments of the disclosure, in operation 621, the master node 410 may transmit information on the connection of the second cellular communication to the electronic device 101 while reconfiguring the RRC connection. The information on the connection may include a configuration of an event (event A2) that generates a request for measuring the quality of the second cellular communication. The information on the connection of the second cellular communication transmitted by the master node 410 may be transmitted to the first communication processor 520. The information on the connection may include information utilized for the connection of the electronic device 101 to the secondary node 420 and transmitted to the first communication processor 520.

According to certain embodiments of the disclosure, in operation 623, the first communication processor 520 may transmit the received information on the connection of the second cellular communication to the second communication processor 530.

According to certain embodiments of the disclosure, in operation 625, the second communication processor 530 and the secondary node 420 may establish the connection of the second cellular communication based on the information on the connection. According to certain embodiments of the disclosure, in operation 627, the electronic device 101 and the secondary node 420 may complete establishment the connection of the second cellular communication through a series of operations performed in operation 621.

According to certain embodiments of the disclosure, in operation 629, the secondary node 420 may release the second cellular communication connection and initiate the same.

According to certain embodiments of the disclosure, the secondary node 420 may transmit or receive data through the second cellular communication to or from the electronic device 101. In response to identification that the operation of data transmission or reception to or from the electronic device through the second cellular communication is not performed, the secondary node 420 may switch a timer implemented in the secondary node 420 to an active state. If a preset time has passed, the activated timer may transmit a signal indicating that the preset time has passed to the secondary node 420. In response to identification that the time set to the timer has passed, the secondary node 420 may determine to release the second cellular communication with the electronic device 101.

According to certain embodiments of the disclosure, in operation 631, the secondary node 420 may transmit a signal making a request for releasing the second cellular communication connection to the master node 410.

According to certain embodiments of the disclosure, in operation 633, the master node 410 may transmit the signal indicating the release of the second cellular communication connection, and provide the configuration information for measuring the communication quality to the first communication processor 520, through the first cellular communication.

According to certain embodiments of the disclosure, the configuration for the measurement of the communication quality may be included in an RRC connection reconfiguration signal. The RRC connection reconfiguration signal may include control data related to radio bearer configuration, paging, or mobility management of the first cellular communication. The first communication processor 520 may receive the RRC connection reconfiguration signal and release establishment of the second cellular communication on the basis of the RRC connection reconfiguration signal. The first communication processor 520 may release the establishment of the second cellular communication on the basis of the RRC connection reconfiguration signal and transmit or receive data through the first cellular communication.

According to certain embodiments of the disclosure, if a condition indicating that the quality of the second cellular communication increases to be equal to or higher than a predetermined level is satisfied, the configuration for the measurement of the communication quality and the signal making a request for measuring the quality of the second cellular communication may include data indicating an event (measurement of event B1) for transmitting data indicating that the condition is satisfied to a base station of the second cellular communication. Upon receiving the configuration for the measurement of the communication quality, the first communication 520 may transmit the configuration for the measurement of the communication quality to the second communication processor 530. The second communication processor 530 may measure the quality of the second cellular communication while performing the operation for releasing the second cellular communication.

According to certain embodiments of the disclosure, in operation 635, the first communication processor 520 may transmit the signal indicating the release of the second cellular communication connection and provide the configuration for measuring the communication quality to the second communication processor 530.

According to certain embodiments of the disclosure, in operation 637, the second communication processor 530 may measure the quality of the second cellular communication connection while releasing the second cellular communication connection.

According to certain embodiments of the disclosure, in operation 639, the second communication processor 530 may transmit the measurement result to the first communication processor 520.

According to certain embodiments of the disclosure, the second communication processor 530 may switch to a sleep state or a power-off state while the release of second cellular communication connection is maintained. If the second communication processor 530 switches to the sleep state or the power-off state, the first communication processor 520 may transmit or receive data through the first cellular communication connection. The received measurement result may be stored in a memory of the first communication processor 520.

According to certain embodiments of the disclosure, in operation 641, the first communication processor 520 may identify whether a preset condition is satisfied, in order to determine whether to transmit the measurement result to the master node 410.

According to certain embodiments of the disclosure, the first communication processor 520 may not directly transmit the received measurement result to the first node 410. The first communication processor 520 may identify whether the electronic device 101 satisfies a preset condition and transmit the measurement result to the first node 410 in response to identification that the electronic device 101 satisfies the preset condition.

According to certain embodiments of the disclosure, the preset condition may be a condition corresponding to a need for data transmission or reception through the second cellular communication. The first communication processor 520 may receive a signal indicating the need for data transmission or reception through the second cellular communication from an application processor (for example, the application processor 510 of FIG. 5). In response to reception of the signal indicating the need for data transmission or reception through the second cellular communication, the first communication processor 520 may determine that the preset condition is satisfied and transmit the measurement result of the quality of the second cellular communication to the first node 410.

According to certain embodiments of the disclosure, the preset condition may include a condition corresponding to expiration of a time set to a timer in the first communication processor 520 or the second communication processor 530. The first communication processor 520 may activate a timer in response to reception of the signal making a request for measuring the quality of the second cellular communication and the signal indicating release of the second cellular communication. The timer may be a component for generating an interrupt after a preset time. The timer may be implemented in the memory of the first communication processor 520 in software, but may also be implemented as a separate physical circuit. The timer may transmit the interrupt to the first communication processor 520 in response to identification that the preset time has passed after the timer is activated.

According to certain embodiments of the disclosure, the first communication processor 510 may not transmit the measurement result of the quality of the second cellular communication to the first node 410 for a preset time set to the timer. After the time set to the timer has passed, the first communication processor 520 may determine that the preset condition is satisfied and transmit the measurement result of the quality of the second cellular communication to the first node 410.

According to certain embodiments of the disclosure, in response to identification of the need for data transmission or reception through the second cellular communication before the time set to the timer expires, the first communication processor 520 may transmit the measurement result of the quality of the second cellular communication to the first node 410.

According to certain embodiments of the disclosure, the preset condition may include a condition related to the remaining capacity of a battery of the electronic device 101. For example, the condition related to the remaining capacity of the battery may be a condition corresponding to the remaining capacity of the battery that is higher than (or lower than) a preset value. The first communication processor 520 may receive data related to the remaining capacity of the battery from the application processor 510. The first communication processor 520 may identify that the condition related to the remaining capacity of the battery is satisfied and transmit the measurement result of the quality of the second cellular communication to the first node 410.

According to certain embodiments of the disclosure, the preset condition may include a condition corresponding to at least two receptions of a specific message from the first node 410. The specific message may be an RRC connection reconfiguration signal including measurement configuration information of the quality of the second cellular communication. If the first communication processor 520 receives again the RRC connection reconfiguration signal including a message indicating measurement of the quality of the second cellular communication from the first node 410, the first communication processor 520 may determine that the preset condition is satisfied and transmit the measurement result of the quality of the second cellular communication to the first node 410.

According to certain embodiments of the disclosure, in operation 643, the first communication processor 520 may report the measurement result to the master node 410 in response to detecting that the preset condition is satisfied ("Yes" of operation 641).

According to certain embodiments of the disclosure, in operation 645, the master node 410 may determine whether to establish the second cellular communication connection between the secondary node 420 and the electronic device 101 based on the measurement result.

According to certain embodiments of the disclosure, in operation 647, the master node 410 may transmit a request signal requesting establishment of the second cellular communication connection to the secondary node 420 in response to determining to establish the second cellular communication.

According to certain embodiments of the disclosure, in operation 649, the master node 410 may transmit information requesting the establishment of the second cellular communication connection to the electronic device 101 while reconfiguring the RRC connection. The information for requesting the establishment of the second cellular communication connection may include a configuration of an event (event A2) including a request to measure the quality of the second cellular communication, and may be transmitted to the first communication processor 520. The information on the establishment may include information utilized for the connection of the electronic device 101 to the secondary node 420 and transmitted to the first communication processor 520.

According to certain embodiments of the disclosure, in operation 651, the first communication processor 520 may transmit the received information on the connection of the second cellular communication to the second communication processor 530.

According to certain embodiments of the disclosure, in operation 653, the secondary node 420 may establish the second cellular communication connection with the electronic device 101.

According to certain embodiments of the disclosure, the master node 410 may determine whether to establish the second cellular communication between the secondary node 420 and the electronic device 101 on the basis of the measurement result of the quality of the second cellular communication. If the master node 410 does not receive the measurement result of the quality of the second cellular communication, the master node 410 may not determine whether to establish the second cellular communication between the secondary node 420 and the electronic device 101. The operation of the first communication processor 510 may establish the second cellular communication established when a preset condition is satisfied. If the preset condition is not satisfied, the first communication processor 510 may not transmit the measurement result of the quality of the second cellular communication to the master node 410 to prevent the establishment of the second cellular communication if the electronic device 101 does not satisfy the preset condition, the second communication processor 530 may maintain the state in which the establishment of the second cellular communication is released. The second communication processor 530 may switch to a sleep state or a power-off state while the release of the establishment of the second cellular communication is maintained. Through the above operation, the second communication processor 530 may reduce power consumption and thus increase the operating time of the electronic device 101.

The description made with reference to FIGS. 6A to 6B states that the first communication processor 520 transmits the quality measurement result in response to identification that the preset condition is satisfied after the second communication processor 530 measures the quality of the second cellular communication while the establishment of the second cellular communication is released, but the disclosure is not limited to the embodiment.

According to another embodiment of the disclosure, the first communication processor 520 may generate a request for measuring the quality of the second cellular communication to the second communication processor 530 in response to identification that the electronic device 101 satisfies a preset condition. After releasing the establishment of the second cellular communication, the second communication processor 530 may measure the quality of the second cellular communication in response to a request from the first communication processor 520 and transmit the measurement result of the quality of the second cellular communication to the first communication processor 520 in the state in which the second communication processor 530 switches to the sleep state or the power-off state. The first communication processor 520 may transmit the measurement result of the quality of the second cellular communication to the first node 410. The embodiment will be described below with reference to FIGS. 7A to 7B.

Figure 7B:
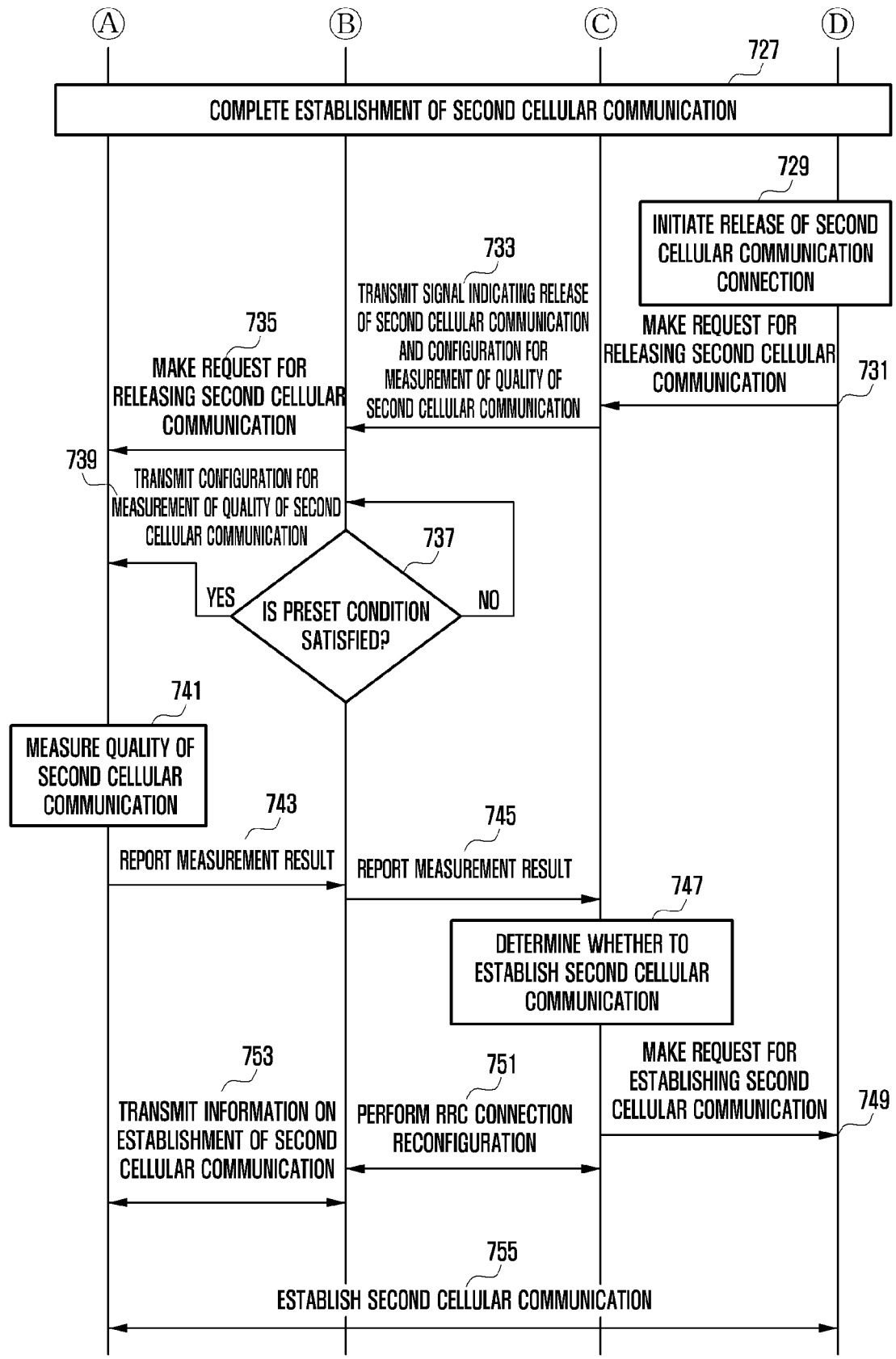
FIG. 7B is a flowchart illustrating release and re-establishment of second cellular communication in an electronic device according to another embodiment of the disclosure.

FIG. 7A illustrates flow of an operation 700 for release and re-establishment of the second cellular communication in the electronic device according to certain embodiments of the disclosure, and FIG. 7B illustrates flow of an operation 700 for release and re-establishment of the second cellular communication in the electronic device according to certain embodiments of the disclosure.

An electronic device (for example, the electronic device 101 of FIG. 1) illustrated in FIGS. 7A and 7B may be an electronic device capable of supporting multi-radio access technology (multi-RAT) dual connectivity (MR-DC) for the simultaneous establishment of the first cellular communication and the second cellular communication. A master node (for example, the master node 410 of FIG. 4) supporting the first cellular communication and a secondary node (for example, the secondary node 420 of FIG. 4A) supporting the second cellular communication may be base stations supporting MR-DC.

According to certain embodiments of the disclosure, in operation 701, the first communication processor 520 and the master node 410 may establish a radio resource control (RRC) connection of the first cellular communication. The master node supporting the first cellular communication may transmit identifying information indicating that the master node is a base station supporting MR-DC through system information (for example, system information 1 (SIB1) and system information 2 (SIB2)).

According to certain embodiments of the disclosure, the first communication processor 520 and the master node 410 may transmit or receive control data related to radio bearer configuration, paging, or mobility management while making the RRC connection.

According to certain embodiments of the disclosure, in operation 703, the first communication processor 520 and the master node 410 may perform an authentication procedure.

According to certain embodiments of the disclosure, the authentication procedure may be a procedure for providing an identification of whether the electronic device 101 is the electronic device 101 which can use the first cellular communication or the second cellular communication to a server of a service provider which provides the first cellular communication or the second cellular communication.

According to certain embodiments of the disclosure, in operation 705, the first communication processor 520 and the master node 410 may reconfigure the RRC connection.

According to certain embodiments of the disclosure, the master node 410 may reconfigure the RRC connection to include a configuration of an event (event B1) that generates a request for measuring a quality of the second cellular communication for the connection of the second cellular communication and transmit the same to the first communication processor 520.

According to certain embodiments of the disclosure, in operation 707, the first communication processor 520 may transmit the configuration information for measuring the second cellular communication to the second communication processor 530.

According to certain embodiments of the disclosure, in operation 709, the first communication processor 520 may complete the establishment of the first cellular communication connection with the master node 410. Operation 709 may be generated by operations 701 and 703 and may be performed separately from operations 705 and 707.

According to certain embodiments of the disclosure, in operation 711, the second communication processor 530 may receive the configuration information and measure the quality of the second cellular communication connection.

According to certain embodiments of the disclosure, in operation 713, the second communication processor 530 may transmit a result of the measurement of the quality of the second cellular communication to the first communication processor 520.

According to certain embodiments of the disclosure, in operation 715, the first communication processor 520 may transmit the results of the quality measurement to the master node 410.

According to certain embodiments of the disclosure, in operation 717, the master node 410 may analyze the results of the measurement of operation 711, and determine whether the second cellular communication connection should be established between the secondary node 420 and the electronic device 101 based on the results.

According to certain embodiments of the disclosure, the master node 410 may analyze the results of the measurement in operation 713 and, if the measured quality of the second cellular communication detected by the electronic device 101 is higher than or equal to a preset value, determine that the second cellular communication connection is to be established.

According to certain embodiments of the disclosure, in operation 719, the master node 410 may transmit a request to communicatively connect the second cellular communication to the secondary node 420. Operation 719 may be generated by operation 717 and may be performed separately from operations 721 and 723. For example, operation 719 may be performed before or after operations 721 and 723 or performed at the same time.

According to certain embodiments of the disclosure, in operation 721, the master node 410 may transmit information pertaining to the connection of the second cellular communication to the electronic device 101 while reconfiguring the RRC connection. The information on the connection may include a configuration of an event (event A2) that generates a request for measuring the quality of the second cellular communication. The information on the connection of the second cellular communication transmitted by the master node 410 may be transmitted to the first communication processor 520. The information on the establishment may include information utilized for the connection of the electronic device 101 to the secondary node 420 and transmitted to the first communication processor 520.

According to certain embodiments of the disclosure, in operation 723, the first communication processor 520 may transmit the received information on the connection of the second cellular communication to the second communication processor 530.

According to certain embodiments of the disclosure, in operation 725, the second communication processor 530 and the secondary node 420 may establish the connection of the second cellular communication on the basis of the information on the connection.

According to certain embodiments of the disclosure, in operation 727, the electronic device 101 and the secondary node 420 may complete the establishment of the second cellular communication connection through a series of operations performed in operation 721.

According to certain embodiments of the disclosure, in operation 729, the secondary node 420 may determine to release the second cellular communication connection and initiate the same.

According to certain embodiments of the disclosure, the secondary node 420 may transmit or receive data through the second cellular communication to or from the electronic device 101. In response to identification that the operation of data transmission or reception to or from the electronic device through the second cellular communication is not performed, the secondary node 420 may switch a timer set to the secondary node 420 to an active state. If a preset time has passed, the activated timer may transmit a signal indicating that the preset time has passed to the secondary node 420. In response to identification that the time set to the timer has passed, the secondary node 420 may determine to release the second cellular communication with the electronic device 101.

According to certain embodiments of the disclosure, in operation 731, the secondary node 420 may transmit a signal requesting release of the second cellular communication connection to the master node 410.

According to certain embodiments of the disclosure, in operation 733, the master node 410 may transmit a signal indicating release of the second cellular communication connection and providing the configuration information for measuring the quality of the second cellular communication connection to the first communication processor 520 through the first cellular communication.

According to certain embodiments of the disclosure, the signal indicating the release of establishment of the second cellular communication may be included in an RRC connection reconfiguration signal. The RRC connection reconfiguration signal may include control data related to radio bearer configuration, paging, or mobility management of the first cellular communication. The first communication processor 520 may receive the RRC connection reconfiguration signal and release establishment of the second cellular communication on the basis of the RRC connection reconfiguration signal. The first communication processor 520 may release the establishment of the second cellular communication on the basis of the RRC connection reconfiguration signal and transmit or receive data through the first cellular communication.

According to certain embodiments of the disclosure, if a condition indicating that the quality of the second cellular communication increases to be equal to or higher than a predetermined level is satisfied, the configuration for the measurement of the quality of the second cellular communication may be included in data indicating an event (measurement of event B1) for transmitting data indicating that the condition is satisfied to a base station of the second cellular communication. Upon receiving the signal making a request for measuring the quality of the second cellular communication, the first communication processor 520 may transmit the configuration for the measurement of the quality of the second cellular communication to the second communication processor 530 to allow the second communication processor 530 to measure the quality of the second cellular communication while performing the operation for releasing the second cellular communication.

According to certain embodiments of the disclosure, in operation 735, the first communication processor 520 may transmit the signal requesting release of the second cellular communication connection to the second communication processor 530.

According to certain embodiments of the disclosure, the second communication processor 530 may switch to a sleep state or a power-off state while the release of the establishment of the second cellular communication is maintained. If the second communication processor 530 switches to the sleep state or the power-off state, the first communication processor 520 may transmit or receive data through the first cellular communication.

According to certain embodiments of the disclosure, in operation 737, the first communication processor 520 may identify whether a preset condition is satisfied.

According to certain embodiments of the disclosure, the first communication processor 520 may identify whether the electronic device 101 satisfies a preset condition, and transmit the configuration for the measurement of the quality of the second cellular communication to the second communication processor 530 in operation 739, in response to detecting that e electronic device 101 satisfies the preset condition ("Yes" of operation 737).

According to certain embodiments of the disclosure, the preset condition may be a condition corresponding to a need for data transmission or reception through the second cellular communication. The first communication processor 520 may receive a signal indicating the need for data transmission or reception through the second cellular communication from the application processor 510. The first communication processor 520 may determine that the preset condition is satisfied in response to reception of a signal indicating the need for data transmission or reception through the second cellular communication, and transmit the configuration for the measurement of the quality of the second cellular communication to the second communication processor 530 to allow the second communication processor 530 to measure the quality of the second cellular communication 530.

According to certain embodiments of the disclosure, the preset condition may include a condition corresponding to expiration of a time set to a timer in the first communication processor 520 or the second communication processor 530. The first communication processor 520 may activate a timer in response to reception of the signal making a request for measuring the quality of the second cellular communication and the signal indicating release of the second cellular communication. The timer may be a component for generating an interrupt after a preset time. The timer may be implemented in the memory of the first communication processor 520 in software, but may also be implemented as a separate physical circuit. The timer may transmit the interrupt to the first communication processor 520 in response to identification that the preset time has passed after the timer is activated.

According to certain embodiments of the disclosure, the first communication processor 510 may not transmit the signal making a request for measuring the quality of the second cellular communication to the second communication processor 530 for the preset time set to the timer. After the time set to the timer has passed, the first communication processor 520 may determine that the preset condition is satisfied, and transmit the configuration for the measurement of the quality of the second cellular communication to the second communication processor 530 to allow the second communication processor 530 to measure the quality of the second cellular communication. According to certain embodiments of the disclosure, in response to identification that data transmission or reception through the second cellular communication is needed before the time set to the timer has not expired, the first communication processor 520 may transmit the configuration for the measurement of the quality of the second cellular communication to the second communication processor 530 to allow the second communication processor 530 to measure the second cellular communication.

According to certain embodiments of the disclosure, the preset condition may include a condition related to the remaining capacity of a battery of the electronic device 101. For example, the condition related to the remaining capacity of the battery may be a condition corresponding to the remaining capacity of the battery that is higher than (or lower than) a preset value. The first communication processor 520 may receive data related to the remaining capacity of the battery from the application processor 510. The first communication processor 520 may identify that the condition related to the remaining capacity of the battery is satisfied and allow the second communication processor 530 to measure the quality of the second cellular communication.

According to certain embodiments of the disclosure, the preset condition may include a condition corresponding to at least two receptions of a specific message from the first node 410. The specific message may be an RRC connection reconfiguration signal including measurement configuration information of the quality of the second cellular communication. If the first communication processor 520 receives again the RRC connection reconfiguration signal including a message indicating measurement of the quality of the second cellular communication from the first node 410, the first communication processor 520 may determine that the preset condition is satisfied and transmit the configuration for the measurement of the quality of the second cellular communication to the second communication processor 530 to allow the second communication processor 530 to measure the quality of the second cellular communication.

According to certain embodiments of the disclosure, in operation 741, the second communication processor 530 may measure the quality of the second cellular communication in response to receiving the configuration information for measuring the second cellular communication.

According to certain embodiments of the disclosure, in operation 743, the second communication processor 530 may transmit the measurement result to the first communication processor 520.

According to certain embodiments of the disclosure, in operation 745, the first communication processor 520 may forward the measurement result received from the second communication processor 530 by transmission to the master node 410.

According to certain embodiments of the disclosure, in operation 747, the master node 410 may determine whether to establish the second cellular communication connection between the secondary node 420 and the electronic device 101 based on the measurement result.

According to certain embodiments of the disclosure, in operation 749, the master node 410 may transmit a signal generating a request for establishment of the second cellular communication connection to the secondary node 420 in response determining to establish the second cellular communication connection.

According to certain embodiments of the disclosure, in operation 751, the master node 410 may transmit information on the connection of the second cellular communication to the electronic device 101, while reconfiguring the RRC connection. The information on the establishment of the second cellular communication may include a configuration of an event (event A2) making a request for measuring the quality of the second cellular communication and may be transmitted to the first communication processor 520. The information on the establishment may include information utilized for the connection of the electronic device 101 to the secondary node 420 and transmitted to the first communication processor 520.

According to certain embodiments of the disclosure, in operation 753, the first communication processor 520 may transmit the received information on the connection of the second cellular communication to the second communication processor 530.

According to certain embodiments of the disclosure, in operation 755, the secondary node 420 may establish the second cellular communication connection with the electronic device 101.

According to certain embodiments of the disclosure, the master node 410 may determine whether to establish the second cellular communication between the secondary node 420 and the electronic device 101 on the basis of the measurement result of the quality of the second cellular communication. If the master node 410 does not receive the measurement result of the quality of the second cellular communication, the master node 410 may not determine whether to establish the second cellular communication between the secondary node 420 and the electronic device 101. The operation of the first communication processor 510 may establish the second cellular communication established when a preset condition is satisfied. If the preset condition is not satisfied, the first communication processor 510 may not transmit the measurement result of the quality of the second cellular communication to the master node 410 to prevent the establishment of the second cellular communication. If the electronic device 101 does not satisfy the preset condition, the second communication processor 530 may maintain the state in which the establishment of the second cellular communication is released. The second communication processor 530 may switch to a sleep state or a power-off state while the release of the establishment of the second cellular communication is maintained. Through the above operation, the second communication processor 530 may reduce power consumption and thus increase the operating time of the electronic device 101.

The description made with reference to FIGS. 7A to 7B states that the first communication processor 520 does not transmit the signal making a request for measuring the quality of the second cellular communication to the second communication processor 530 until the preset condition is satisfied in the state in which establishment of the second cellular communication is released, but the disclosure is not limited to the embodiment.

According to another embodiment of the disclosure, the master node 410 may determine whether to establish the second cellular communication. The embodiment will be described below with reference to FIGS. 8A to 8B.

Figure 8A:
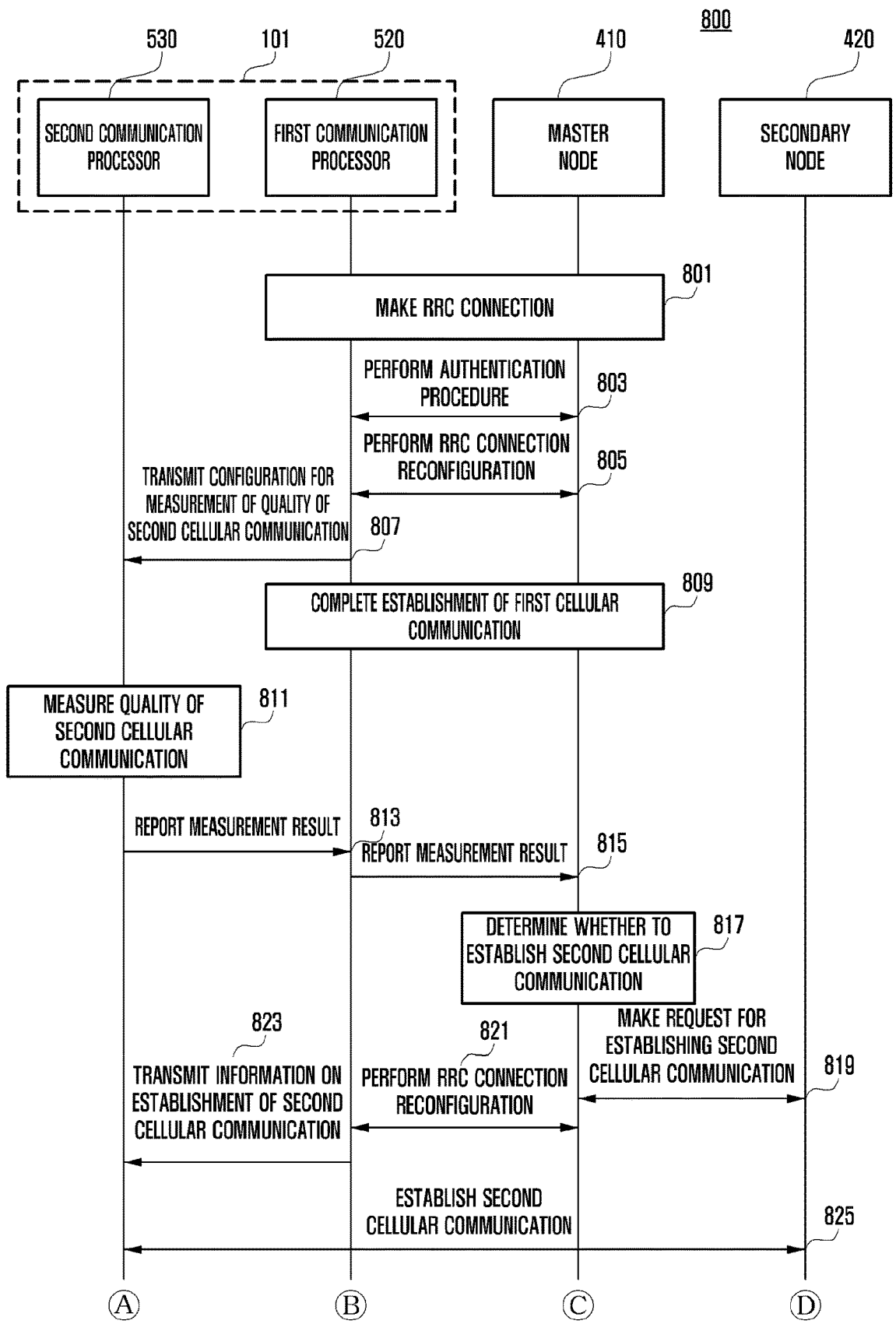
FIG. 8A is a flowchart illustrating release and re-establishment of second cellular communication in an electronic device according to another embodiment of the disclosure.
Figure 8B:
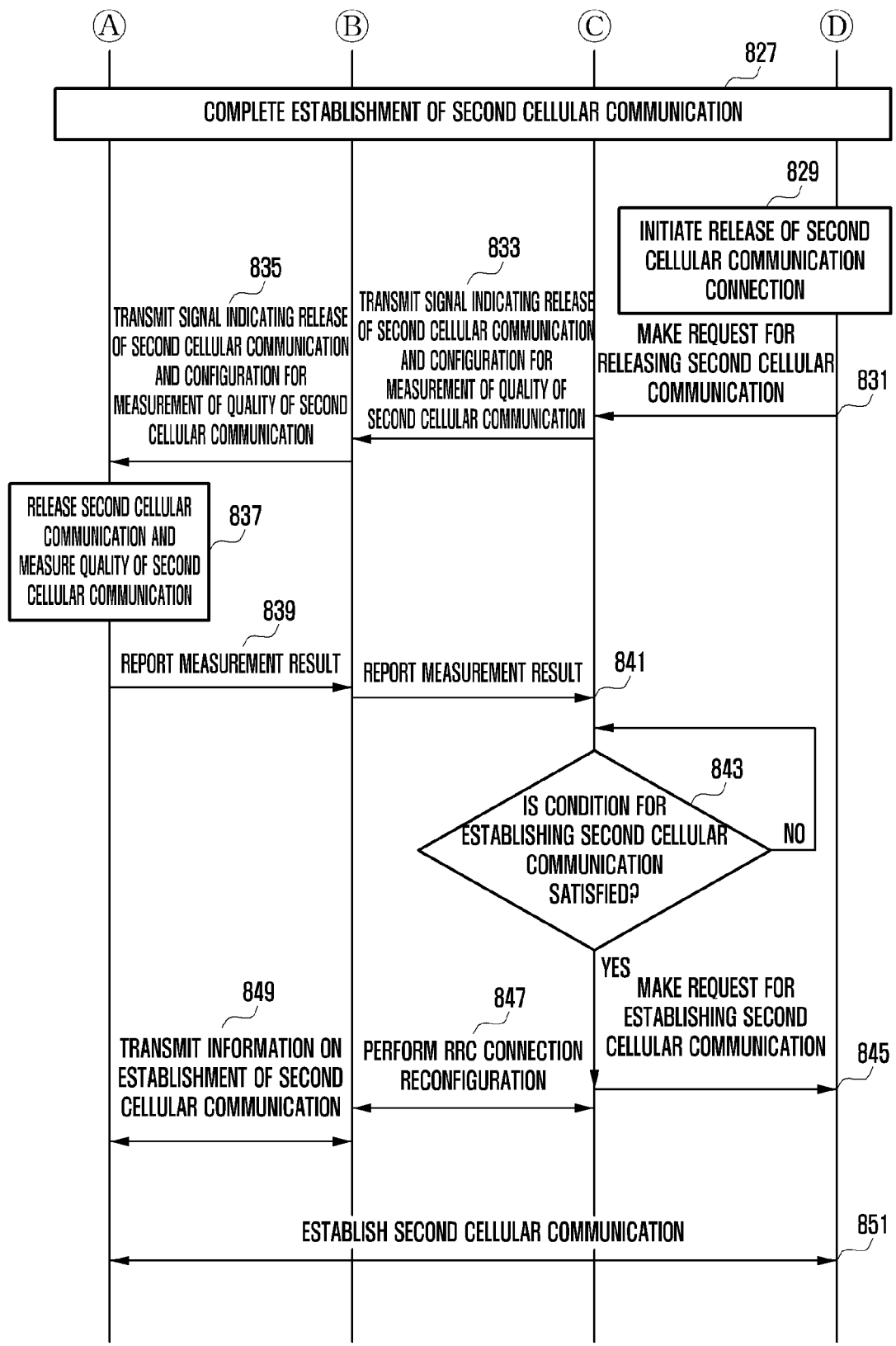
FIG. 8B is a flowchart illustrating release and re-establishment of second cellular communication in an electronic device according to another embodiment of the disclosure.

FIG. 8A illustrates the flow of an operation 800 for release and re-establishment of the second cellular communication connection in the electronic device according to certain embodiments of the disclosure, and FIG. 8B illustrates the flow of an operation 800 for release and re-establishment of the second cellular communication in the electronic device according to certain embodiments of the disclosure.

An electronic device (for example, the electronic device 101 of FIG. 1) illustrated in FIGS. 8A and 8B may be an electronic device capable of supporting multi-radio access technology (multi-RAT) dual connectivity (MR-DC) for the simultaneous establishment of the first cellular communication and the second cellular communication. A master node (for example, the master node 410 of FIG. 4) supporting the first cellular communication and a secondary node (for example, the secondary node 420 of FIG. 4A) supporting the second cellular communication may be base stations supporting MR-DC.

According to certain embodiments of the disclosure, in operation 801, the first communication processor 520 and the master node 410 may establish a radio resource control (RRC) connection of the first cellular communication. The master node supporting the first cellular communication may transmit identifying information indicating that the master node is a base station supporting MR-DC through system information (for example, system information 1 (SIB1) and system information 2 (SIB2)).

According to certain embodiments of the disclosure, the first communication processor 520 and the master node 410 may transmit or receive control data related to radio bearer configuration, paging, or mobility management while making the RRC connection.

According to certain embodiments of the disclosure, in operation 803, the first communication processor 520 and the master node 410 may perform an authentication procedure.

According to certain embodiments of the disclosure, the authentication procedure may be a procedure for providing an identification of whether the electronic device 101 is the electronic device 101 which can use the first cellular communication or the second cellular communication to a server of a service provider which provides the first cellular communication or the second cellular communication.

According to certain embodiments of the disclosure, in operation 805, the first communication processor 520 and the master node 410 may reconfigure the RRC connection.

According to certain embodiments of the disclosure, the master node 410 may transmit the configuration for the measurement of the communication quality including a configuration of an event (event B1) that generates a request for measuring the quality of the second cellular communication to establish the second cellular communication to the first communication processor 520 while reconfiguring the RRC connection.

According to certain embodiments of the disclosure, in operation 807, the first communication processor 520 may transmit the configuration information for measurement of the communication quality to the second communication processor 530.

According to certain embodiments of the disclosure, in operation 809, the first communication processor 520 may complete the establishment of the first cellular communication connection with the master node 410. Operation 809 may be generated by operations 801 and 803 and may be performed separately from operations 805 and 807.

According to certain embodiments of the disclosure, in operation 811, the second communication processor 530 may receive the configuration for the measurement of the communication quality transmitted by the first communication processor 520 and measure the quality of the second cellular communication.

According to certain embodiments of the disclosure, in operation 813, the second communication processor 530 may transmit a result of the measurement of the quality of the second cellular communication to the first communication processor 520.

According to certain embodiments of the disclosure, in operation 815, the first communication processor 520 may transmit the result of the measurement of the quality of the second cellular communication to the master node 410.

According to certain embodiments of the disclosure, in operation 817, the master node 410 may analyze the results of the measurement of the quality of the second cellular communication connection and determine whether the second cellular communication connection should be established between the secondary node 420 and the electronic device 101.

According to certain embodiments of the disclosure, the master node 410 may analyze the measured quality of the second cellular communication connection, and, if the quality of the second cellular communication connection is higher than or equal to a preset value, it may determine that the second cellular communication connection is sufficiently established.

According to certain embodiments of the disclosure, in operation 819, the master node 410 may transmit a request to establish the second cellular communication connection to the secondary node 420. Operation 819 may be generated by operation 817 and may be performed separately from operations 821 and 823. For example, operation 819 may be performed before or after operations 821 and 823 or performed at the same time.

According to certain embodiments of the disclosure, in operation 821, the master node 410 may transmit information on the connection of the second cellular communication to the electronic device 101 while reconfiguring the RRC connection. The information on the connection may include a configuration of an event (event A2) that generates a request for measuring the quality of the second cellular communication. The information on the connection of the second cellular communication transmitted by the master node 410 may be transmitted to the first communication processor 520. The information on the establishment may include information utilized for the connection of the electronic device 101 to the secondary node 420 and transmitted to the first communication processor 520.

According to certain embodiments of the disclosure, in operation 823, the first communication processor 520 may transmit the received information on the connection of the second cellular communication to the second communication processor 530.

According to certain embodiments of the disclosure, in operation 825, the second communication processor 530 and the secondary node 420 may establish the connection of the second cellular communication on the basis of the information on the connection.

According to certain embodiments of the disclosure, in operation 827, the electronic device 101 and the secondary node 420 may complete the establishment of the second cellular communication connection through a series of operations performed in operation 821.

According to certain embodiments of the disclosure, in operation 829, the secondary node 420 may determine to release the second cellular communication connection and initiate the same.

According to certain embodiments of the disclosure, the secondary node 420 may transmit or receive data through the second cellular communication to or from the electronic device 101. In response to identification that the operation of data transmission or reception to or from the electronic device through the second cellular communication is not performed, the secondary node 420 may switch a timer set to the secondary node 420 to an active state. If a preset time has passed, the activated timer may transmit a signal indicating that the preset time has passed to the secondary node 420. In response to identification that the time set to the timer has passed, the secondary node 420 may determine to release the second cellular communication with the electronic device 101.

According to certain embodiments of the disclosure, in operation 831, the secondary node 420 may transmit a signal making a request for releasing the second cellular communication connection to the master node 410.

According to certain embodiments of the disclosure, in operation 833, the master node 410 may transmit the signal indicating the release of the second cellular communication connection and the configuration for measurement of the communication quality to the first communication processor 520 through the first cellular communication.

According to certain embodiments of the disclosure, the signal indicating the release of establishment of the second cellular communication may be included in a RRC connection reconfiguration signal. The RRC connection reconfiguration signal may include control data related to radio bearer configuration, paging, or mobility management of the first cellular communication. The first communication processor 520 may receive the RRC connection reconfiguration signal and release establishment of the second cellular communication on the basis of the RRC connection reconfiguration signal. The first communication processor 520 may release the establishment of the second cellular communication on the basis of the RRC connection reconfiguration signal and transmit or receive data through the first cellular communication.

According to certain embodiments of the disclosure, if a condition indicating that the quality of the second cellular communication increases to be equal to or higher than a predetermined level is satisfied, the configuration for the measurement of the communication quality may include data indicating an event (measurement of event B1) for transmitting data indicating that the condition is satisfied to a base station of the second cellular communication. Upon receiving the configuration for the measurement of the communication quality, the first communication processor 520 may transmit the configuration for the measurement of the communication quality to the second communication processor 530 while performing the operation for releasing the second cellular communication.

According to certain embodiments of the disclosure, in operation 835, the first communication processor 520 may transmit the signal indicating the release of the second cellular communication connection and the configuration information for the measurement of the communication quality to the second communication processor 530.

According to certain embodiments of the disclosure, in operation 837, the second communication processor 530 may measure the quality of the second cellular communication connection while releasing the second cellular communication connection.

According to certain embodiments of the disclosure, in operation 839, the second communication processor 530 may measure the quality of the second cellular communication connection, and transmit the measurement result to the first communication processor 520.

According to certain embodiments of the disclosure, the second communication processor 530 may switch to a sleep state or a power-off state while the release of the establishment of the second cellular communication is maintained. If the second communication processor 530 switches to the sleep state or the power-off state, the first communication processor 520 may transmit or receive data through the first cellular communication. The received measurement result may be stored in a memory of the first communication processor 520.

According to certain embodiments of the disclosure, in operation 841, the first communication processor 520 may report the measurement result to the master node 410.

According to certain embodiments of the disclosure, in operation 843, the master node 410 may determine whether the electronic device 101 satisfies a preset condition in order to establish the second cellular communication connection in response to reception of the measurement result.

According to certain embodiments of the disclosure, the preset condition may be a condition corresponding to a need for data transmission or reception through the second cellular communication. The master node 410 may receive a signal indicating the need for data transmission or reception through the second cellular communication from the electronic device 101. The signal indicating the need for data transmission through the second cellular communication from the electronic device 101 may be at least one of a scheduling request (SR) or a buffer status report (BSR). The master node 410 may determine that the preset condition is satisfied in response to reception of the signal indicating the need for data transmission or reception through the second cellular communication, and determine to establish the second cellular communication.

According to certain embodiments of the disclosure, the preset condition may include a condition corresponding to expiration of a time set to the timer implemented in the master node 410. The master node 410 may activate the timer in response to reception of a signal indicating release of the second cellular communication from the secondary node 420. The timer may be a component for generating an interrupt after a preset time.

According to certain embodiments of the disclosure, the master node 410 may not establish the second cellular communication for a preset time set to the timer. After the time set to the timer has passed, the master node 410 may determine that the preset condition is satisfied and determine to establish the second cellular communication.

According to certain embodiments of the disclosure, in response to reception of the signal indicating the need for data transmission or reception through the second cellular communication before the time set to the timer expires, the master node 410 may determine to establish the second cellular communication.

According to certain embodiments of the disclosure, in operation 845, the master node 410 may transmit a signal generating a request for establishing the second cellular communication connection to the secondary node 420 in response to determination of the establishment of the second cellular communication ("Yes" of operation 843).

According to certain embodiments of the disclosure, in operation 847, the master node 410 may transmit information on the connection of the second cellular communication to the electronic device 101 while reconfiguring the RRC connection. The information on the establishment of the second cellular communication may include a configuration of an event (event A2) making a request for measuring the quality of the second cellular communication and may be transmitted to the first communication processor 520. The information on the establishment may include information utilized for the connection of the electronic device 101 to the secondary node 420 and transmitted to the first communication processor 520.

According to certain embodiments of the disclosure, in operation 849, the first communication processor 520 may transmit the received information on the connection of the second cellular communication to the second communication processor 530.

According to certain embodiments of the disclosure, in operation 851, the secondary node 420 may establish the second cellular communication with the electronic device 101.

The operation of the master node 410 may establish the second cellular communication when the preset condition is satisfied. If the preset condition is not satisfied, the master node 410 may not transmit the signal making a request for establishing the second cellular communication to the secondary node 420 to prevent the second cellular communication from being established. If the preset condition is not satisfied, the master node 410 may maintain the state in which establishment of the second cellular communication is released. The second communication processor 530 may switch to a sleep state or a power-off state while the release of the establishment of the second cellular communication is maintained. Through the above operation, the second communication processor 530 may reduce power consumption and thus increase the operating time of the electronic device 101.

An electronic device according to certain embodiments of the disclosure includes: an application processor; a first communication processor configured to perform first cellular communication with a first node; and a second communication processor configured to perform second cellular communication with a second node, such that the first communication processor is configured to receive a configuration for measurement of a quality of the second cellular communication from the first node, control the second communication processor to release the second cellular communication, receive a measurement result of the quality of the second cellular communication measured by the second communication processor according to reception of the configuration for the measurement of the quality of the second cellular communication from the second communication processor, and transmit the measurement result to the first node in response to identification that the electronic device satisfies a preset condition.

In the electronic device according to certain embodiments of the disclosure, in response to identification that a timer implemented in the first communication processor has expired, the first communication processor may be configured to determine that the preset condition is satisfied and transmit the measurement result to the first node.

In the electronic device according to certain embodiments of the disclosure, before the preset time expires, the first communication processor may be configured to transmit the measurement result to the first node in response to reception of information indicating a need for data transmission/reception through the second cellular communication.

In the electronic device according to certain embodiments of the disclosure, after transmitting the measurement result, the first communication processor may be configured to transmit the configuration for the measurement of the quality of the second cellular communication to the second communication processor to allow the second communication processor to establish the second cellular communication in response to reception of a signal for the establishment of the second cellular communication within a preset time.

In the electronic device according to certain embodiments of the disclosure, the first communication processor may be configured to transmit the measurement result to the first node in response to reception of information indicating a need for data transmission/reception through the second cellular communication.

In the electronic device according to certain embodiments of the disclosure, the second communication processor may be configured to switch to a sleep state or a power-off state after releasing the establishment of the second cellular communication.

In the electronic device according to certain embodiments of the disclosure, before releasing the second cellular communication, the second communication processor may be configured to measure the quality of the second cellular communication according to reception of the configuration for the measurement of the quality of the second cellular communication.

In the electronic device according to certain embodiments of the disclosure, the first communication processor may be configured to store the measurement result transmitted by the second communication processor and transmit the measurement result to the first node in response to satisfaction of the preset condition by the electronic device.

In the electronic device according to certain embodiments of the disclosure, the first communication processor may be configured to transmit the configuration for the measurement of the quality of the second cellular communication to the second communication processor to allow the second communication processor to measure the quality of the second cellular communication in response to identification that the preset condition is satisfied in a state in which the second cellular communication is completely released.

In the electronic device according to certain embodiments of the disclosure, the first communication processor may be configured to determine that the preset condition is satisfied in response to identification that a remaining capacity of a battery of the electronic device is equal to or higher than a preset value, and transmit the measurement result to the first node.

Figure 9:
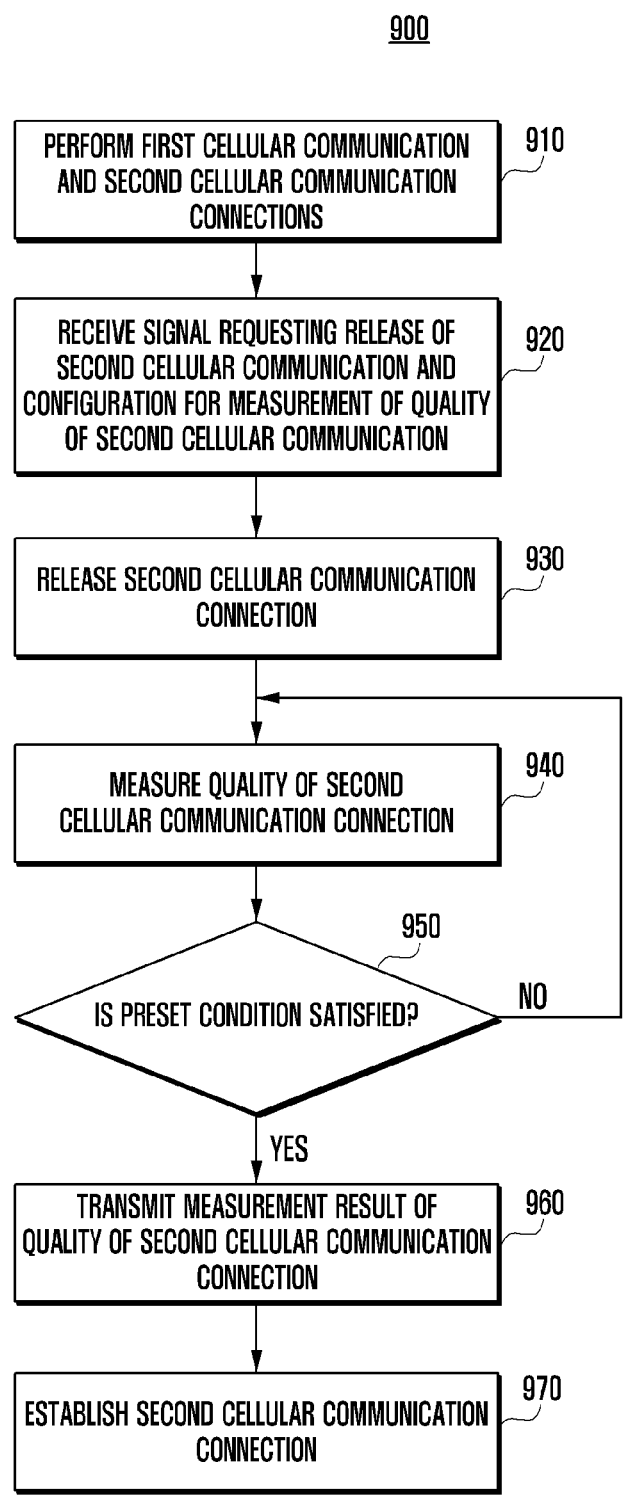
FIG. 9 is a flowchart illustrating a method of operating an electronic device according to certain embodiments of the disclosure.

FIG. 9 is a flowchart illustrating the method 700 of operating the electronic device according to certain embodiments of the disclosure.

According to certain embodiments of the disclosure, in operation 910, an electronic device (for example, the electronic device 101 of FIG. 5) may perform communication via a first cellular communication connection and second cellular communication connection.

According to certain embodiments of the disclosure, the electronic device 101 may control a first communication processor (for example, the first communication processor 520 of FIG. 5) to perform first cellular communication with a master node (for example, the master node 410 of FIG. 4A) and a second communication processor (for example, the second communication processor 530) to perform second cellular communication with a secondary node (for example, the secondary node 420 of FIG. 4A).

According to certain embodiments of the disclosure, in operation 920, the electronic device 101 may receive a configuration for measuring the quality of the second cellular communication, and a signal requesting release of the second cellular communication connection.

According to certain embodiments of the disclosure, the signal requesting release of the established second cellular communication connection may be included in an "RRC" connection reconfiguration signal. The RRC connection reconfiguration signal may include configuration data related to radio bearer configuration, measurement, result report, paging, or mobility management. The RRC connection reconfiguration signal may include configuration data related to measurement of the second cellular communication, result report, or radio bearer configuration. The RRC connection reconfiguration signal may include configuration data related to release of the second cellular communication or mobility management. The first communication processor 520 may receive the RRC connection reconfiguration signal and release establishment of the second cellular communication on the basis of the RRC connection reconfiguration signal. The first communication processor 520 may release the establishment of the second cellular communication on the basis of the RRC connection reconfiguration signal and transmit or receive data through the first cellular communication.

According to certain embodiments of the disclosure, the configuration for measurement of the second cellular communication may include a configuration for measurement of a quality of communication with a second cellular base station for the connection with the second cellular base station (for example, a configuration (configuration of event B1) including a reference of the quality of the communication with the second cellular base station to be included in a report transmitted to a first node for the connection with the second cellular base station). The first communication processor 520 may receive the configuration for the measurement of the quality of the second cellular communication and transmit the configuration for the measurement of the quality of the second cellular communication to the second communication processor 530.

According to certain embodiments of the disclosure, in operation 930, the electronic device 101 may release the second cellular communication connection in response to receiving the signal requesting release of the second cellular communication connection.

According to certain embodiments of the disclosure, in operation 940, the electronic device 101 may measure the quality of the second cellular communication connection (e.g., an average received signal strength indicator or average "RSSI") in response to reception of the configuration for the measuring the quality of the second cellular communication connection.

According to certain embodiments of the disclosure, in operations 930 and 940 may be performed regardless of sequences thereof. For example, operation 940 may be first performed, and then operation 930 may be performed. Alternatively, operations 930 and 940 may be performed in parallel. Alternatively, operation 930 may be first performed, and then operation 940 may be performed.

According to certain embodiments of the disclosure, the second communication processor 530 may switch to a sleep state or a power-off state while the release of the establishment of the second cellular communication is maintained. If the second communication processor 530 switches to the sleep state or the power-off state, the first communication processor 520 may transmit or receive data through the first cellular communication. The received measurement result may be stored in a memory of the first communication processor 520.

According to certain embodiments of the disclosure, in operation 950, the electronic device 101 may identify whether the electronic device 101 satisfies a preset condition.

According to certain embodiments of the disclosure, the preset condition may be a condition corresponding to a need for data transmission or reception through the second cellular communication. The first communication processor 520 may receive a signal indicating the need for data transmission or reception through the second cellular communication from the application processor 510 in response to reception of the signal indicating the need for data transmission or reception through the second cellular communication, the electronic device 101 may determine that the preset condition is satisfied and transmit the measurement result of the quality of the second cellular communication to the first node 410.

According to certain embodiments of the disclosure, the preset condition may include a condition corresponding to expiration of a time set to a timer in the first communication processor 520 or the second communication processor 530. The electronic device 101 may activate a timer in response to reception of a signal making a request for measuring the quality of the second cellular communication and a signal indicating release of the second cellular communication. The timer may be a component for generating an interrupt after a preset time. The timer may be implemented in the memory of the first communication processor 520 in software, but may also be implemented as a separate physical circuit. The timer may transmit the interrupt to the first communication processor 520 in response to identification that the preset time has passed after the timer is activated.

According to certain embodiments of the disclosure, the electronic device 101 may not transmit the measurement result of the quality of the second cellular communication to the first node 410 for a preset time set to the timer. After the time set to the timer has passed, the electronic device 101 may determine that the preset condition is satisfied and transmit the measurement result of the quality of the second cellular communication to the first node 410.

According to certain embodiments of the disclosure, in response to identification that data transmission or reception through the second cellular communication is needed before the time set to the timer has expired, the electronic device 101 may transmit the measurement result of the quality of the second cellular communication to the first node 410.

According to certain embodiments of the disclosure, the preset condition may include a condition related to the remaining capacity of a battery of the electronic device 101. For example, the condition related to the remaining capacity of the battery may be a condition corresponding to the remaining capacity of the battery that is higher than (or lower than) a preset value. The electronic device 101 may identify that the condition related to the remaining capacity of the battery is satisfied and transmit the measurement result of the quality of the second cellular communication to the first node 410.

According to certain embodiments of the disclosure, the preset condition may include a condition corresponding to at least two receptions of a specific message from the first node 410. The specific message may be an RRC connection reconfiguration signal including measurement configuration information of the quality of the second cellular communication if the first communication processor 520 receives again the RRC connection reconfiguration signal including a message indicating measurement of the quality of the second cellular communication from the first node 410, the first communication processor 520 may determine that the preset condition is satisfied and transmit the measurement result of the quality of the second cellular communication to the first node 410.

According to certain embodiments of the disclosure, the electronic device 101 may return to operation 940 in response to identification that the preset condition is not satisfied (e.g., "No" from operation 950).

According to certain embodiments of the disclosure, in operation 960, the electronic device 101 may transmit the results of the measurement, indicating the measured quality of the second cellular communication connection, to the master node 410, when and/or responsive to detecting that the preset condition is satisfied ("Yes" from operation 950).

According to certain embodiments of the disclosure, the electronic device 101 may withhold the received measurement result from the first node 410 pending further considerations. For example, the electronic device 101 may identify whether the electronic device 101 satisfies the preset condition, and transmit the measurement result to the first node 410 in response to detecting satisfaction of the preset condition.

According to certain embodiments of the disclosure, in operation 970, the electronic device 101 may reestablish the second cellular communication connection based on data transmitted by the master node 410.

A method of operating an electronic device according to certain embodiments of the disclosure may include an operation of receiving a configuration for measurement of a quality of second cellular communication and a signal indicating release of the second cellular communication from a first node performing first cellular communication with the electronic device by the first communication processor, an operation of releasing the second cellular communication by the second communication processor, an operation of transmitting a measurement result of the quality of the second cellular communication measured according to reception of the configuration for the measurement of the quality of the second cellular communication to the first communication processor by the second communication processor, and an operation of transmitting the measurement result to the first node in response to identification that the electronic device satisfies the preset condition by the first communication processor.

The method of operating the electronic device according to certain embodiments of the disclosure may further include an operation of determining that the preset condition is satisfied in response to identification that a time set to a timer implemented in the first communication processor has expired.

The method of operating the electronic device according to certain embodiments of the disclosure may further include an operation of, before the preset time expires, transmitting the measurement result to the first node by the first communication processor in response to reception of information indicating a need for data transmission/reception through the second cellular communication.

The method of operating the electronic device according to certain embodiments of the disclosure may further include an operation of, after transmitting the measurement result, transmitting a signal making a request for establishing the second cellular communication to the second communication processor by the first communication processor in response to reception of the signal making the request for establishing the second cellular communication within a preset time.

The method of operating the electronic device according to certain embodiments of the disclosure may further include an operation of transmitting the measurement result to the first node by the first communication processor in response to reception of information indicating a need for data transmission/reception through the second cellular communication.

The method of operating the electronic device according to certain embodiments of the disclosure may further include an operation of switching the second communication processor to a sleep mode or a power-off mode after releasing the establishment of the second cellular communication.

The method of operating the electronic device according to certain embodiments of the disclosure may further include an operation of measuring the quality of the second cellular communication according to reception of the configuration for the measurement of the quality of the second cellular communication by the second communication processor before releasing the second cellular communication.

The method of operating the electronic device according to certain embodiments of the disclosure may further include an operation of storing the measurement result transmitted by the second communication processor, by the first communication processor, and an operation of transmitting the measurement result to the first node by the first communication processor in response to satisfaction of the preset condition by the electronic device.

The method of operating the electronic device according to certain embodiments of the disclosure may further include an operation of transmitting the configuration for the measurement of the quality of the second cellular communication to the second communication processor to allow the second communication processor to measure the quality of the second cellular communication by the first communication processor in response to identification that the preset condition is satisfied in a state in which the second cellular communication is completely released.

The method of operating the electronic device according to certain embodiments of the disclosure may further include an operation of, in response to identification that a remaining capacity of a battery of the electronic device is equal to or higher than a preset value, determining that the preset condition is satisfied and transmitting the measurement result to the first node by the first communication processor.

Figure 10:
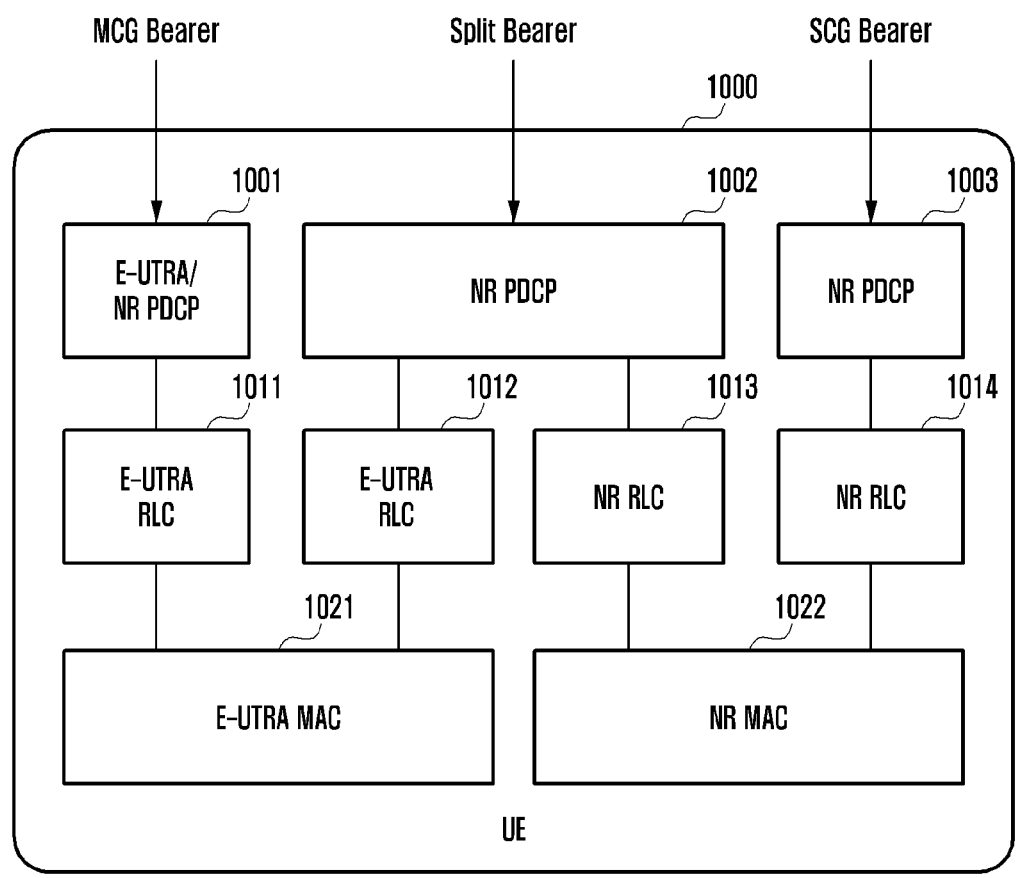
FIG. 10 illustrates bearers in an electronic device according to various embodiments of the disclosure.

FIG. 10 illustrates bearers in an electronic device (for example, the electronic device 101 of FIG. 1) according to various embodiments of the disclosure.

Available bearers in a 5G non-standalone network environment may include a master cell group (MCG) bearer, a secondary cell group (SCG) bearer, and a split bearer. An E-UTRA/NR packet data convergence protocol (PDCP) entity 1001 and NR PDCP entities 1002 and 1003 may be configured in an electronic device (user equipment) 1000. E-UTRA radio link control (RLC) entities 1011 and 1012 and NR RLC entities 1013 and 1014 may be configured in the electronic device 1000. An E-UTRA. MAC entity 1021 and an NR MAC entity 1022 may be configured in the electronic device 1000. The electronic device may indicate a user device capable of communicating with a BS (for example, the master node 410 or the secondary node 420 of FIG. 4A).

The MCG may correspond to, for example, the master node (MN) 410 of FIG. 4A, and the SCG may correspond to, for example, the secondary node (SN) 420 of FIG. 4A. When a node for communication is determined, the electronic device 1000 may configure various entities illustrated in FIG. 10 for communication with the determined node (for example, the BS). PDCP layer entities 1001, 1002, and 1003 may receive data (for example, a PDCP SDU corresponding to an IP packet) and output converted data (for example, a PDCP protocol data unit (PDU)) reflecting additional information (for example, header information). RLC layer entities 1011, 1012, 1013, and 1014 may receive the converted data (for example, the PDCP PDU) output from the PDCP layer entities 1001, 1002, and 1003 and output converted data (for example, an RLC PDU) reflecting additional information (for example, header information). MAC layer entities 1021 and 1022 may receive the converted data (for example, the RLC PDU) output from the RLC layer entities 1011, 1012, 1013, and 1014, output converted data (for example, a MAC PDU) reflecting additional information (for example, header information), and transfer the data to a physical layer (not shown).

The MCG bearer may be connected to a path (or data) for transmitting and receiving data through resources and entities corresponding to the MN in dual connectivity (DC). The SCG bearer may be connected to a path (or data) for transmitting and receiving data through resources or entities corresponding to the SN in dual connectivity. The split bearer may be connected to a path (or data) for transmitting and receiving data through resources or entities corresponding to the MN and resources or entities corresponding to the SN in dual connectivity. Accordingly, as illustrated in FIG. 10, the split bearer may be connected to all of the E-UTRA RLC entity 1012, the NR RLC entity 1013, the E-UTRA MAC entity 1021, and the NR MAC entity 1022 via the NR PDCP entity 1002.

Although EN-DC is described as a detailed example of the dual connectivity, the dual connectivity is not limited to the EN-DC described in the disclosure and may be applied to various forms of dual connectivity.

Figure 11A:
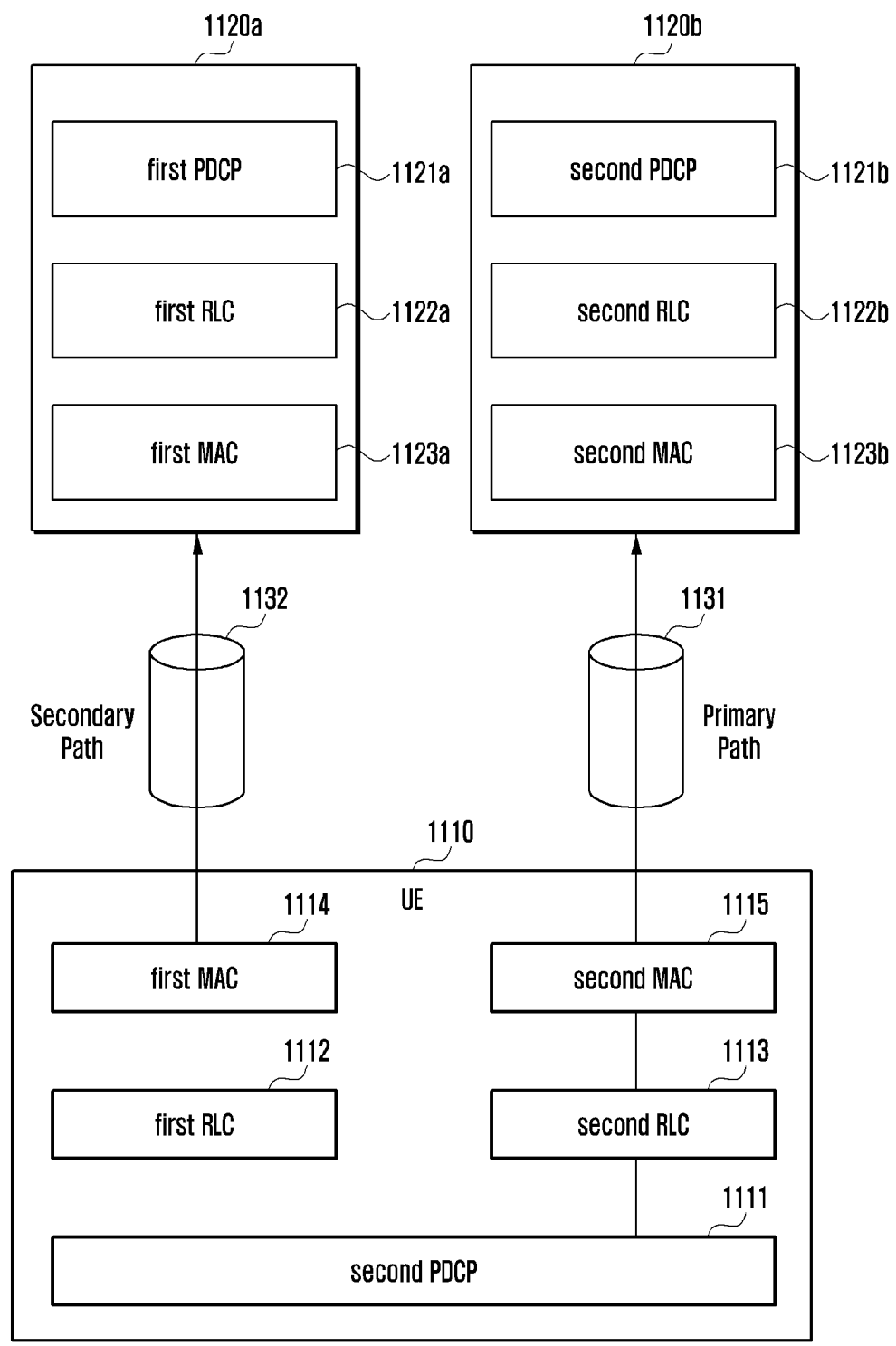
FIG. 11A illustrates an uplink path between an electronic device and BSs according to various embodiments.

FIG. 11A illustrates an uplink path between an electronic device and BSs according to various embodiments.

An electronic device 1110 (for example, the electronic device 101) according to various embodiments may communicate with BSs 1120a and 1120b on the basis of the split bearer in FIG. 11A. Accordingly, transmission data (for example, IP packets), which should be transmitted from the electronic device 1110 to the BSs 1120a and 1120b, may be transmitted to a second RLC entity 1113 and a second MAC entity 1115 or a first RLC entity 1112 and a first MAC entity 1114 via a second PDCP entity 1111. For example, the first RLC entity 1112 and the first MAC entity 1114 may be connected to a first network, and the second RLC entity 1113 and the second MAC entity 1115 may be connected to a second network. The first BS 1120a may configure a first PDCP entity 1121a, a first RLC entity 1122a, and a first MAC entity 1123a. The second BS 1120b may configure a second PDCP entity 1121b, a second RLC entity 1122h, and a second MAC entity 1123b. A path connected to the second RLC entity 1113 and the second MAC entity 1115 of the electronic device 1110 may be a primary path 1131, and a path connected to the first RLC entity 1112 and the first MAC entity 1114 may be a secondary path 1132. The first PDCP entity 1121a may be implemented equally to the second PDCP entity 1121b. For example, in order to implement EN-DC, the first PDCP entity 1121a may be configured as an NR PDCP entity when the BS 1120a is an LTE eNB. According to various embodiments, a specific PDCP entity (for example, the NR PDCP entity) may be in the BS 1120a or the BS 1120b. When the split bearer is configured, at least one of the first PDCP entity 1121a or the second PDCP entity 1121b may transmit data to a core network. According to various embodiments, one of the first PDCP entity 1121a or the second PDCP entity 1121b may not exist. The BS 1120a and the BS 1120b may perform direct communication with each other.

The first network and the second network may be any network if the network is capable of performing dual connectivity. For example, the first network and the second network may correspond to LTE communication and NR communication, respectively. For example, both the first network and the second network are associated with LTE communication, and the second network may be a network corresponding to a small cell of a specific frequency. For example, both the first network and the second network are associated with 5G. The first network may correspond to a frequency band (for example, below 6) lower than 6 GHz, and the second network may correspond to a frequency band (for example, over 6) higher than or equal to 6 GHz.

The electronic device 1110 according to various embodiments may transmit transmission data to the BSs 1120a and 1120b through at least one of the first network and the second network on the basis of the split bearer. The electronic device 1110 according to various embodiments may configure the second network connected to the second BS 1120b corresponding to the SCG as a primary path 1131 and configure the first network connected to the first BS 1120a corresponding to the MCG as a secondary path 1132. For example, the electronic device 1110 may configure the second network connected to the SCG as the primary path 1131 on the basis of information indicating the primary path received from the MN. For example, the information indicating the primary path received from the MN may be received while being included in an RRC signal (for example, RRCReconfiguration). According to another embodiment, there is no limitation on a scheme in which the electronic device 1110 configures the primary path. The primary path may be determined on the basis of, for example, a policy of each communication service provider, and the electronic device 1110 may receive information indicating the primary path and identify the primary path. The primary path may indicate a cell group ID and an LCID of a primary RLC entity for uplink data transmission in the case in which the PDCP entity is associated with the RLC entity. The second PDCP entity 1121b may be included in the BS 1120a having the primary path. According to various embodiments, the first PDCP entity 1121a may be included in the BS 1120b having the secondary path.

The electronic device 1110 according to various embodiments may change an uplink path from a path corresponding to the SCG, which is the primary path 1131, to a path corresponding to the MCG, which is the secondary path 1132, and accordingly may transmit data to the BS 1120a via the path corresponding to the MCG. For example, at least one communication processor (for example, at least one of the first communication processor 212 or the second communication processor 214, or the integrated communication processor 260) of the electronic device 101 may transmit data to the BS via the path connected to the SCG by connecting a transmission PDCP entity to one RLC entity (for example, RLC entity).

Figure 11B:
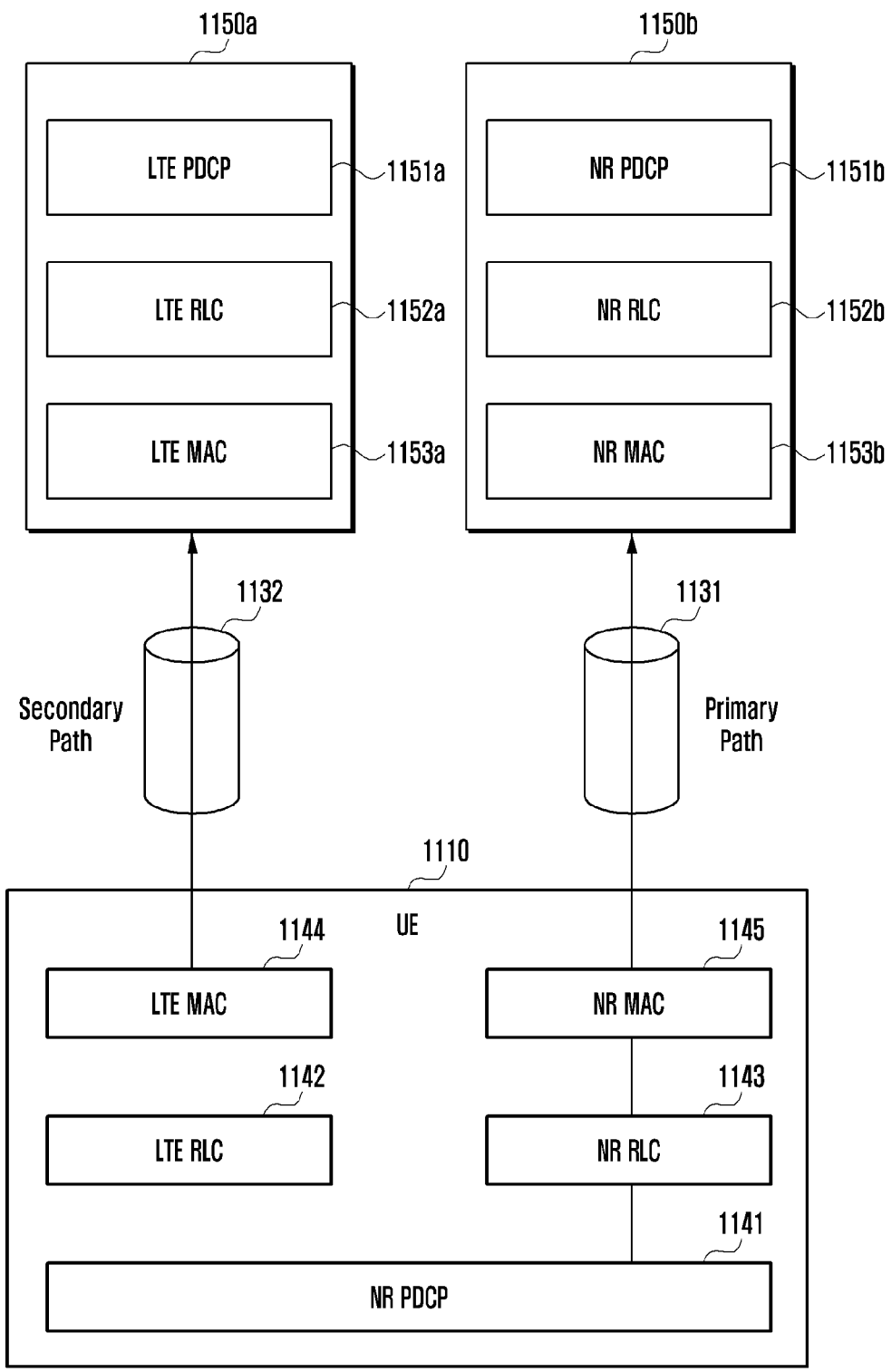
FIG. 11B illustrates a path between the electronic device and the BS when the split bearer is configured in EN-DC according to various embodiments.

FIG. 11B illustrates a path between the electronic device and the BS when the split bearer is configured in EN-DC according to various embodiments.

The electronic device 1110 according to various embodiments may configure the split bearer in EN-DN, and accordingly an NR PDCP entity 1141 may be connected to an LTE RLC entity 1142 and an NR RLC entity 1143. The LTE RLC entity 1142 may be connected to an LTE MAC entity 1144, and the NR RLC entity 1143 may be connected to an NR MAC entity 1145. An NR MAC entity 1153b of the BS 1150b may correspond to the NR MAC entity 1145, and an LTE MAC entity 1153a of the BS 1150a may correspond to the LTE MAC entity 1144. An LTE PDCP entity 1151a of the BS 1150a may be connected to an LTE RLC entity 1152a, and an NR PDCP entity 1151b of the BS 1150b may be connected to an NR RLC entity 1152b. The LTE RLC entity 1152a may be connected to the LTE MAC entity 1153a, and The NR RLC entity 1152b may be connected to the NR MAC entity 1153b. An NR network may be configured as the primary path 1131, and an LTE network may be configured as the secondary path 1132. In EN-DC, it is mentioned in the standard that the LTE PDCP entity 1151a is configured in the case of the BS 1150a of LTE. Particularly, for the split bearer, the LTE PDCP entity 1151a should be configured in the BS 1150a of LTE. The NR PDCP entity may be in the BS 1150a of LTE or the BS 1150b of NR. In the case of the split bearer, at least one of the NR PDCP entity 1151a of the BS 1150a of LTE and the NR PDCP entity 1151b of the BS 1150b of NR may transmit data to the core network. Effectively, it may be advantage that the NR PDCP entity 1151b is configured in the primary path 1131. However, the NR PDCP entity 1151a can also be configured in the BS 1150a of LTE. Further, the BS 1150a of LTE and the BS 1150b of NR may directly transmit and receive data to and from each other. Meanwhile, as described above, various embodiments of various DCs can be applied as well as the EN-DC illustrated in FIG. 11B.

Figure 12A:
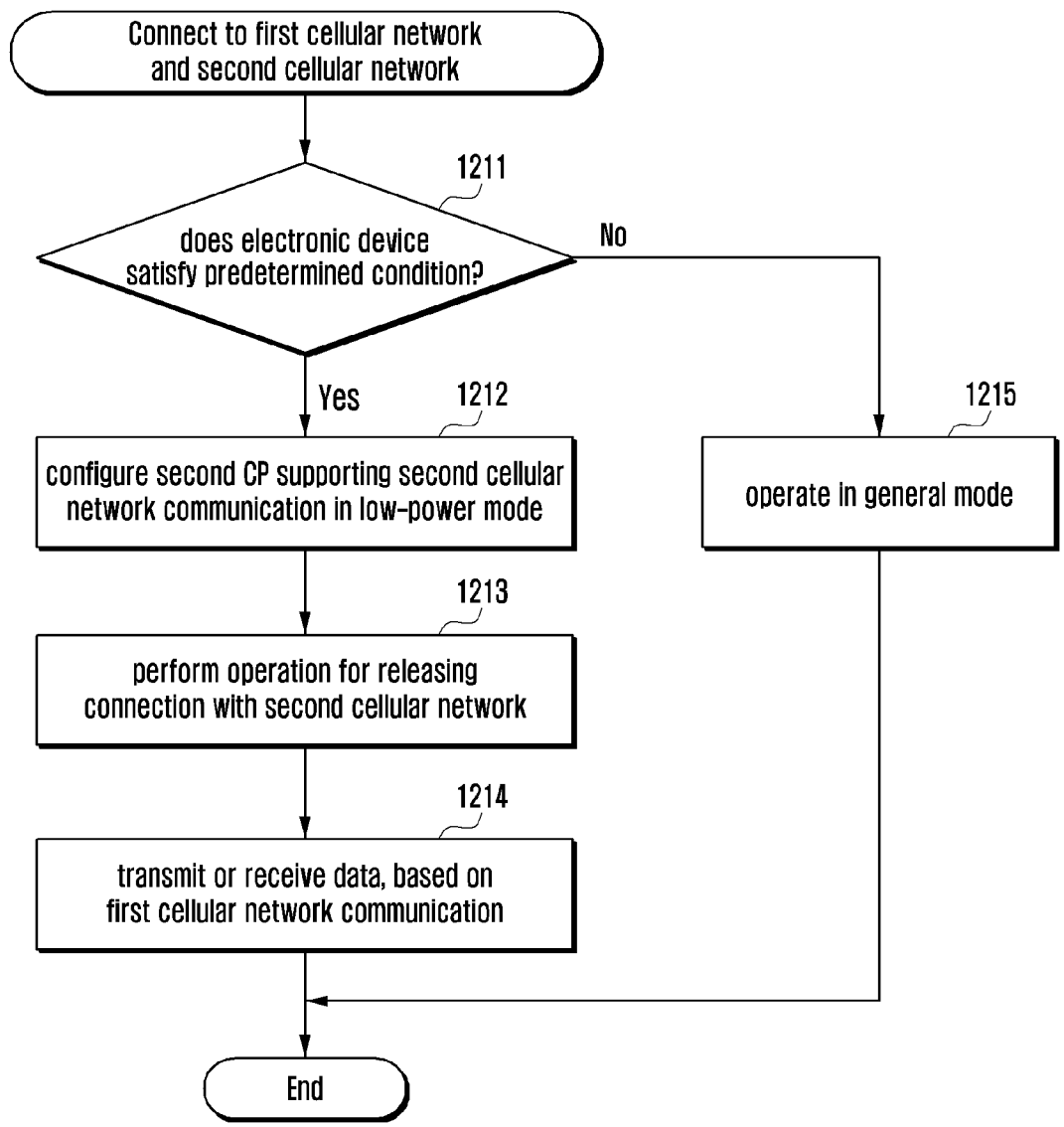
FIG. 12A is a flowchart illustrating a method of operating an electronic device according to various embodiments.

FIG. 12A is a flowchart illustrating a method of operating an electronic device according to various embodiments. Referring to FIG. 12A, the electronic device 101 according to various embodiments may be connected a first cellular network and a second cellular network. According to various embodiments, the first cellular network may be an LTE communication network, and the second cellular network may be a 5G (NR) communication network. According to various embodiments, although it is described that networks connected to the electronic device 101 are a first cellular network and a second cellular network, there is no limitation on the types of networks connected to the electronic device 101.

For example, the electronic device 101 may be connected to a BS supporting a first frequency band (for example, sub-6 GHz) in a second cellular network through the second communication processor 214 and the second antenna module 244 of FIG. 2 and connected to a BS supporting a first cellular network (for example, LTE) through the first communication processor 212 and the first antenna module 242 of FIG. 2. In another example, the electronic device may be connected to a BS supporting a first frequency band (for example, sub-6 GHz) in a second cellular network through the second communication processor 214 and the second antenna module 244 of FIG. 2A and connected to a BS supporting a second frequency band (for example, mmWave) in the second cellular network through the second communication processor 214 and the third antenna module 246 of FIG. 2. In another example, the electronic device may be connected to a BS supporting a third frequency band (for example, a band of 1.8 GHz) and a BS supporting a fourth frequency band (for example, a band of 3.5 GHz) in a second cellular network through the second communication processor 214 and the second antenna module 244 of FIG. 2.

According to various embodiments, the connection state of the first cellular network and the second cellular network may include a radio resource control (RRC)-connected state in which data can be transmitted. The electronic device 101 may be connected to the first cellular network through the first communication processor 212 supporting first cellular network communication and connected to the second cellular network through the second communication processor 214 supporting second cellular network communication.

According to various embodiments, if the electronic device 101 satisfies a predetermined condition in operation 1211, the electronic device 101 (for example, the processor 120, the first communication processor 212, the second communication processor 214, or the integrated communication processor 260) may configure a low-power mode in operation 1212. According to various embodiments, the low-power mode may be a low-power mode that targets the second communication processor 214 supporting the second cellular network (for example, 5G network) communication. The low-power mode may be a mode of releasing the connection of the second cellular network and switching (or maintaining) the second communication processor 214 in a sleep state or a power-off state.

According to various embodiments, the predetermined condition may include a condition that the size of a packet of transmitted data or received data is equal to or smaller than a preset value. If the packet size of the transmitted data or the received data is equal to or smaller than a preset first size (or size value), the low-power mode may be configured. For example, if the packet size of the data transmitted by the electronic device 101 is equal to or smaller than 10 kB, the low-power mode may be configured. According to various embodiments, if traffic throughput of the transmitted or received data per unit time is equal or smaller than a preset second value, the low-power mode may be configured. For example, if traffic throughput per unit time of data transmitted or received by the electronic device 101 for a predetermined time is equal to or smaller than 40 Mbps, the low-power mode may be configured. According to various embodiments, the predetermined condition is a condition related to temperature of the electronic device 101 and may include a condition that the temperature of the electronic device 101 is higher than or equal to a preset value. The processor 120 may receive temperature measured by a sensor module (for example, the sensor module 176 of FIG. 1) that measures temperature of the electronic device 101 and compare the measured temperature with a preset value. The processor 120 may configure the low-power mode in response to identification that the measured temperature is higher than or equal to a preset value.

According to various embodiments, the predetermined condition is a condition related to a battery of the electronic device 101 and may include a condition that the remaining battery power of the electronic device 101 is equal to or smaller than a preset value (for example, 15% of the fully charged battery). The processor 120 may configure the low-power mode in response to identification that the remaining battery power is equal to or smaller than a preset value.

According to various embodiments, the predetermined conditions may be variously configured, and every predetermined condition may have a priority. The operation of the second communication processor 214 may be different under the respective predetermined conditions while the second cellular network is connected. If a predetermined condition having a relatively high priority, the second communication processor 214 may operate in the low-power mode corresponding to the condition having the relatively high priority.

According to various embodiments, the configuration of the low-power mode may be determined by the processor 120, and the configured information may be transmitted to at least one of the first communication processor 212, the second communication processor 214, or the integrated communication processor 260. According to various embodiments, the configuration of the low-power mode may be directly determined by at least one of the first communication processor 212, the second communication processor 214, or the integrated communication processor 260. According to various embodiments, if the configuration of the low-power mode is determined by at least one of the first communication processor 212, the second communication processor 214, or the integrated communication processor 260, information on the configuration of the low-power mode may be transmitted to the processor 120.

According to various embodiments, the configuration of the low-power mode may be determined by the processor 120 and transferred to the first communication processor 212 or the second communication processor 214. For example, the processor 120 may transmit a flag corresponding to the configuration of the low-power mode to the first communication processor 212 or the second communication processor 214. According to various embodiments, the processor 120 may transmit the packet size of data or traffic throughput of the transmitted or received data per unit time for determining the low-power mode to the first communication processor 212 or the second communication processor 214, and the first communication processor 212 or the second communication processor 214 may determine whether to configure the low-power mode on the basis of the value received from the processor 120.

According to various embodiments, at least one of the first communication processor 212, the second communication processor 214, or the integrated communication processor 260 may directly calculate the packet size of data or traffic throughput of the transmitted or received data per unit time and determine whether to configure the low-power mode on the basis of the calculation result.

According to various embodiments, the electronic device 101 may configure the low-power mode when a predetermined condition is satisfied if a display (for example, the display device 160 of FIG. 1) is in an off state (for example, if the screen is turned off). For example, if the packet size of the transmitted data or the received data is equal to or smaller than a preset first size while the display of the electronic device 101 is turned off, it may mean that a relatively small size packet is continuously generated by an app operating in a background. According to various embodiments, it is possible to reduce power consumption of the electronic device 101 generated by the transmitted/received packet in the app operating in the background by restricting the operation of the second communication processor 214.

According to various embodiments, the state of the display of the electronic device 101 may be determined on the basis of inter-process communication (IPC) information that can be acquired by a processor (for example, the processor 120, the first communication processor 212, the second communication processor 214, or the integrated communication processor 260). According to various embodiments, if the state of the display switches from an off state to an on state, the configuration of the low-power mode may be released if the state of the display frequently switches from an off state to an on state, a separate timer may be configured to prevent frequently switching of the configuration of the low-power mode.

According to various embodiments, if the electronic device 101 is configured in the low-power mode in operation 1212, the electronic device 101 may perform at least one operation for releasing the connection of the connected second cellular network in operation 1213. According to various embodiments, at least one operation for releasing the connection of the second cellular network may include an operation for transmitting a measurement report of a first type event that is configured to be reported when a signal of the currently served node is smaller than a specific value.

For example, the electronic device 101 according to various embodiments may receive a first message indicating a report of measurement information when the first type event is generated. For example, the first type event may be "serving becomes worse than threshold: A2". The electronic device 101 may receive a first message (for example, RRC connection Reconfiguration) indicating a report condition from, for example, the MN node (for example, the master node 410 of FIG. 4A) (or the MCG). The electronic device 101 may measure information related to the SN (for example, the secondary node 420 of FIG. 4A) (or the SCG) designated by the first message and, if it is identified that the report condition is satisfied, may be configured to transmit a report message to the master node 410. Thereafter, the electronic device 101 may transmit data through an uplink path connected to the SCG. According to various embodiments, the electronic device 101 may induce the master node to stop communication with the corresponding SCG regardless of generation of the first type event. According to various embodiments, the electronic device 101 may be configured to report a measurement result when the signal of the currently served node is smaller than a specific value. According to various embodiments, the electronic device 101 may transmit a fake measurement report in response to detection of event A2 by an RRC layer even if event A2 is not detected.

According to various embodiments, at least one operation for releasing the RRC connection with the second cellular network may include an operation for transmitting a specific report having a measurement result of a physical (PHY) layer related to the channel state, which is configured as a predetermined value smaller than a threshold value, at least once. For example, the electronic device 101 may configure a channel quality indicator (CQI) among parameters included in a CSI report as 0 and report the MI regardless of the current channel state measured in the physical layer.

According to various embodiments, when reporting the CSI, the electronic device 101 may configure various parameters (for example, reference signal received power (RSRP), received signal strength indicator (RSSI), reference signal received quality (RSRQ), signal to interference noise ratio (SINR), and rank index (RI)) measured in the physical layer to be relatively lower than the actually measured value or configure various parameters to be the minimum and report the same.

According to various embodiments, the electronic device 101 may configure a power headroom (PH) value and a buffer state (BS) value transmitted by a power headroom report (PHR) or a buffer state report (BSR) by a MAC layer to be relatively lower than the actually measured value or configure the PH value and the BS value to be the minimum and report the same. As the electronic device 101 measures a value different from the actually measured value and transmits a fake measurement report, the network may induce release of the RRC connection between the electronic device 101 and the second cellular network.

According to various embodiments, a plurality of operations may be selected from the above-described various operations for releasing the RRC connection with the second cellular network and gradually applied, or all of the operations may be applied. For example, if the electronic device 101 cannot receive the release of the RRC connection from the network within a predetermined time after the fake measurement result is first transmitted in response to detection of event A2 in the RRC layer, the electronic device 101 may report at least one channel-related parameter included in the CSI report on the basis of a value different from the currently measured value in the physical layer.

According to various embodiments, if the electronic device does not receive the release of the RRC connection with the second cellular network within a specific time even though the various operations are selectively or gradually executed, the electronic device may make the report again on the basis of the actually measured value.

According to various embodiments, operation 1212 may be omitted. For example, if the amount of transmitted or received data satisfies a predetermined condition in operation 1211, the electronic device 101 may perform at least one operation for releasing the connection with the second cellular network in operation 1213 without any configuration operation of the low-power mode.

According to various embodiments, the second communication processor 214 may wait for completion of data transmission or reception without proceeding to operation 1213 in response to identification that the predetermined condition related to traffic throughput of the data is satisfied. The second communication processor 214 may proceed to operation 1213 regardless of whether data transmission or reception is completed in response to identification that a condition related to the remaining battery power or a predetermined condition related to temperature of the electronic device 101 is satisfied. The predetermined condition related to the remaining battery power, the predetermined condition related to temperature of the electronic device 101, and the predetermined condition related to traffic throughput of data may have different priorities. For example, the predetermined condition related to the remaining battery power and the condition related to temperature of the electronic device 101 may have a higher priority than the predetermined condition related to traffic throughput of data. The electronic device 101 may proceed to operation 1213 regardless of whether data transmission or reception is completed in response to identification that all of the predetermined condition related to the remaining battery power, the condition related to temperature of the electronic device 101, and the predetermined condition related to traffic throughput of data are satisfied in the state in which data is received or transmitted through the second cellular network. The electronic device 101 may proceed to operation 1213 after data transmission or reception is completed in response to identification that the predetermined condition related to traffic throughput of data is satisfied in the state in which data is received or transmitted through the second cellular network.

According to various embodiments, if the RRC connection with the second cellular network is released due to at least one operation for releasing the connection with the second cellular network in operation 1213, the electronic device 101 may transmit or receive data on the basis of first cellular network (for example, LTE communication network) communication in operation 1214.

According to various embodiments, in response to the configuration of the low-power mode, at least one operation for releasing the RRC connection with the second cellular communication through the second communication processor may be performed, and when the RRC connection with the second cellular network is released, the electronic device 101 may be configured to switch the second communication processor 214 from an awake state to a sleep state. According to various embodiments, the sleep state of the second communication processor may include a state configured to stop at least one function of the second communication processor.

According to various embodiments, if data throughput of transmitted data or received data does not satisfy the predetermined condition in operation 1211, the electronic device 101 may operate in a general mode rather than the low-power mode in operation 1215. The general mode may include a normal operation procedure of the electronic device 101 operating in the EN-DC environment.

Operations 1211 to 1214 for entry into the low-power mode may not be implemented according to the configuration of the processor 120. The processor 120 may configure the low-power mode according to a user selection and transmit a signal indicating whether to configure the low-power mode to the first communication processor 212 and/or the second communication processor 214. The first communication processor 212 and the second communication processor 214 may perform operations 1211 to 1214 in the state in which the low-power mode is configured. The first communication processor 212 and the second communication processor 214 may not perform operations 1211 to 214 regardless of whether or not the predetermined condition is satisfied in the state in which the low-power mode is not configured.

According to various embodiments, processor 120, the first communication processor 212, and/or the second communication processor 214 may activate the second cellular communication network in order to perform a specific service (for example, a service that needs a fast data transmission rate or reception rate, for example, a game-related service, a service for measuring a data transmission rate or reception rate, or a service designated by the user) in the state in which the low-power mode is configured. To this end, the processor 120 may detect activation of the specific service and activate the second communication processor 214. The second communication processor 214 may make the connection with a BS supporting the second cellular communication network and transmit or receive data corresponding to the specific service.

Figure 12B:
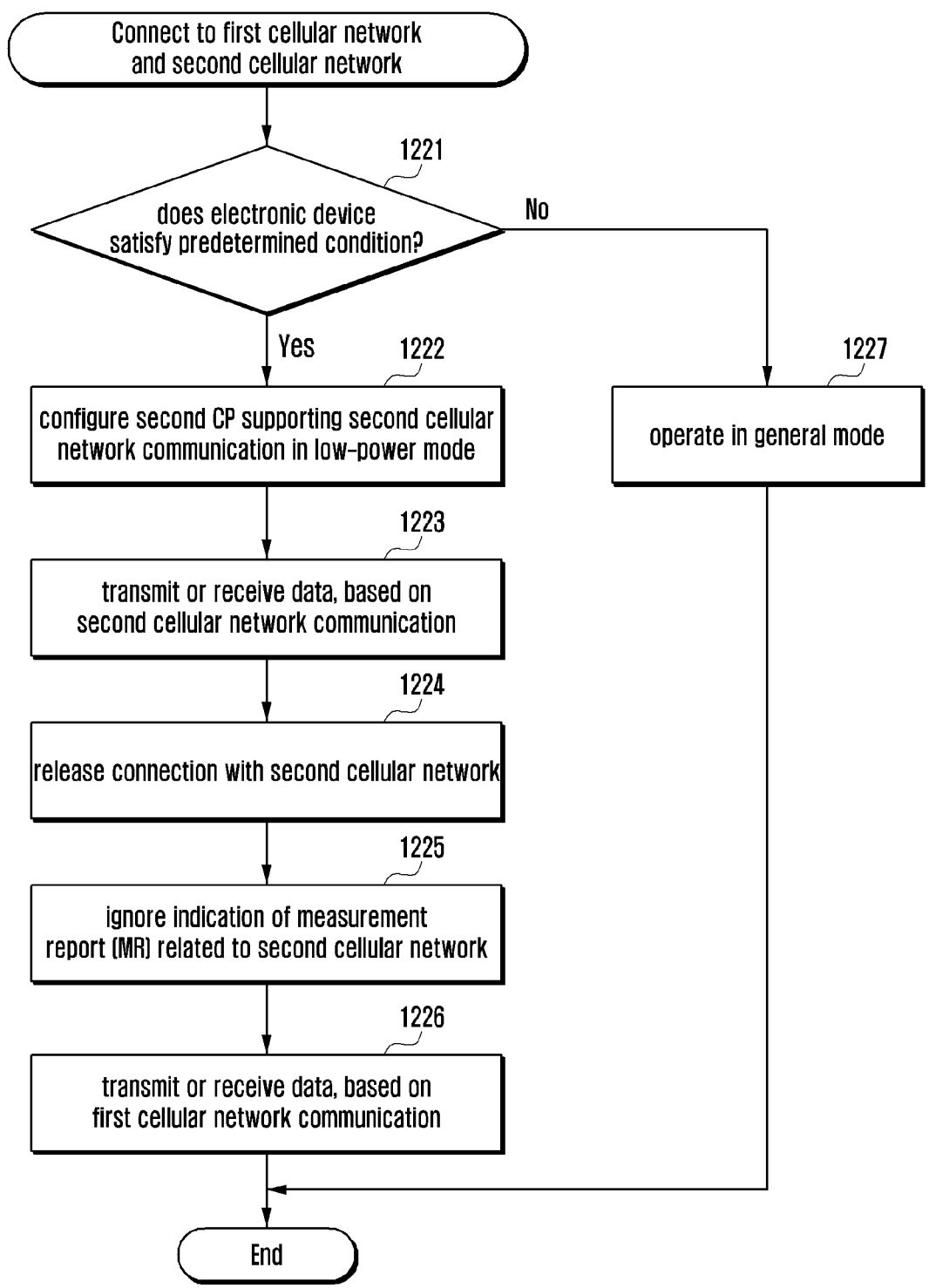
FIG. 12B is a flowchart illustrating a method of operating the electronic device according to various embodiments.

FIG. 12B is a flowchart illustrating a method of operating the electronic device according to various embodiments. At least some of the description of FIG. 12A above may be equally applied to the description of FIG. 12B below, and the overlapping description of FIG. 12A will be omitted. Referring to FIG. 12B, the electronic device 101 according to various embodiments may be connected to the first cellular network and the second cellular network. According to various embodiments, the first cellular network may be an LTE communication network, and the second cellular network may be a 5G (NR) communication network. According to various embodiments, the electronic device may be connected to a BS supporting a first frequency band in the second cellular network through the second communication processor 214 and the second antenna module 244 of FIG. 2A and connected to a BS supporting the first cellular network through the first communication processor 212 and the first antenna module 242 of FIG. 2. According to various embodiments, the electronic device may be connected to the BS supporting the first frequency band in the second cellular network through the second communication processor 214 and the second antenna module 244 of FIG. 2 and connected to a BS supporting a second frequency band (for example, mmWave) in the second cellular network through the second communication processor 214 and the third antenna module 246 of FIG. 2. According to various embodiments, the electronic device may be connected to the BS supporting the first frequency band in the second cellular network through the second communication processor 214 and the second antenna module 244 of FIG. 2 and connected to a BS supporting a third frequency band different from the first frequency band in the second cellular network through the second communication processor 214 and the second antenna module 244 of FIG. 2. According to various embodiments, the connection state of the first cellular network and the second cellular network may include a radio resource control (RRC)-connected state in which data can be transmitted. The electronic device 101 may be connected to the first cellular network through the first communication processor 212 supporting first cellular network communication and connected to the second cellular network through the second communication processor 214 supporting second cellular network communication.

According to various embodiments, if the electronic device 101 (for example, the processor 120, the first communication processor 212, the second communication processor 214, or the integrated communication processor 260) satisfies a predetermined condition in operation 1221, the electronic device 101 may configure the low-power mode in operation 1222. According to various embodiments, the low-power mode may be a low-power mode that targets the second communication processor 214 supporting the second cellular network (for example, 5G network) communication. In operation 1222, the configuration of the low-power mode may be performed according to the embodiments described with reference to FIG. 12A

According to various embodiments, in operation 1223, the electronic device 101 may transmit or receive data on the basis of the connected second cellular network communication. According to various embodiments, in operation 1223, the electronic device 101 may perform a normal operation (for example, an operation for reporting the measurement result to the BS) even though the low-power mode is currently configured. According to various embodiments, after data transmission or reception is completed, the electronic device 101 may release the connection with the second cellular network in operation 1224.

According to various embodiments, the electronic device 101 may perform an operation for maintaining the release of the connection with the second cellular network in response to the configuration of the low-power mode. According to various embodiments, even if the electronic device 101 receives an indication of a measurement report related to the second cellular network from the first cellular network, the electronic device 101 may ignore the indication and does not report it in operation 1225, thereby maintaining the release of the connection with the second cellular network.

According to various embodiments, the electronic device 101 may transmit or receive data on the basis of the first cellular network (for example, LTE communication network) communication in operation 1226.

According to various embodiments, in response to the configuration of the low-power mode, the electronic device 101 may be configured to maintain the sleep state of the second communication processor 214 or switch the second communication processor 214 from the awake state to the sleep state in the state in which the release of the RRC connection with the second cellular network through the second communication processor is maintained.

According to various embodiments, if data throughput of transmitted data or received data does not satisfy the predetermined condition in operation 1221, the electronic device 101 may operate in a general mode rather than the low-power mode in operation 1227. The general mode may include a normal operation procedure of the electronic device 101 operating in the EN-DC environment.

Figure 13A:
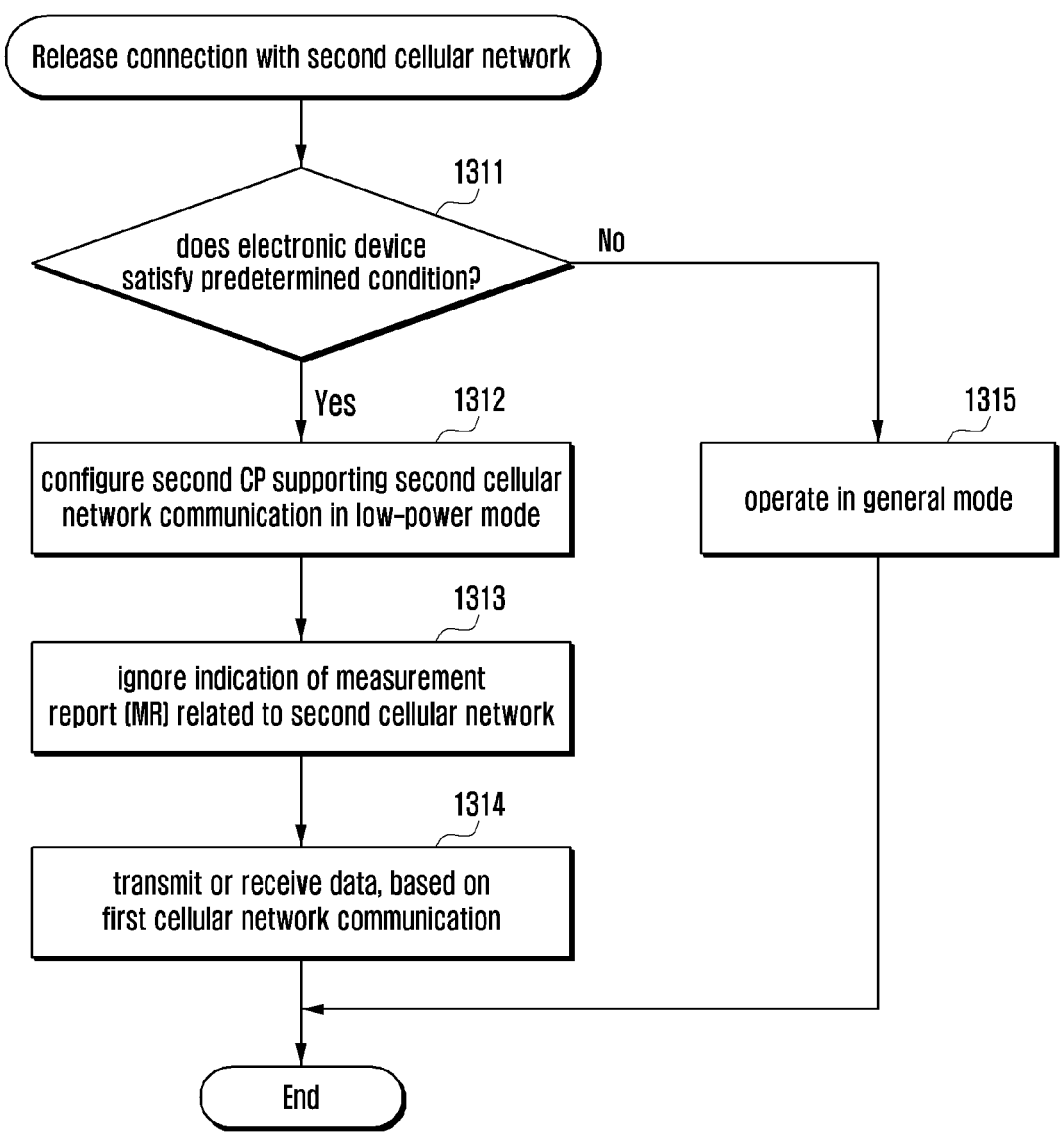
FIG. 13A is a flowchart illustrating a method of operating an electronic device according to various embodiments.

FIG. 13A is a flowchart illustrating a method of operating an electronic device according to various embodiments. Referring to FIG. 13A, the electronic device 101 may be connected to the first cellular network, and the connection with the second cellular network may be released. According to various embodiments, all of the connections of the electronic device 101 with the first cellular network and the second cellular network may be released. According to various embodiments, the first cellular network may be an LTE communication network, and the second cellular network may be a 5G (NR) communication network. According to various embodiments, although it is described that networks connected to the electronic device 101 are a first cellular network and a second cellular network, there is no limitation on the types of networks connected to the electronic device 101.

For example, the electronic device 101 may not be connected to a BS supporting a first frequency band (for example, sub-6 GHz) in a second cellular network through the second communication processor 214 and the second antenna module 244 of FIG. 2 and connected to a BS supporting a first cellular network (for example, LTE) through the first communication processor 212 and the first antenna module 242 of FIG. 2. In another example, the electronic device may not be connected to a BS supporting a first frequency band (for example, sub-6 GHz) in a second cellular network through the second communication processor 214 and the second antenna module 244 of FIG. 2 and connected to a BS supporting a second frequency band (for example, mmWave) in the second cellular network through the second communication processor 214 and the third antenna module 246 of FIG. 2. In another example, the electronic device may be connected to a BS supporting a third frequency band (for example, a band of 1.8 GHz) and may not be connected to a BS supporting a fourth frequency band (for example, a band of 3.5 GHz) in the second cellular network through the second communication processor 214 and the second antenna module 244 of FIG. 2.

According to various embodiments, the connection state or the connection-released state of the first cellular network and the second cellular network may include a radio resource control (RRC)-connected state in which data can be transmitted or an RRC connection-released state in which data cannot be transmitted. The electronic device 101 may be connected to the first cellular network through the first communication processor 212 supporting first cellular network communication and connected to the second cellular network through the second communication processor 214 supporting second cellular network communication.

According to various embodiments, if the electronic device 101 (for example, the processor 120, the first communication processor 212, the second communication processor 214, or the integrated communication processor 260) satisfies a predetermined condition in operation 1311, the electronic device 101 may configure the low-power mode in operation 1312. According to various embodiments, the low-power mode may be a low-power mode that targets the second communication processor 214 supporting the second cellular network (for example, 5G network) communication.

According to various embodiments, it the packet size of the transmitted data or the received data is equal to or smaller than a preset first size, the electronic device 101 may be configured in the low-power mode. For example, if the packet size of data transmitted by the electronic device 101 is equal to or smaller than 10 kB, the electronic device 101 may configure the low-power mode. According to various embodiments, if traffic throughput of the transmitted or received data per unit time is equal or smaller than a preset second value, the low-power mode may be configured. For example, if traffic throughput per unit time of data transmitted or received by the electronic device 101 for a predetermined time is equal to or smaller than 40 Mpbs, the low-power mode may be configured.

According to various embodiments, the predetermined condition is a condition related to temperature of the electronic device 101 and may include a condition that the temperature of the electronic device 101 is higher than or equal to a preset value. The processor 120 may receive temperature measured by a sensor module (for example, the sensor module 176 of FIG. 1) that measures temperature of the electronic device 101 and compare the measured temperature with a preset value. The processor 120 may configure the low-power mode in response to identification that the measured temperature is higher than or equal to a preset value.

According to various embodiments, the predetermined condition is a condition related to a battery of the electronic device 101 and may include a condition that the remaining battery power of the electronic device 101 is equal to or smaller than a preset value. The processor 120 may configure the low-power mode in response to identification that the remaining battery power is equal to or smaller than a preset value.

According to various embodiments, the predetermined conditions may be variously configured, and every predetermined condition may have a priority. The operation of the second communication processor 214 may be different under the respective predetermined conditions while the second cellular network is connected. If a predetermined condition having a relatively high priority is satisfied, the second communication processor 214 may operate in the low-power mode corresponding to the condition having the relatively high priority.

According to various embodiments, the configuration of the low-power mode may be determined by the processor 120, and the configured information may be transmitted to at least one of the first communication processor 212, the second communication processor 214, or the integrated communication processor 260. According to various embodiments, the configuration of the low-power mode may be directly determined by at least one of the first communication processor 212, the second communication processor 214, or the integrated communication processor 260. According to various embodiments, if the configuration of the low-power mode is determined by at least one of the first communication processor 212, the second communication processor 214, or the integrated communication processor 260, information on the configuration of the low-power mode may be transmitted to the processor 120.

According to various embodiments, the electronic device 101 may configure the low-power mode if a condition related to the amount of the transmitted data is satisfied when a display (for example, the display device 160 of FIG. 1) is in an off state (for example, if the screen is turned off). For example, if the packet size of the transmitted data or the received data is equal to or smaller than a preset first size while the display of the electronic device 101 is turned off, it may mean that a relatively small size packet is continuously generated by an app operating in a background. According to various embodiments, it is possible to reduce power consumption of the electronic device 101 due to the transmitted/received packet in an app operating the background by restricting the operation of the second communication processor 214.

According to various embodiments, if the electronic device 101 is configured in the low-power mode in operation 1312, the electronic device 101 may perform an operation for maintaining the release of the connection with the second cellular network. According to various embodiments, even if the electronic device 101 receives an indication of a measurement report related to the second cellular network from the first cellular network, the electronic device 101 may ignore the indication and does not report it in operation 1313, thereby maintaining the release of the connection with the second cellular network.

According to various embodiments, operation 1312 may be omitted. For example, if the amount of the transmitted or received data satisfies the predetermined condition in operation 1311, the electronic device 101 may maintain the release of the connection with the second cellular network by ignoring the indication of the measurement report related to the second cellular network and not transmitting the measurement report in operation 1313.

According to various embodiments, if the connection of the electronic device 101 with the first cellular network is released (for example, in an RRC-idle state), the electronic device 101 may make the connection with the first cellular network. According to various embodiments, even if the electronic device 101 receives an indication of a measurement report related to the second cellular network from the network in the state in which the electronic device 101 is connected to the first cellular network, the electronic device 101 may ignore the indication and does not transmit the measurement report in operation, thereby maintaining the release of the connection with the second cellular network. If the electronic device 101 becomes have the RRC-connected state with the first cellular network, the electronic device 101 may transmit or receive data on the basis of the first cellular network (for example, LTE communication network) communication in operation 1314.

According to various embodiments, in response to the configuration of the low-power mode, the electronic device 101 may be configured to maintain the sleep state of the second communication processor 214 or switch the second communication processor 214 from the awake state to the sleep state in the state in which the release of the RRC connection with the second cellular network through the second communication processor is maintained.

According to various embodiments, if data throughput of transmitted data or received data does not satisfy the predetermined condition in operation 1311, the electronic device 101 may operate in a general mode rather than the low-power mode in operation 1315. The general mode may include a normal operation procedure of the electronic device 101 operating in the EN-DC environment.

Figure 13B:
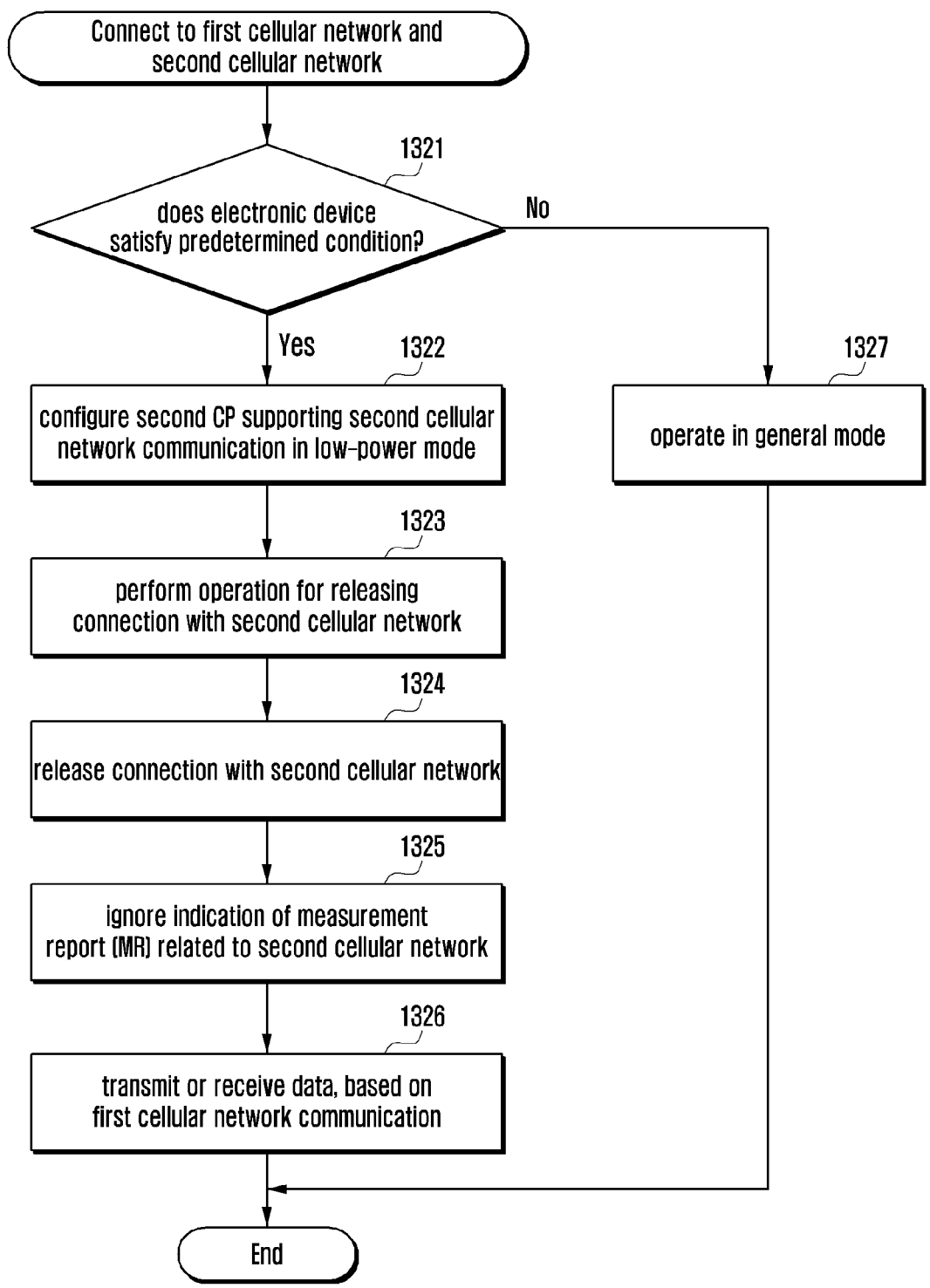
FIG. 13B is a flowchart illustrating a method of operating the electronic device according to various embodiments.

FIG. 13B is a flowchart illustrating a method of operating the electronic device according to various embodiments. At least some of the description made with reference to FIGS. 6A, 6B, and 13A may be equally applied to the description of FIG. 13B below, and the overlapping description of FIGS. 6A, 6B, and 13A will be omitted. Referring to FIG. 13B, the electronic device 101 according to various embodiments may be connected to the first cellular network and the second cellular network. According to various embodiments, the first cellular network may be an LTE communication network, and the second cellular network may be a 5G (NR) communication network. According to various embodiments, the electronic device may be connected to a BS supporting a first frequency band in the second cellular network through the second communication processor 214 and the second antenna module 244 of FIG. 2 and connected to a BS supporting the first cellular network through the first communication processor 212 and the first antenna module 244 of FIG. 2. According to various embodiments, the electronic device may be connected to a BS supporting the first frequency band in the second cellular network through the second communication processor 214 and the second antenna module 244 of FIG. 2 and connected to a BS supporting a second frequency band (for example, mmWave) in the second cellular network through the second communication processor 214 and the third antenna module 246 of FIG. 2. According to various embodiments, the electronic device may be connected to the BS supporting the first frequency band in the second cellular network through the second communication processor 214 and the second antenna module 244 of FIG. 2 and connected to a BS supporting a third frequency band different from the first frequency band in the second cellular network through the second communication processor 214 and the second antenna module 244 of FIG. 2. According to various embodiments, the connection state of the first cellular network and the second cellular network may include a radio resource control (RRC)-connected state in which data can be transmitted. The electronic device 101 may be connected to the first cellular network through the first communication processor 212 supporting first cellular network communication and connected to the second cellular network through the second communication processor 214 supporting second cellular network communication.

According to various embodiments, if the electronic device 101 (for example, the processor 120, the first communication processor 212, the second communication processor 214, or the integrated communication processor 260) satisfies a predetermined condition in operation 1321, the electronic device 101 may configure the low-power mode in operation 1322. According to various embodiments, the low-power mode may be a low-power mode that targets the second communication processor 214 supporting the second cellular network (for example, 5G network) communication. The configuration of the low-power mode in operation 1322 may be performed according to the embodiments described in FIGS. 12A and 13B above.

According to various embodiments, if the electronic device 101 is configured in the low-power mode in operation 1322, the electronic device 101 may perform at least one operation for releasing the connection of the connected second cellular network in operation 1323. According to various embodiments, the methods described in operation 1213 of FIG. 12A may be applied to at least one operation for releasing the connection with the second cellular network.

According to various embodiments, operation 1322 may be omitted. For example, if the amount of transmitted or received data satisfies a predetermined condition in operation 1321, the electronic device 101 may perform at least one operation for releasing the connection with the second cellular network in operation 1323 without any configuration operation of the low-power mode.

According to various embodiments, the electronic device 101 may release the RRC connection with the second cellular network in operation 1324 according to at least one operation for releasing the connection with the second cellular network in operation 1323.

According to various embodiments, the electronic device 101 may perform an operation for maintaining the release of the connection with the second cellular network in response to the configuration of the low-power mode. According to various embodiments, even if the electronic device 101 receives an indication of a measurement report related to the second cellular network from the first cellular network, the electronic device 101 may ignore the indication and does not report it in operation 1325, thereby maintaining the release of the connection with the second cellular network.

According to various embodiments, the electronic device 101 may transmit or receive data on the basis of the first cellular network (for example, LTE communication network) communication in operation 1326.

According to various embodiments, in response to the configuration of the low-power mode, the electronic device 101 may be configured to maintain the sleep state of the second communication processor 214 or switch the second communication processor 214 from the awake state to the sleep state in the state in which the release of the RRC connection with the second cellular network through the second communication processor is maintained.

According to various embodiments, if data throughput of transmitted data or received data does not satisfy the predetermined condition in operation 1321, the electronic device 101 may operate in a general mode rather than the low-power mode in operation 1327. The general mode may include a normal operation procedure of the electronic device 101 operating in the EN-DC environment.

Figure 14:
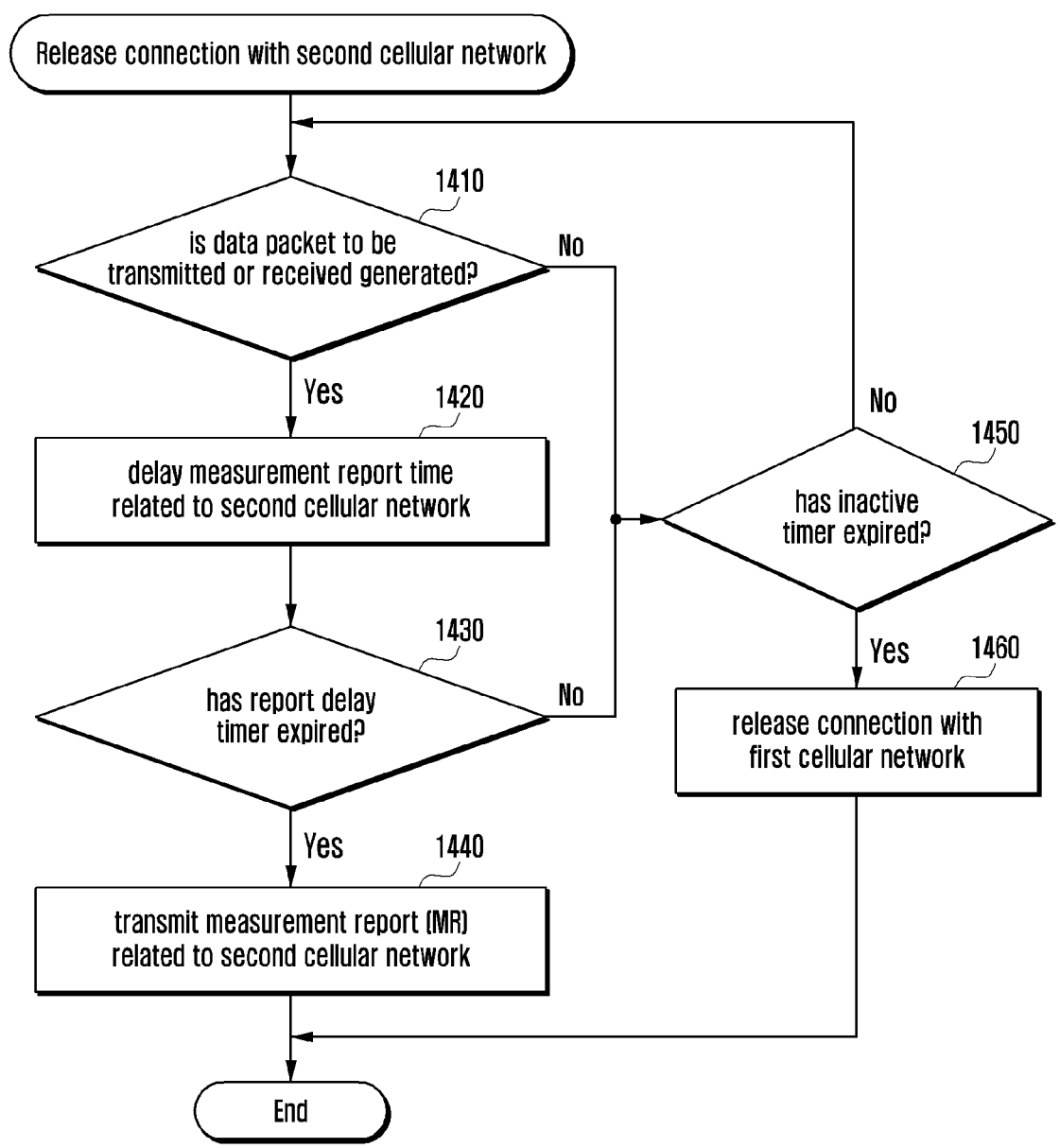
FIG. 14 is a flowchart illustrating a method of operating the electronic device according to various embodiments.

FIG. 14 is a flowchart illustrating a method of operating the electronic device according to various embodiments. Referring to FIG. 14, the electronic device 101 with the second cellular network may be connected in the EN-DC environment. The electronic device 101 may be connected to the first cellular network or the connection may be released. According to various embodiments, the first cellular network may be an LTE communication network, and the second cellular network may be a 5G (NR) communication network.

According to various embodiments, the electronic device may be connected to a BS supporting a first frequency band in the second cellular network through the second communication processor 214 and the second antenna module 244 of FIG. 2 and connected to a BS supporting the first cellular network through the first communication processor 212 and the first antenna module 242 of FIG. 2. According to various embodiments, the electronic device may be connected to a BS supporting the first frequency band in the second cellular network through the second communication processor 214 and the second antenna module 244 of FIG. 2 and connected to a BS supporting a second frequency band (for example, mmWave) in the second cellular network through the second communication processor 214 and the third antenna module 246 of FIG. 2. According to various embodiments, the electronic device may be connected to the BS supporting the first frequency band in the second cellular network through the second communication processor 214 and the second antenna module 244 of FIG. 2 and connected to a BS supporting a third frequency band different from the first frequency band in the second cellular network through the second communication processor 214 and the second antenna module 244 of FIG. 2. According to various embodiments, the connection state or the connection-released state of the first cellular network and the second cellular network may include a radio resource control (RRC)-connected state in which data can be transmitted or an RRC connection-released state in which data cannot be transmitted. The electronic device 101 may be connected to the first cellular network through the first communication processor 212 supporting first cellular network communication and connected to the second cellular network through the second communication processor 214 supporting second cellular network communication.

According to various embodiments, the operation illustrated in FIG. 14 may be performed in the state in which the low-power mode is configured, but may also be performed in the state in which the low-power mode is not configured. According to various embodiments, if the operation illustrated in FIG. 14 is performed in the state in which the low-power mode is configured, the first communication processor 212 may identify whether the low-power mode is configured by the processor 120. The low-power mode may be configured if the electronic device 101 satisfies a predetermined condition before the connection is released. The low-power mode may be configured if the electronic device 101 satisfies a predetermined condition in the state in which the connection is released. The low-power mode may be configured by a determination of the processor 120 in the state in which the connection is released. According to various embodiments, the low-power mode may be a low-power mode that targets the second communication processor 214 supporting the second cellular network (for example, 5G network) communication.

According to various embodiments, the electronic device 101 may configure the low-power mode if a condition related to the amount of the transmitted data is satisfied when a display (for example, the display device 160 of FIG. 1) is in an off state (for example, if the screen is turned off). For example, if the packet size of the transmitted data or the received data is equal to or smaller than a preset first size while the display of the electronic device 101 is turned off, it may mean that a relatively small size packet is continuously generated by an app operating in a background. According to various embodiments, it is possible to reduce power consumption of the electronic device 101 due to the transmitted/received packet in an app operating the background by restricting the operation of the second communication processor 214.

According to various embodiments, referring to FIG. 14, if a data packet to be transmitted or received by the electronic device 101 is generated in operation 1410, the electronic device 101 (for example, the processor 120, the first communication processor 212, the second communication processor 214, or the integrated communication processor 260) may configure a measurement report time as a preset time (for example, 20 seconds) and delay the measurement report in response to an indication of the measurement report related to the second cellular network from the network in operation 1420. According to various embodiments, if no data packet to be transmitted or received by the electronic device 101 is generated in operation 1410, the electronic device 101 may identify whether an inactive timer has expired in operation 1450. If it is identified that the inactive timer has expired in operation 1450, the connection with the first cellular network may be released in operation 1460. According to various embodiments, if there is no transmitted/received data for a time (for example, 10 seconds) configured in the inactive timer, the electronic device 101 releases the connection with the first cellular network, and thus the state in which the connection with the second cellular network is released may be maintained due to a delay report of the measurement report.

According to various embodiments, in operation 1430, the electronic device 101 may identify whether a report delay timer related to the delay of the measurement report time has expired. If the report delay timer has not expired on the basis of the identification result, the electronic device 101 may identify whether an inactive timer of the data has expired in operation 1450. If the inactive timer of the data has expired on the basis of the identification result, the electronic device 101 may release the connection with the first cellular network in operation 1460. If the inactive timer of the data has not expired on the basis of the identification of operation 1450, the electronic device 101 may repeatedly perform the procedures by identifying whether the data packet to be transmitted or received is generated in operation 1410.

According to various embodiments, if the report delay timer related to the delay of the measurement report time has expired on the basis of the identification result of operation 1430, the electronic device 101 may transmit a measurement report (MR) related to the second cellular network in operation 1440.

According to various embodiments, the determination about whether there is the transmitted/received data packet in operation 1410 may be performed on the basis of transmission/reception of user data except for transmission/reception of a control signal, or may be performed in consideration of both the control signal and the user data.

According to various embodiments, in response to the configuration of the low-power mode, the electronic device 101 may be configured to maintain the sleep state of the second communication processor 214 or switch the second communication processor 214 from the awake state to the sleep state in the state in which the release of the RRC connection with the second cellular network through the second communication processor is maintained.

According to various embodiments, if data throughput of transmitted data or received data does not satisfy the predetermined condition in operation 1420, the electronic device 101 may operate in a general mode rather than the low-power mode in operation 1460. The general mode may include a normal operation procedure of the electronic device 101 operating in the EN-DC: environment.

Figure 15A:
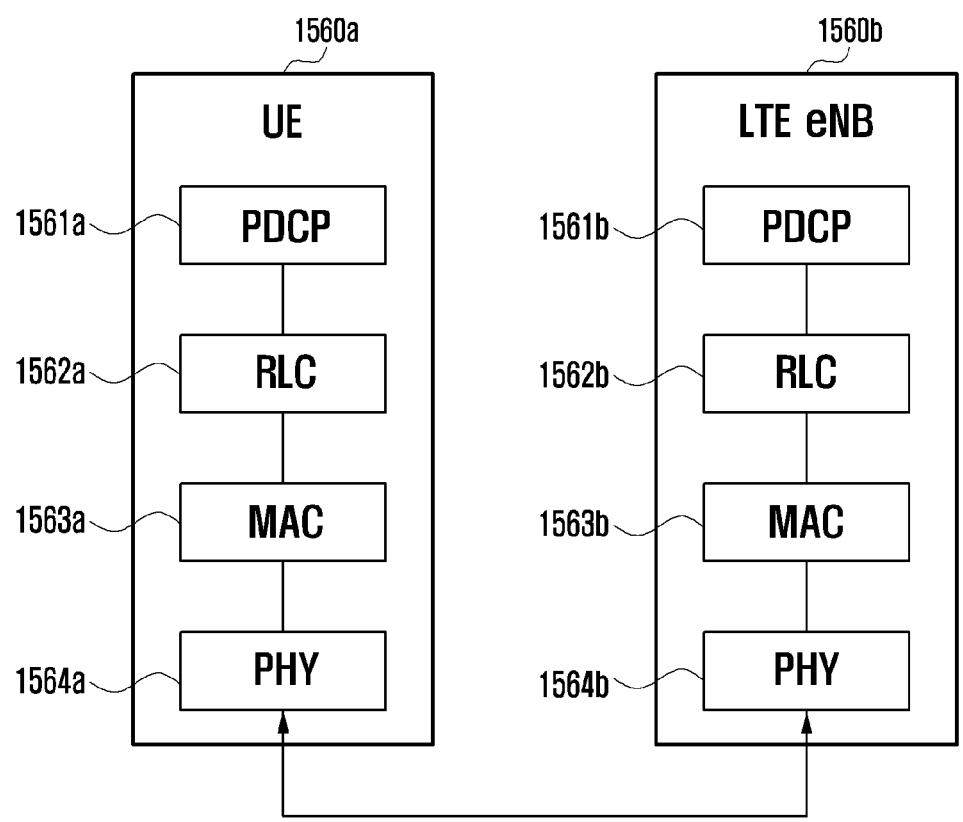
FIG. 15A illustrates a wireless protocol structure in the LTE system.

FIG. 15A illustrates a wireless protocol structure in the LTE system.

Referring to FIG. 15A, according to various embodiments, the wireless protocol stack of the LTE system may include packet data convergence protocol (PDCP) entities 1561a and 1561b, radio link control (RLC) entities 1562a and 1562b, medium access control (MAC) entities 1563a and 1563b, and physical (PRY) entities 1564a and 1564b in a UE 1560a and an LTE eNB 1560b, respectively.

According to various embodiments, the PDCP entities 1561a and 1561b may serve to perform an IP header compression/decompression operation. The main function of the PDCP may be described below. According to various embodiments, the LTE protocol of the UE and the eNB may also include an NR PDCP in order to support various functions of the EN DC function in the EN-DC environment.

Header compression and decompression function (header compression and decompression: ROHC only)
  User data transmission function (transfer of user data)
  Sequential delivery function (In-sequence delivery of upper layer PDUs at PDCP re-establishment procedure for RLC AM)
  Reordering function (for split bearers in DC (only support for RLC AM) PDCP PDU routing for transmission and PDCP PDU reordering for reception)
  Duplicate detection function (duplicate detection of lower layer SDUs at PDCP re-establishment procedure for RLC AM)
  Retransmission function (retransmission of PDCP SDUs at handover and, for split bearers in DC, of PDCP PDUs at PDCP data recovery procedure, for RLC AM)
  Ciphering and deciphering function (ciphering and deciphering)
  Timer-based SDU deletion function (timer-based SDU discard in uplink)

According to various embodiments, radio link control (RLC) 1562a or 1562b may reconfigure the PDCP Packet Data Unit (PDU) to be the proper size and perform an ARQ operation. The main function of the RLC may be described below.

Data transmission function (transfer of upper layer PDUs)
  ARQ function (error correction through ARQ (only for AM data transfer))
  Concatenation, segmentation, and reassembly function (concatenation, segmentation, and reassembly of RLC SDUs (only for UM and AM data transfer))
  Re-segmentation function (re-segmentation of RLC data (only for AM data transfer))
  Reordering function (reordering of RLC data PDUs (only for UM and AM data transfer)
  Duplication detection function (duplicate detection (only for UM and AM data transfer))
  Error detection function (protocol error detection (only for AM data transfer))
  RLC SDU deletion function (RLC SDU discard (only for UM and AM data transfer))
  RLC reestablishment function (RLC reestablishment)

According to various embodiments, the MAC 1563a or 1563b may be connected to a plurality of RLC layer devices included in one UE, and may perform an operation of multiplexing RLC PDUs to MAC PDUs and demultiplexing RLC PDUs from the MAC PDUs. The main function of the MAC may be described below.

Mapping function (mapping between logical channels and transport channels)
  Multiplexing and demultiplexing function (multiplexing/demultiplexing of MAC SDUs belonging to one or different logical channels into/from Transport Blocks (TB) delivered to/from the physical layer on transport channels)
  Scheduling information report function (scheduling information reporting)
  HARQ function (error correction through HARQ)
  Logical channel priority control function (priority handling between logical channels of one LTE)
  UE priority control function (priority handling between UEs by means of dynamic scheduling)
  MBMS service identification function (MBMS service identification)
  Transport format selection function (transport format selection)
  Padding function (padding)

According to various embodiments, the PRY 1564a or 1564b may perform an operation of channel-coding and modulating higher-layer to generate an OFDM symbols and transmitting the OFDM symbol through a radio channel or demodulating and channel-decoding an OFDM symbol received through a radio channel and transmitting the same to a higher layer.

Figure 15B:
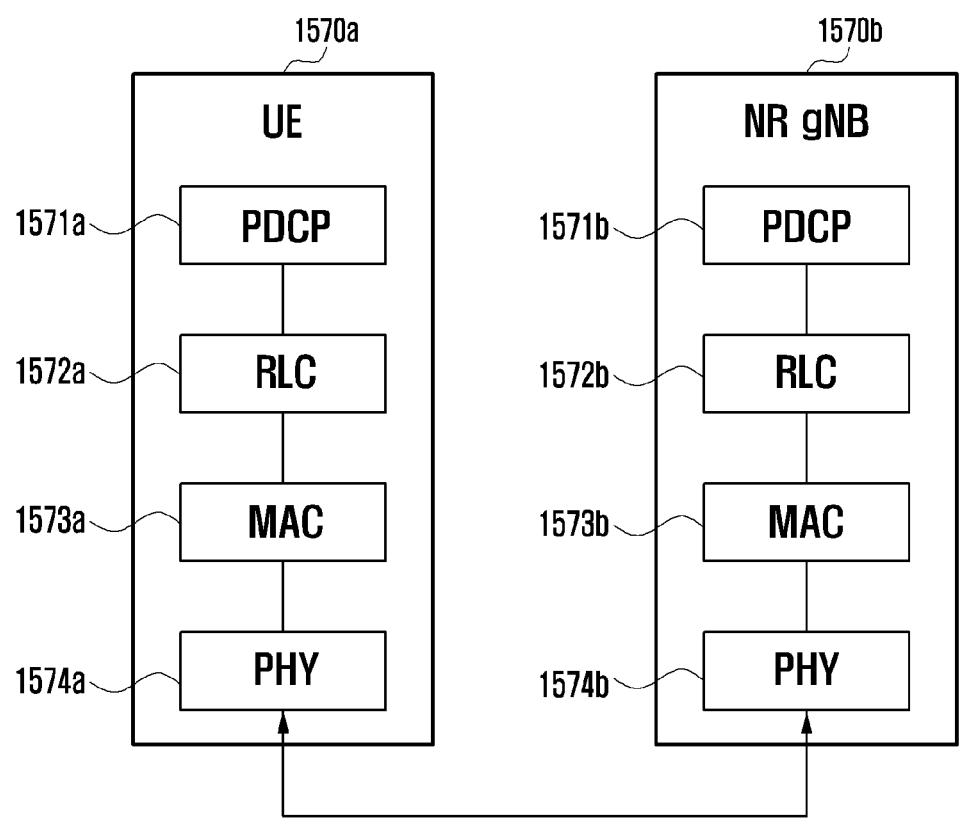
FIG. 15B illustrates a wireless protocol structure of the next-generation mobile communication system according to various embodiments.

FIG. 15B illustrates a wireless protocol structure of the next-generation mobile communication system according to various embodiments.

Referring to FIG. 15B, according to various embodiments, the wireless protocol stack of the next-generation mobile communication system may include NR PDCPs 1571a and 1571b, NR RLCs 1572a and 1572b, NR MACs 1573a and 1573b, and NR PHYs 1574a and 1574b in a UE 1570a and an NR gNB 1570b, respectively. Although not illustrated, the wireless protocol state of the next-generation mobile communication system may further include a service data adaptation protocol (SDAP) in each of the UE 1570a and the NR gNB 1570b. The SDAP may manage, for example, allocation of radio bearers on the basis of quality of service (QoS) of user data.

According to various embodiments, the main function of the NR PDCP 1571a or 1571b may include some of the following functions.

Header compression and decompression function (header compression and decompression: ROHC only)
   User data transmission function (transfer of user data)
   Sequential delivery function (in-sequence delivery of upper layer PDUs)
   Reordering function (PDCP PDU reordering for reception)
   Duplicate detection function (duplicate detection of lower layer SDUs)
   Retransmission function (retransmission of PDCP SDUs)
   Ciphering and deciphering function (ciphering and deciphering)
   Timer-based SDU deletion function (timer-based SDU discard in uplink)

According to various embodiments, the reordering function of the NR PDCP is a function of sequentially reordering PDCP PDUs received from a lower layer on the basis of a PDCP sequence number (SN), and may include a function of sequentially transferring the reordered data to a higher layer, a function of recording PDCP PDUs lost due to the reordering, a function of reporting statuses of the lost PDCP PDUs to a transmitting side, and a function of making a request for retransmitting the lost PDCP PDUs.

According to various embodiments, the main function of the NR RLC 1572a or 1572b may include some of the following functions.

Data transmission function (transfer of upper layer PDUs)
   Sequential delivery function (in-sequence delivery of upper layer PDUs)
   Non-sequential delivery function (out-of-sequence delivery of upper layer PDUs)
   ARQ function (error correction through ARQ)
   Concatenation, segmentation, and reassembly function (concatenation, segmentation, and reassembly of RLC SDUs)
   Re-segmentation function (re-segmentation of RLC data PDUs)
   Reordering function (reordering of RLC data PDUs)
   Duplicate detection function (duplicate detection)
   Error detection function (protocol error detection)
   RLC SDU deletion function (RLC SDU discard)
   RLC reestablishment function (RLC reestablishment)

According to various embodiments, the sequential delivery function (in-sequence delivery) of the NR RLC is a function of sequentially transferring RLC SDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC sequence number (SN) or a PDCP SN, a function of recording RLC PDUs lost due to the reordering, a function of reporting statuses of the lost RLC PDUs to a transmitting side, a function of making a request for retransmitting the lost RLC PDUs, if there is a lost RLC SDU, a function of sequentially transferring only RLC SDUs preceding the lost RLC SDU to the higher layer, if a predetermined timer expires even though there is a lost RLC SDU, a function of sequentially transferring all RLC SDUs received before the timer starts to the higher layer, or if a predetermined timer expires even though there is a lost RLC SDU, a function of sequentially transferring all RLC SDUs received up to that point in time to the higher layer. The non-sequential function (out-of sequence delivery) of the NR RLC is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

According to various embodiments, the NR MAC 1573a or 1573b may be connected to a plurality of NR RLC layers included in one UE, and the main function of the NR MAC may include some of the following functions.

Mapping function (mapping between logical channels and transport channels)
   Multiplexing and demultiplexing function (multiplexing/demultiplexing of MAC SDUs)
   Scheduling information report function (scheduling information reporting)
   HARQ function (error correction through HARQ)
   Logical channel priority control function (priority handling between logical channels of one LTE)
   UE priority control function (priority handling between UEs by means of dynamic scheduling)
   MBMS service identification function (MBMS service identification)
   Transport format selection function (transport format selection)
   Padding function (padding)

According to various embodiments, the NR PHY 1574a or 1574b may perform an operation of channel-coding and modulating higher-layer to generate an OFDM symbols and transmitting the OFDM symbol through a radio channel or demodulating and channel-decoding an OFDM symbol received through a radio channel and transmitting the same to a higher layer.

Figure 16:
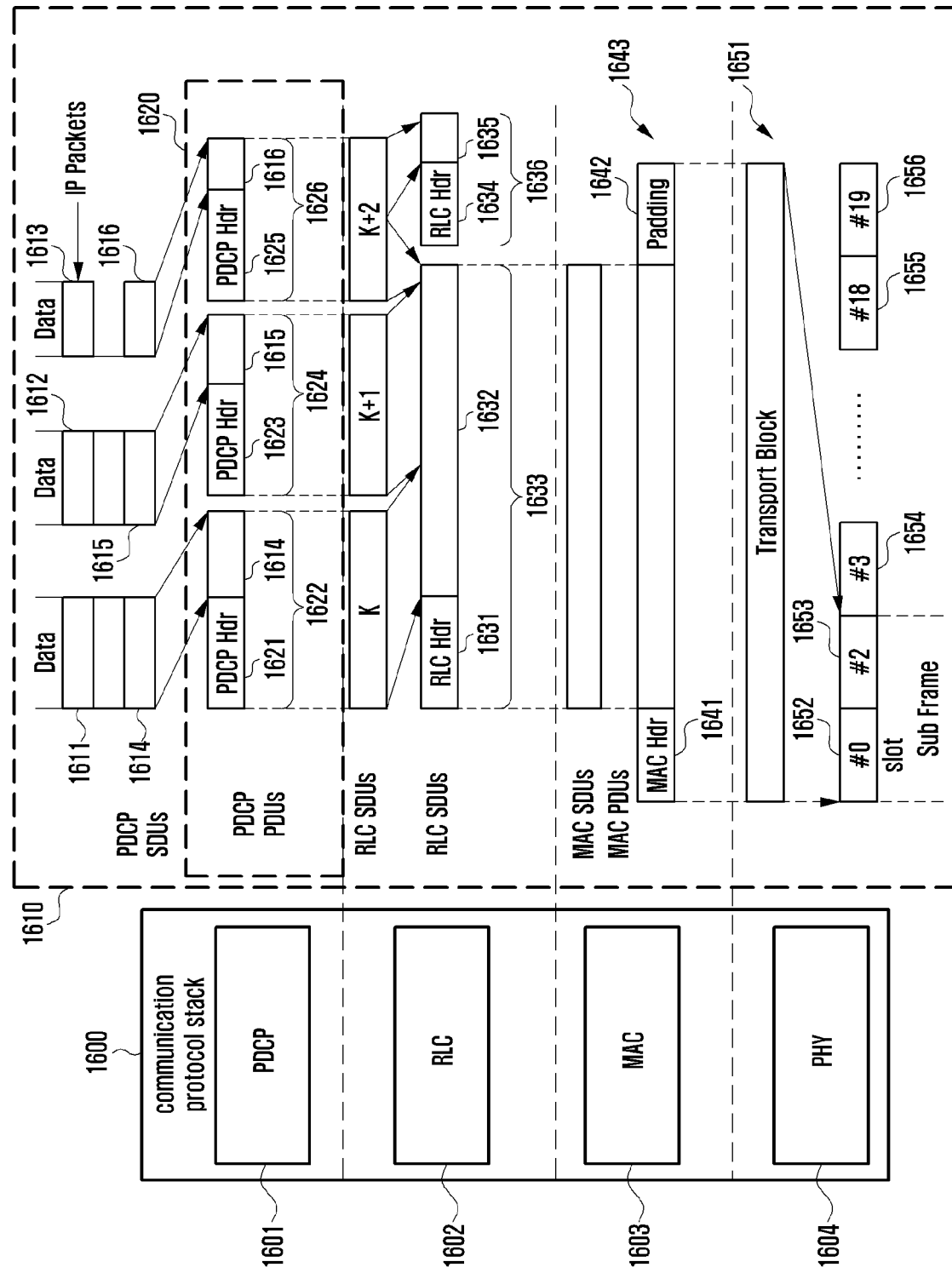
FIG. 16 illustrates data change between network layers.

FIG. 16 illustrates data change between network layers.

According to various embodiments, [Table 1] below shows pieces of information that may be included in a MAC header.

TABLE 1

| Parameter | Explanation |
|---|---|
| LCID | The LCID may be an identifier of an RLC entity for generating an RLC PDU (or MAC SDU) received from a higher layer. Alternatively, the LCID indicates a MAC control element (CE) or padding. The LCID may be differently defined according to a transmitted channel. For example, different definition may be made according to a DL-SCH, a UL-SCH, or an MCH. |
| L | L may be the length of a MAC SDU and correspond to the length of a MAC CE having a variable length. In the case of a MAC CE having a fixed length, the L-field may be omitted. For a predetermined reason, the L-field |

TABLE 1-continued

| Parameter | Explanation |
|---|---|
| | may be omitted. The predetermined reason may be the case in which the size of the MAC SDU is fixed, a transmission side informs a reception side of the size of the MAC PDU, or a reception side obtains the length through calculation. |
| F | F indicates the size of the L-field. F may be omitted when there is no L field, and the size of the L-field may be limited to a predetermined size when there is an F-field. |
| F2 | F2 indicates the size of the L-field. F2 may be omitted when there is no L-field, and the size of the L-field may be limited to a predetermined size different from the size of the F-field when there is an F2-field. For example, F2-field may indicate a size larger than the F-field. |
| E | E indicates whether there are other headers in a MAC header. For example, if E has a value of 1, parameters of another MAC header may be followed. However, if E has a value of 0, a MAC SDU, a MAC CE, or padding may be followed. |
| R | R is a reserved bit. |

Referring to FIG. 16, a communication protocol stack 1600 of an electronic device (for example, the electronic device 101) according to various embodiments may include a PDCP entity 1601, an RLC entity 1602, a MAC entity 1603, and a PHY entity 1604. The PDCP entity 1601, the RLC entity 1602, the MAC entity 1603, and the PHY entity 1604 may be entities based on the wireless protocol of the LTE system or entities based on the wireless protocol of the NR system. For example, when the electronic device transmits and receives data on the basis of LTE, the PDCP entity 1601, the RLC entity 1602, the MAC entity 1603, and the PHY entity 1604 based on the wireless protocol of the LTE system may be configured. For example, when the electronic device transmits and receives data on the basis of NR, the PDCP entity 1601, the RLC entity 1602, the MAC entity 1603, and the PHY entity 1604 based on the wireless protocol of the NR system may be configured. For example, as illustrated in FIG. 10, packet data processed on the basis of the PDCP entity 1601, the RLC entity 1602, the MAC entity 1603, and the PHY entity 1604 may be at least temporarily stored in some logical areas or some physical areas of a memory 1610 (for example, the volatile memory 132 of FIG. 1 or the memory within the communication processor 212, 214, or 260) of the electronic device. According to various embodiments, the PDCP entity 1601 may further include PDCP headers 1621, 1623, and 1625 in PDCP SDUs 1614, 1615, and 1616 based on data 1611, 1612, and 1613 corresponding internet protocol (IP) packets, respectively, and transmit PDCP PDUs 1622, 1624, and 1626. PDCP header information transmitted by the LTE PDCP entity may be different from PDCP header information transmitted by the NR PDCP entity. According to various embodiments, a PDCP buffer 1620 may be implemented in a logical area or a physical area designated within the memory 1610. The PDCP buffer 1620 may receive and at least temporarily store the PDCP SDUs 1614, 1615, and 1616 on the basis of the PDCP entity 1601, further include the PDCP headers 1621, 1623, and 1625 in the PDCP SDUs 1614, 1615, and 1616, and transmit the PDCP PDUs 1622, 1624, and 1626 to the RLC layer. According to various embodiments, the RLC entity 1602 may add RLC headers 1631 and 1634 to first data 1632 and second data 1635 that are reconfigured from the PDCP PDUs 1622, 1624, and 1626, and transmit RLC PDUs 1633 and 1636. RLC header information based on LTE may be different from RLC header information based on NR.

According to various embodiments, the MAC entity 1602 may add, for example, a MAC header 1641 and padding 1642 to a MAC SDU and transmit a MAC PDU 1643, which may be processed by the physical layer 1604 as a transport block 1651. The transport block 1651 may be processed to be slots 1652, 1653, 1654, 1655, and 1656.

According to various embodiments, although not illustrated in FIG. 16, the memory 1610 may include corresponding buffers for the RLC layer and the MAC layer.

Figure 17:
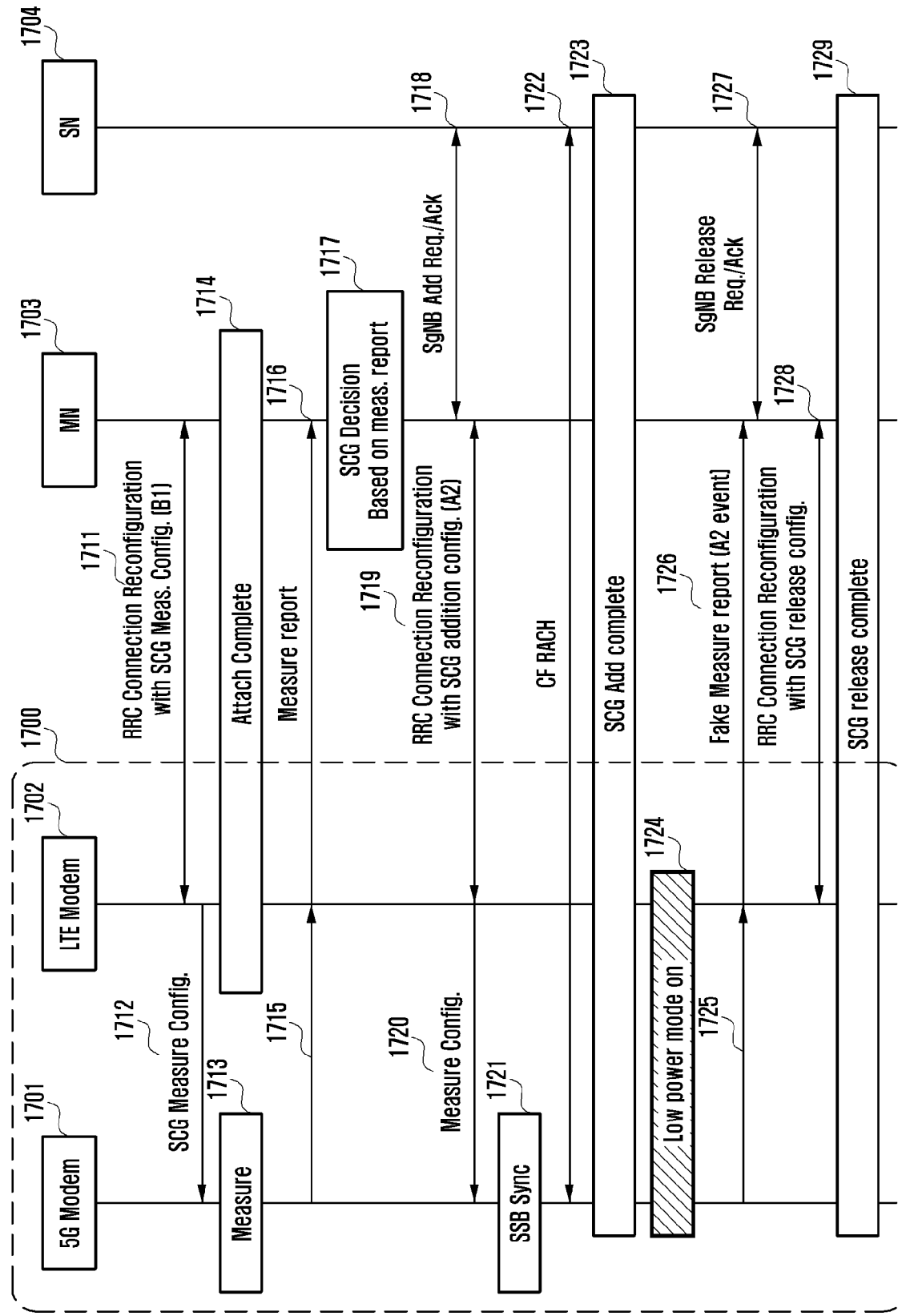
FIG. 17 is a flowchart illustrating a method of operating a user terminal, an MN, and an SN according to various embodiments.

FIG. 17 is a flowchart illustrating a method of operating a user terminal, an MN, and an SN according to various embodiments.

According to various embodiments, a UE 1700 (for example, the electronic device 101) may include a 5G modem 1701 (for example, the second communication processor 214 of FIG. 2) and an LTE modem 1702 (for example, the first communication processor 212 of FIG. 2). The LTE modem 1702 may perform RRC connection reconfiguration to configure an SCG measurement information (SCG Meas.) report condition as event B1 with an MN 1703 in operation 1711. Event B1 may indicate an event that measurement information corresponding to a neighboring node in different type is larger than a threshold value. In operation 1712, the LTE modem 1701 may configure the SCG measurement report condition (SCG measure config.). The 5G modem 1701 may perform measurement in operation 1713. The LTE modem 1702 may complete attach with the MN 1703 in operation 1714. If it is identified that event B1 is satisfied, the 5G modem 1701 and the LTE modem 1702 may transmit the measurement report to the MN 1703 in operation 1715 and operation 1716. For example, the electronic device 101 may transmit cell identification information (or node identification information) for the measurement that is larger than a threshold value to the MN 1703.

According to various embodiments, the MN 1703 may determine an SCG on the basis of a measurement report (meas. Report) in operation 1717. For example, the MN 1703 may select an SN 1704. The MN 1703 may make a request for adding an SgNB to the SN 1704 and receive ack thereof in operation 1718. The MN 1703 may perform RRC connection reconfiguration with SCG including a report condition of event A2 with the LTE 1700 in operation 1719. The 5G modem 1701 may configure a report condition in operation 1720. In operation 1721, the 5G modem 1701 may perform SSB synchronization. The UE 1700 may perform contention free (CF) RACH with the SN 1704 in operation 1722. In operation 1723, the LTE 1700 may complete SCG addition with the MN 1703 and the SN 1704.

According to various embodiments, it the predetermined condition in FIG. 6A is satisfied, the UE 1700 may configure the low-power mode in operation 1724. According to various embodiments, the configuration of the low-power mode may be performed such that the configuration corresponding to the low-power mode is an on state (for example, a value of a flag corresponding to the low-power mode is configured as "1"). According to various embodiments, the configuration of the low-power mode may be performed before operation 1724. In this case, the UE 1700 may include an operation for identifying whether the currently configured mode is the low-power mode in operation 1724.

According to various embodiments, the UE 1700 may perform measurement and detect event A2 corresponding to an intensity corresponding a serving cell (for example, the SN 1704) lower than a threshold value (serving becomes wore than threshold). In operation 1725 and operation 1726, the UE 1700 may transmit a fake measurement report that responds to detection of event A2 to the MN 1703. According to various embodiments, the UE 1700 may transmit the fake measurement report to the MN 1703 in response to the on state of the low-power mode even though event A2 is not detected. In operation 1727, the MN 1703 and the SN 1704 may transmit and receive an SgNB release request/ack. The MN 1703 may perform RRC connection reconfiguration related to SCG release configuration with the LTE 1700 in operation 1728. In operation 1729, the UE 1700 may complete SCG release.

Figure 18:
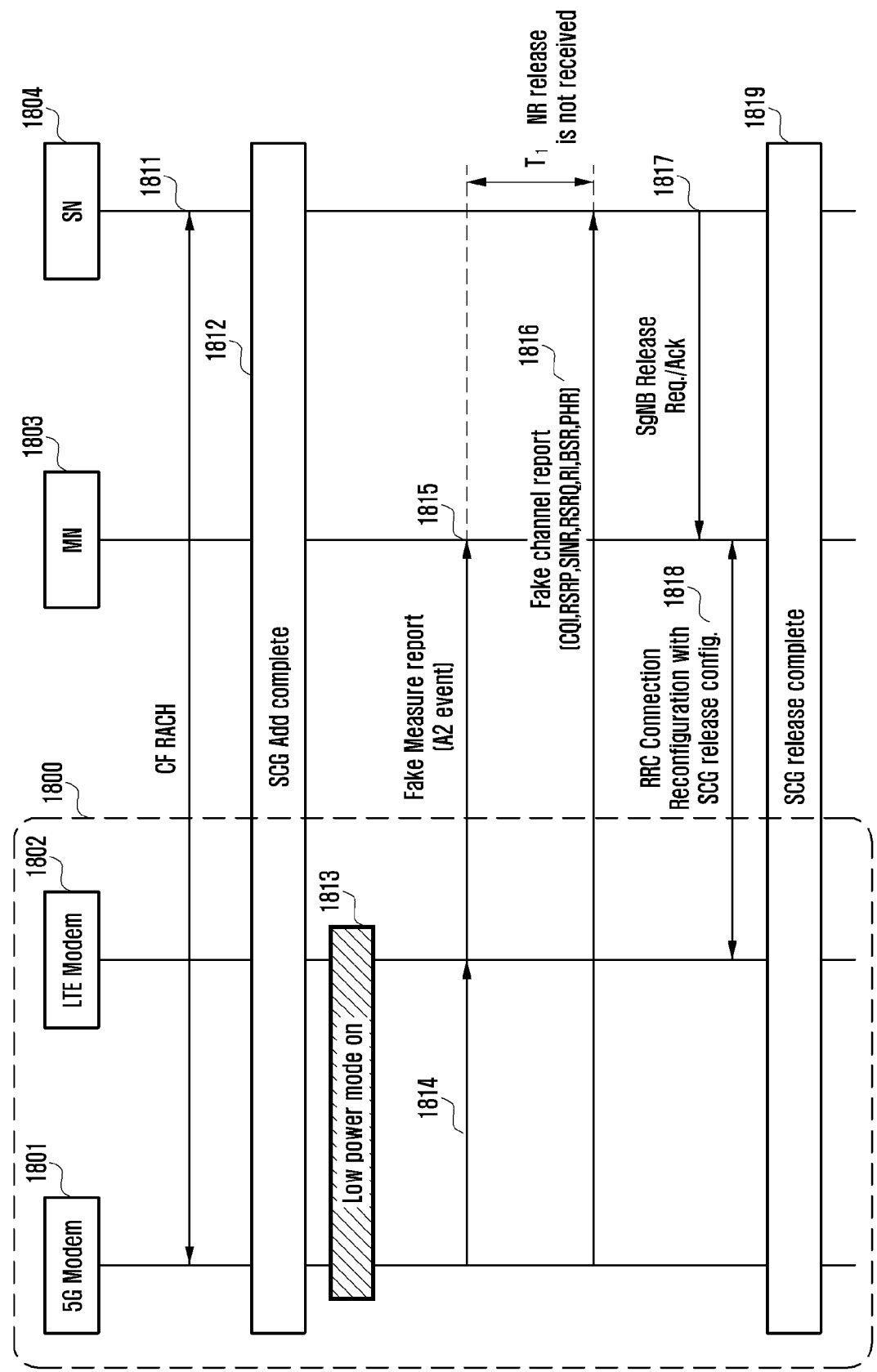
FIG. 18 is a flowchart illustrating a method of operating a user terminal, an MN, and an SN according to various embodiments.

FIG. 18 is a flowchart illustrating a method of operating a user terminal, MN, and an SN according to various embodiments.

According to various embodiments, a UE 1800 (for example, the electronic device 101) may include a 5G modem 1801 and an LTE modem 1802. The UE 1800 may perform contention free (CF) RACH with an SN 1804 in operation 1811. In operation 1812, the UE 1800 may complete SCG addition with the MN 1803 and the SN 1804.

According to various embodiments, it the predetermined condition in FIG. 6A is satisfied, the UE 1800 may configure the low-power mode in operation 1813. According to various embodiments, the configuration of the low-power mode may be performed such that the configuration corresponding to the low-power mode is an on state (for example, a value of a flag corresponding to the low-power mode is configured as "1"). According to various embodiments, the configuration of the low-power mode may be performed before operation 1813. In this case, the UE 1800 may include an operation for identifying whether the currently configured mode is the low-power mode in operation 1813.

According to various embodiments, the UE 1800 may perform measurement and detect event A2 corresponding to an intensity corresponding a serving cell (for example, the SN 1804) lower than a threshold value (serving becomes wore than threshold). In operation 1814 and operation 1815, the UE 1100 may transmit a fake measurement report that responds to detection of event A2 to the MN 1803. According to various embodiments, the UE 1800 may transmit the fake measurement report to the MN 1803 in response to the on state of the low-power mode even though event A2 is not detected.

According to various embodiments, if an NR release message (for example, an SgNB release request/ack) is not received for a preset time (T1) even though the fake measurement report that responds to detection of event A2 is transmitted to the MN 1803, at least one channel-related parameter included in a CSI report may be additionally transmitted through a fake measurement report in operation 1816.

According to various embodiments, at least one channel-related parameter included in the CSI report may be transmitted through the fake measurement report in operation 1816 without operation 1814.

According to various embodiments, in operation 1817, the MN 1803 and the SN 1804 may transmit and receive the SgNB release request/ack. The MN 1803 may perform RRC connection reconfiguration related to SCG release configuration with the UE 1800 in operation 1818. In operation 1819, the UE 1800 may complete SCG release.

Figure 19:
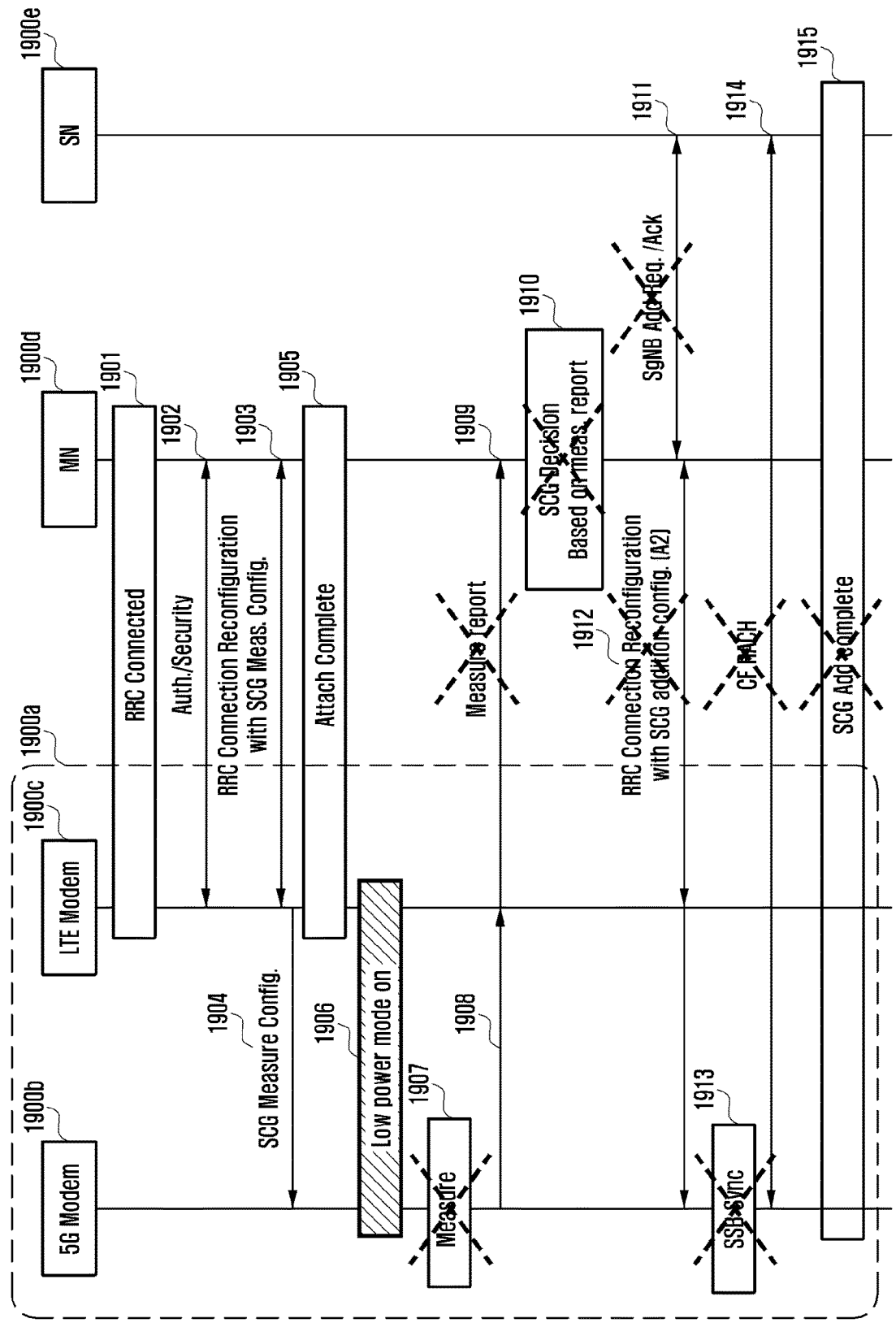
FIG. 19 is a flowchart illustrating the operation of a UE, an MCG, and an SCG according to various embodiments.

FIG. 19 is a flowchart illustrating the operation of a UE, an MCG, and an SCG according to various embodiments.

A UE 1900a (for example, the electronic device 101) according to various embodiments may include a 5G modem 1900b and an LTE modem 1900c. In operation 1901, the LTE modem 1900c may establish the RRC connection with an MN 1900d. In operation 1902, the LTE modem 1900c may perform an authentication/security procedure with the MN 1900d. The LTE modem 1900c may perform RRC connection reconfiguration related to SCG measurement configuration with the MN 1900d in operation 1903, and complete attach in operation 1905. The LTE modem 1900c may perform SCG measurement configuration in operation 1904. For example, the SCG measurement configuration may be a report on measurement information when event B1 is detected. However, if the low-power mode is configured on the basis of identification about whether the low-power mode is turned on in operation 1906, the 5G modem 1900b may not perform preset measurement in operation 1907. According to various embodiments, the configuration of the low-power mode may be performed in operation 1906 or before operation 1906. In this case, the UE 1900a may include an operation for identifying whether the currently configured mode is the low-power mode in operation 1906.

Accordingly, the measurement report transmission indicated by reference numerals 1908 and 1909, the operation for SCG selection indicated by reference numeral 1910, the operation of transmitting and receiving the SgNB addition request/ack to an SN 1900e indicated by reference numeral 1911, the RRC connection reconfiguration operation indicated by reference numeral 1912, the SSB synchronization operation indicated by reference numeral 1913, the CF RACH operation indicated by reference numeral 1914, and the SCG addition completion operation indicated by reference numeral 1915 may not be performed. Therefore, in the state in which the low-power mode is configured, establishment of the connection with the second cellular network may be additionally prevented.

Figure 20:
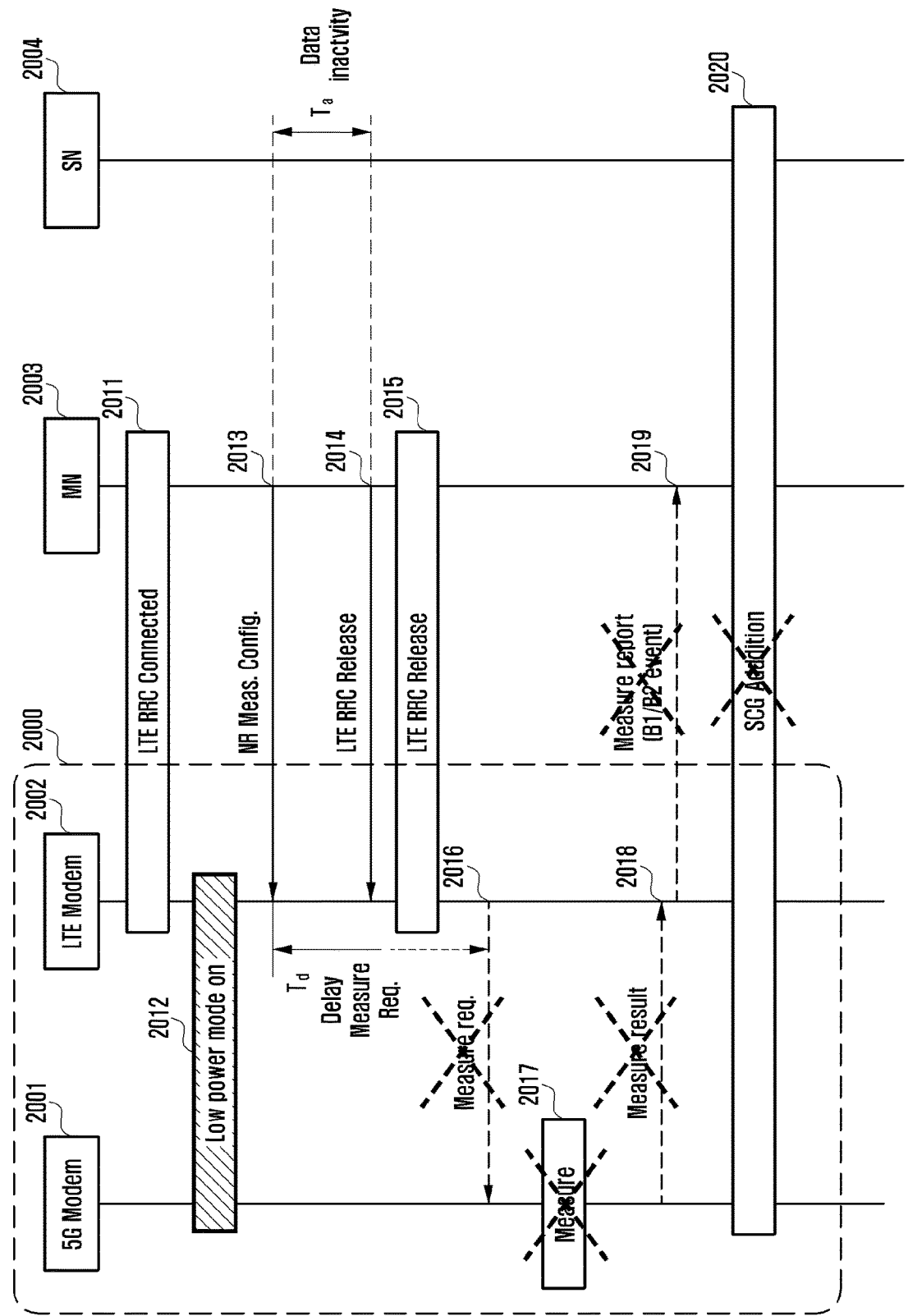
FIG. 20 is a flowchart illustrating a method of operating a user terminal, an MN, and an SN according to various embodiments.

FIG. 20 is a flowchart illustrating a method of operating a user terminal, an MN, and an SN according to various embodiments.

A UE 2000 (for example, the electronic device 101) according to various embodiments may include a 5G modem 2001 and an LTE modem 2002. In operation 2011, the LTE modem 2002 may establish the RRC connection with an MN 2003. In operation 2012, the 5G modem 2001 may be configured such that the power-low mode is turned on as described in FIG. 8. According to various embodiments, the configuration of the low-power mode may be performed before operation 2011. In this case, the 5G modem 2001 may include an operation for identifying whether the currently configured mode is the low-power mode in operation 2012.

According to various embodiments, the MN 2003 may transmit configuration of an NR measurement report (NR Measure config.) to the UE 2000 in operation 2013. The LTE modem 2002 receiving the configuration of the NR measurement report may transmit a measurement request after a delay time corresponding to a configured time (Td) without immediately transmitting the measurement request to the 5G modem 2001. To this end, the LTE modem 2002 may drive a timer of the configured time (Td).

According to various embodiments, if a preset data deactivation configuration time (Ta) has expired since there is no transmitted/received data for a predetermined time before the timer expires, the LTE modem 2002 may receive an LTE RRC release message from the MN 2003 in operation 2014. According to various embodiments, if the preset data deactivation configuration time (Ta) has expired since there of transmitted/received data for a predetermined time before the timer expires, the LTE modem 2002 may perform an LTE RRC release process in operation 2014. According to various embodiments, a determination about whether there is the transmitted/received data packet for the predetermined time may be performed on the basis of transmission/reception of user data except for transmission/reception of a control signal or may be performed in consideration of both the control signal and the user data.

According to various embodiments, since the LTE RRC is released even though the tinier driven for delaying the report request has expired in operation 2015, the LTE modem 2002 cannot transmit the measurement result report and thus transmission of the measurement to the 5G modem 2001 is not needed. Accordingly, the measurement request indicated by reference numeral 2016, the measurement indicated by reference numeral 2017, transmission of the measurement result indicated by reference numerals 2018 and 2019, and the SCG addition operation indicated by reference numeral 2020 may not be performed with an SN 2004. Therefore, in the state in which the low-power mode is configured, additional establishment of the connection with the second cellular network may be prevented according to the report request delay configuration.

Figure 21:
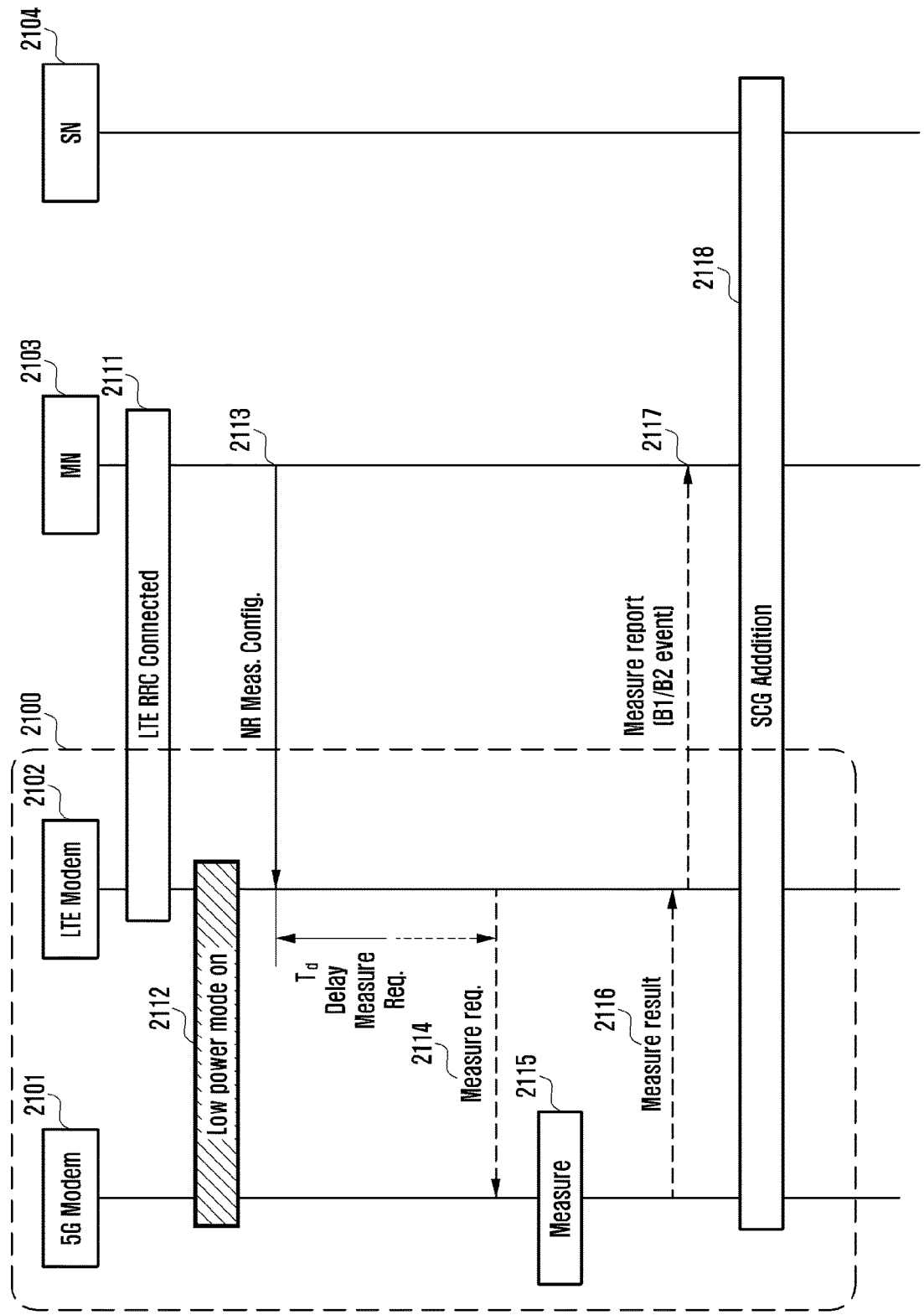
FIG. 21 is a flowchart illustrating a method of operating a user terminal, an MN, and an SN according to various embodiments.

FIG. 21 is a flowchart illustrating a method of operating a user terminal, an MN, and an SN according to various embodiments.

A UE 2100 (for example, the electronic device 101) according to various embodiments may include a 5G modem 2101 and an LTE modem 2102. In operation 2111, the LTE modem 2102 may establish the RRC connection with an MN 2103. In operation 2112, the 5G modem 2101 may be configured such that the power-low mode is turned on as described in FIG. 8.

According to various embodiments, the MN 2103 may transmit configuration of an NR measurement report (NR Measure config.) to the UE 2100 in operation 2113. The LTE modem 2102 receiving the configuration of the NR measurement report may transmit a measurement request after a delay time corresponding to a preset time (Td) without immediately transmitting the measurement request to the 5G modem 2101. To this end, the LTE modem 2102 may drive a timer of the configured to (Td).

According to various embodiments, if a connection release message is not received from the BS or the data activity state is maintained until the timer has expired, the LTE modem 2102 may transmit a measurement request to the 5G modem 2101 according to the normal operation in operation 2114.

According to various embodiments, the 5G modem 2101 may perform measurement in operation 2115 in response to reception of the measurement request from the LTE modern 2102, and transmit the measurement result to the NIN 2103 in operations 2116 and 2117. In operation 2118, the UE 2100 may complete SCG addition with the MN 2103 and the SN 2104.

Figure 22:
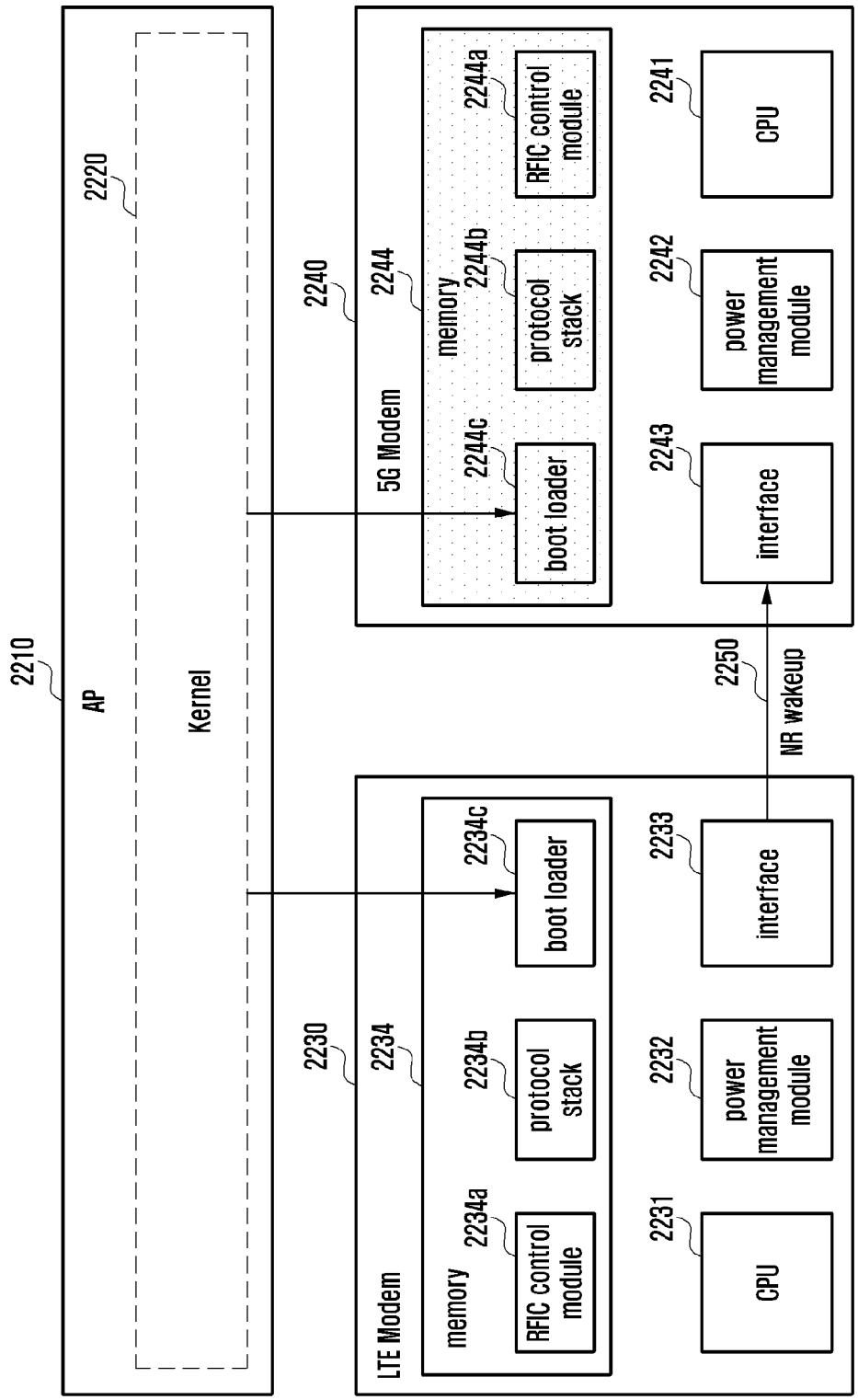
FIG. 22 illustrates a sleep state according to a low-power mode of an electronic device according to various embodiments.

FIG. 22 illustrates a sleep state according to a low-power mode of an electronic device according to various embodiments. Referring to FIG. 22, an AP 2210 (for example, the processor 120 of FIG. 1) may boot an LTE modem 2230 (for example, the first communication processor 212 of FIG. 2) and a 5G modem 2240 (for example, the second communication processor 214 of FIG. 2) through execution in a kernel 2220. The LTE modem 2230 may include a CPU 2231, a power management module (HW_PWR) 2232, an interface 2233, and a memory 2234. According to various embodiments, at least one of an RFIC control module 2234*a*, a protocol stack 2234*b*, and a boot loader 2234*c* may be loaded and executed in the memory 2234. The 5G modem 2240 may include a CPU 2241, a power management module (HW_PWR) 2242, an interface 2243, and a memory 2244. According to various embodiments, at least one of an RFIC control module 2244*a*, a protocol stack 2244*b*, and a boot loader 2244*c* may be loaded and executed in the memory 2244.

According to various embodiments, an AP 2210 (for example, the processor 120) may boot the LTE modem 2230 by loading a boot loader 2234*c* of the LTE modem 2230 and boot the 5G modem 2240 by loading a boot loader 2244*c* of the 5G modem 2240 through execution of the kernel 2220.

According to various embodiments, if the 5G modem 2240 of the electronic device 101 enters the low-power mode, the 5G modem 2240 may switch from the wake-up state to the sleep state and stop the operation for at least one entity. For example, in the sleep state, only the interface 2243 and the power management module 2242 of the 5G modem 2240 are operated, and execution of at least one of the CPU 2241, and the RFIC control module 2244*a*, the protocol stack 2244*h*, and the boot loader 2244*c*, loaded to the memory 2244, may be stopped.

According to various embodiments, if the low-power mode state is released, the 5G modem 2240 may switch from the sleep state to the awake state. For example, as the switching to the awake state, an NR wake-up signal may be transmitted from the LTE modem 2230 to the 5G modem 2240 through an NR wake-up pin 2250 configured between the interface 2233 of the LTE modem 2230 and the interface 2243 of the 5G modem 2240.

According to various embodiments, the 5G modem 2240 receiving the NR wake-up signal may supply power to at least one entity (for example, the CPU 2241 the RFIC control module 2244*a*, the protocol stack 2244*b*, or the boot loader 2244*c*) of which the execution is stopped from the power management module 2242, and thus the stopped function may be executed.

According to various embodiments, a time point at which the 5G modem 2240 enters the sleep state may be before NR access is added from a time at which the electronic device 101 is booted or until NR measure req. and RRC Config. are received from the LTE modem before NR access is added. According to various embodiments, the 5G modem 2240 may be periodically enter the sleep state according to NR connected mode discontinuous reception (CDRX) even after NR access is added. According to various embodiments, the 5G modem 2240 may maintain the sleep state before a time point at which the next MR access is added from a time point at which the NR access is released.

According to various embodiments, in an RRC-connected state of the LTE modem 2230, the NR modem 2240 may be in the sleep state or the awake state. In an LTE RRC idle, NR may always remain in the sleep state.

Figure 23:
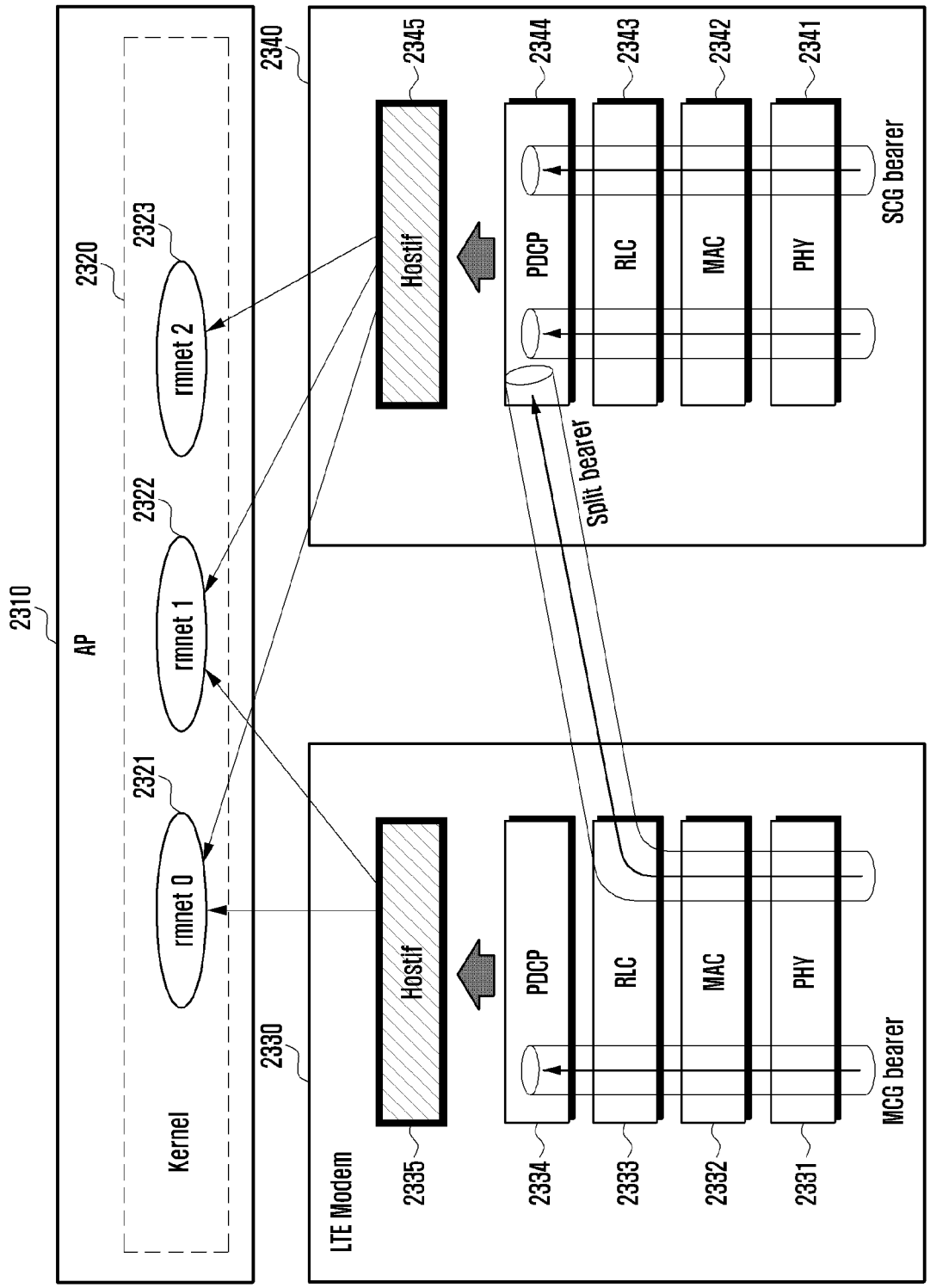
FIG. 23 illustrates an example of a method by which the electronic device measures an amount of received data according to various embodiments.

FIG. 23 illustrates an example of a method by which the electronic device measures an amount of received data according to various embodiments.

Referring to FIG. 23, data received through various paths (for example, an MCG bearer, a split bearer, and an SCG bearer) may be transmitted to an AP 2310 through an LTE modem 2330 or a 5G modem 2340.

According to various embodiments, the LTE modem 2330 may include a PHY layer 2331, a MAC layer 2332, an RLC layer 2333, and a PDCP layer 2334 as described above, and the 5G modem 2340 may include a PRY layer 2341, a MAC layer 2342, an RLC layer 2343, and a PDCP layer 2344 as described above.

According to various embodiments, data processed by the PDCP layers 2334 and 2344 of the LTE modem 2330 and the 5G modern 2340 may be distributed to rmnets (remote networks) 2321, 2322, and 2323 of a kernel 2320 by Hostifs (host interfaces) 2335 and 2345 on the basis of each service type.

According to various embodiments, each Hostif (host interface) 2335 or 2345 may identify the packet size of transmitted/received data and determine whether to configure the low-power mode on the basis of the identified packet size.

According to various embodiments, if the packet size for configuring the low-power mode is configured as 10 kB or lower and it is assumed that the packet sizes of the transmitted/received data, identified by the Hostif 2335 or 2345 are 1843 bytes, 543 bytes, and 1476 bytes, the 5G modem 2340 may be configured in the low-power mode and switch to the sleep state.

A method of operating an electronic device supporting dual connectivity according to one of various embodiments may be provided. The electronic device may include a first communication processor 212 supporting first network communication with a first network and a second communication processor 214 supporting second network communication with a second network different from the first network. The method may include an operation of, if both the first network communication and the second network communication are configured in a radio resource control (RRC)-connected state in which data can be transmitted and if an amount of transmitted or received data satisfies a predetermined condition, configuring a low-power mode, an operation of performing at least one operation for releasing an RRC connection with the second network through the second communication processor in response to the configuration of the low-power mode, and an operation of switching the second communication processor to a sleep state if the RRC connection with the second network is released.

According to various embodiments, the predetermined condition may include the case in which the packet size of the transmitted or received data is equal to or smaller than a preset first size.

According to various embodiments, the predetermined condition may include the case in which traffic throughput of the transmitted or received data per unit time is equal to or smaller than a preset second value.

According to various embodiments, the electronic device may further include a display, and the configuration of the low-power mode may be performed when the display is in an off state.

According to various embodiments, at least one operation for releasing the RRC connection with the second network may include an operation of transmitting a measurement report of a first type event configured to be reported when a signal of a currently served node is smaller than a specific value.

According to various embodiments, at least one operation for releasing the RRC connection with the second network may include an operation of transmitting a specific report in which a measurement result related to a channel state is configured as a predetermined value smaller than a threshold value.

According to various embodiments, the sleep state of the second communication processor may include a state configured to stop at least one function of the second communication processor.

Figure 24A:
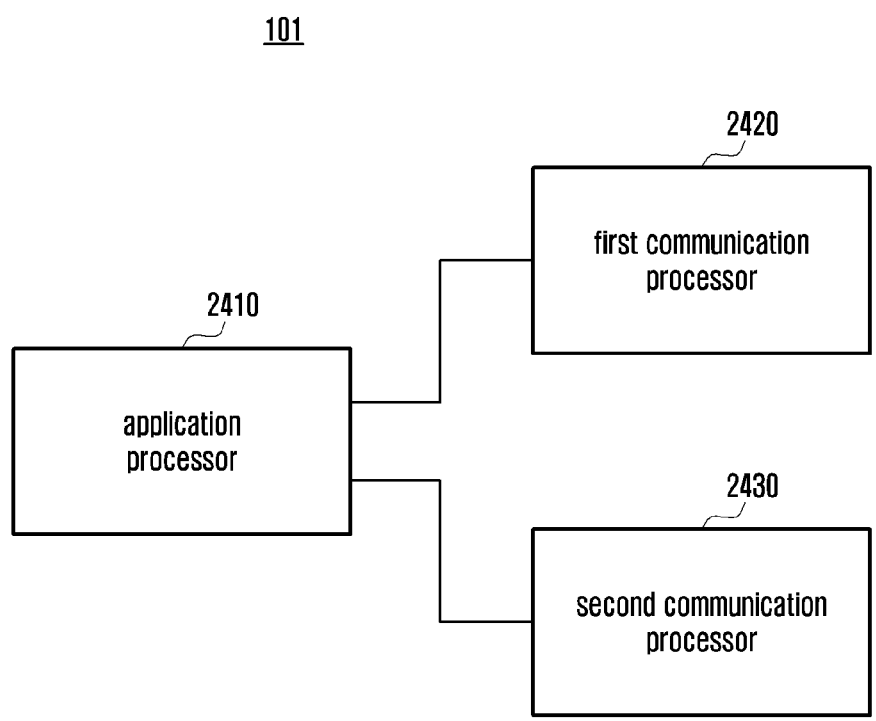
FIG. 24A is a block diagram illustrating the electronic device according to various embodiments of the disclosure.

FIG. 24A is a block diagram of an electronic device according to various embodiments of the disclosure.

Referring to FIG. 24A, an electronic device 500 (for example, the electronic device 101 of FIG. 1) according to various embodiments of the disclosure may include an application processor 2410 (for example, the processor 120 of FIG. 1), a first communication processor 2420 (for example, the first communication processor 212 of FIG. 2), and a second communication processor 2430 (for example, the second communication processor 214 of FIG. 2).

According to various embodiments of the disclosure, the application processor 2410 may be electrically connected to the first communication processor 2420 and the second communication processor 2430. The application processor 2410 may transmit or receive data to and from an external electronic device (not shown) through the first communication processor 2420 or the second communication processor 2430. The application processor 2410 may control various applications installed in the electronic device 101 on the basis of transmitted or received data. According to an embodiment, the first communication processor 2420 and the second communication processor 2430 may be implemented as first communication circuitry and second communication circuitry within a single chip or a single package.

According to various embodiments of the disclosure, the first communication processor 2420 may perform first cellular communication with a first node (the master node (MN) 410 of FIG. 4A). The first communication processor 2420 may transmit or receive a control message and data to or from the first node 410 through first cellular communication. The first cellular communication may be one of various cellular communication schemes supported by the electronic device 101. For example, the first cellular network 292 may be one of $4^{th}$ generation mobile communication schemes (for example, long-term evolution (LTE), LTE-advanced (LTE-A), and LTE-A pro) and may correspond to, for example, a communication scheme on the first cellular network 292 of FIG. 2. The first node 410 may be a base station supporting first cellular communication.

According to various embodiments of the disclosure, the second communication processor 2430 may perform second cellular communication with a second node (for example, the secondary node (SN) 420 of FIG. 4A). The second communication processor 2430 may transmit or receive data to or from the second node 420 through second cellular communication. The second cellular communication may be one of various cellular communication schemes supported by the electronic device 101 and may correspond to a communication scheme on the second cellular network 294 of FIG. 2. For example, the second cellular communication may be one of $5^{th}$ generation mobile communication schemes (for example, 5G). The second node 420 may be a base station supporting second cellular communication.

According to various embodiments of the disclosure, an E-UTRAN-NR dual connectivity (EN-DC) environment in which the first cellular communication is a $4^{th}$ generation mobile communication scheme and the second cellular communication is a $5^{th}$ generation mobile communication scheme is mainly described, but the disclosure is not limited thereto. For example, various embodiments of the disclosure may be applied to an NR-E-UTRAN dual connectivity (NE-DC) environment in which the first cellular communication is a $5^{th}$ generation mobile communication scheme and the second cellular communication is a $4^{th}$ generation mobile communication scheme and an environment in which both the first cellular communication scheme and the second cellular communication scheme are a $5^{th}$ generation mobile communication scheme but they support different frequency bands. According to various embodiments of the disclosure, the application processor 2410 may transmit or receive data through the first cellular communication or the second cellular communication by controlling the first communication processor 2420 and the second communication processor 2430.

According to various embodiments of the disclosure, the electronic device 101 may use both the first cellular communication and the second cellular communication. The electronic device 101 may transmit or receive data for the connection of the second cellular communication to or from the first node 410 through the first cellular communication. The data for the connection of the second cellular communication may include a radio resource control message. When the connection of the second cellular communication is established and the data through the second cellular communication is transmitted/received, power consumption may be higher than data transmission/reception using only the first cellular communication. When the second cellular communication is a $5^{th}$ generation cellular communication, power consumption used for the second cellular communication may be higher than power consumption required for the first cellular communication through various operations supported by the second cellular communication (for example, beam searching, beamforming, and communication using a high frequency band of an mmWave band).

According to various embodiments of the disclosure, when the electronic device 101 uses the second cellular communication, temperature of the second electronic device 101 may increase due to the use of the second cellular communication. If the temperature of the electronic device 101 increases, various elements of the electronic device 101 may be damaged and a threshold voltage for operating various elements may increase, and thus higher power consumption may be required. Hereinafter, various embodiments for entry into a heat suppression mode to prevent the electronic device 101 from overheating due to power consumption will be described.

According to various embodiments of the disclosure, the heat suppression mode may be a mode in which various elements of the electronic device 101 (for example, the first communication processor 2420 or the second communication processor 2430) performs various operations to reduce the temperature of the electronic device 101. The heat suppression mode according to various embodiments of the disclosure may include an operation for inducing already activated second cellular communication to switch to an inactive state or an operation for, when the second cellular communication is in the inactive state, preventing the second cellular communication from switching to the active state. According to various embodiments of the disclosure, the application processor 2410 may identify context information of the electronic device 101 may determine whether the electronic device enters the heat suppression mode on the basis of the context information. The context information may include various pieces of information used to determine whether the electronic device enters the heat suppression mode and also various pieces of information collected by the electronic device 101.

According to various embodiments of the disclosure, the context information may include information related to temperature collected by at least one temperature measurement sensor (for example, the sensor module 176 of FIG. 1) included in the electronic device 101. Temperature measured by the temperature measurement sensor may include temperature of one of various elements included in the electronic device 101. The temperature measurement sensor may measure temperature of an element that influences the generation of heat of the electronic device 101. Temperature measured by the temperature measurement sensor may be a value obtained by measuring and/or calculating temperature of at least one of the various elements included in the electronic device 101. For example, at least one temperature measurement sensor may measure temperature of the application processor 2410. Alternatively, least one temperature measurement sensor may measure temperature of the first communication processor 2420 and/or the second communication processor 2430. A description of the temperature measurement sensor and a temperature measurement scheme will be made with reference to FIG. 24B.

According to various embodiments of the disclosure, the context information may include attribute information of an application executed by the application processor 2410. The application processor 2410 may execute an application installed in a memory (for example, the memory 130 of FIG. 1) and control the executed application. If a predetermined application is executed, the application processor 2410 may determine that the electronic device enters the heat suppression mode. The predetermined application may be determined by an input of a designer or a user of the electronic device 101 and may be an application that cause the application processor 2410 to generate much heat. For example, the predetermined application may include an application (for example, a game application) that causes the application processor 2410 to generate much heat when executed. In another example, the predetermined application may be a voice service application (Volte) through the first cellular communication. The electronic device may be configured to enter the heat suppression mode while the voice service application is executed.

According to various embodiments of the disclosure, the context information may include termination of an application being executed by the application processor 2410. The application processor 2410 may execute an application installed in a memory (for example, the memory 130 of FIG. 1) and control the executed application. If execution of the predetermined application is terminated by the user or a terminal operation, the application processor 2410 may determine to release the heat suppression mode. The predetermined application may be determined by an input of a designer or a user of the electronic device 101 and may be an application that cause the application processor 2410 to generate much heat. For example, the predetermined application may include an application (for example, a game application) that causes the application processor 2410 to generate much heat when executed. For example, the predetermined application may be a voice service application (Volte) through the first cellular communication. When the voice service application is terminated by the user or terminal and base station operations, it may be determined to release the heat suppression mode.

According to various embodiments of the disclosure, if an application supporting a specific function is executed, the application processor 2410 may determine not to enter the heat suppression mode. The application processor 2410 may identify a profile of an application stored in the memory 130 and identify whether the executed application supports a specific function on the basis of the identification result. The specific function may include a function requiring the second cellular communication. According to an embodiment, the specific function may include a function requiring low delay communication (ultra-reliable low latency communication (URLLC)). For example, the specific function may include a video streaming service, a virtual reality provision service, and an augmented reality provision service.

According to various embodiments of the disclosure, the content information may include information related to operations of various elements (for example, the display device 160 of FIG. 1) included in the electronic device 101. If various elements included in the electronic device 101 are activated, the context information may include information indicating whether an element (for example, the display device 160 of FIG. 1) generating high heat is activated.

According to various embodiments of the disclosure, the application processor 2410 may determine whether to enter the heat suppression mode on the basis of the context information. The application processor 2410 may generate a signal indicating whether to enter the heat suppression mode in accordance with the determination of entry into the heat suppression mode. The application processor 2410 may transmit the signal indicating whether the electronic device enters the heat suppression mode to at least one of the first communication processor 2420 or the second communication processor 2430.

According to various embodiments of the disclosure, the signal indicating whether to enter the heat suppression mode may be transmitted through a signal path connected between the application processor 2410 and the second communication processor 2430. According to various embodiments of the disclosure, the signal indicating whether to enter the heat suppression mode may be transmitted through a signal path (for example, high speed (HS)-UART or PCI express (PCIe)) connected between the application processor 2410 and the first communication processor 2420. The signal indicating whether to enter the heat suppression mode may be implemented in the form of interprocessor communication (IPC). The signal indicating whether to enter the heat suppression mode may two types. The signal indicating whether the electronic device enters the heat suppression mode may be 1 (True) that is a type indicating entry into the heat suppression mode and 0 (False) that is a type indicating entry into a normal mode rather than the heat suppression mode.

According to various embodiments of the disclosure, the signal indicating whether to enter the heat suppression mode may be generated and transmitted according to a preset period. The preset period may be configured to smooth mode switching of the first communication processor 2420 or the second communication processor 2430 in consideration of a time required for mode switching of the first communication processor 2420 or the second communication processor 2430.

According to various embodiments of the disclosure, the signal indicating whether to enter the heat suppression mode may be one of two or more stages. The application processor 2410 may select one of the two or more stages according to detected temperature or a heat level. One of the two or more stages may be the signal indicating whether to enter the heat suppression mode, the signal being transmitted to the second communication processor 2430.

According to various embodiments of the disclosure, the second communication processor 2430 may receive the signal indicating whether to enter the heat suppression mode from the application processor 2410 and determine whether to enter the heat suppression mode on the basis of the received signal. When receiving the signal indicating entry into the heat suppression mode, the second communication processor 2430 may determine to enter the heat suppression mode.

According to various embodiments of the disclosure, the first communication processor 2420 may receive the signal indicating whether to enter the heat suppression mode from the application processor 2410 and determine whether to enter the heat suppression mode on the basis of the received signal. When receiving the signal indicating to enter the heat suppression mode, the first communication processor 2420 may determine that the second communication processor 2430 enters the heat suppression mode.

According to various embodiments of the disclosure, even though the first communication processor 2420 having entered the heat suppression mode receives a configuration for measurement of the quality of the communication with a second cellular base station (for example, the second node 420) supporting the second cellular communication for the connection with the second cellular base station (for example, a configuration (a configuration of event B1) including reference for the quality of the communication with the second cellular base station to be included in a report transmitted to the first node for the connection with the second cellular base station) from the first node, the second communication processor 2430 may not measure the quality of the communication with the second cellular base station. The second communication processor 2430 may not measure the quality of the second cellular communication and not transmit the measurement result to the first node. According to various embodiments of the disclosure, the second communication processor 2430 may measure the quality of the communication with the second cellular base station but not transmit the measurement result to the first node. Since the first node has not received the measurement result, the connection of the second cellular communication with the electronic device 101 may not be made.

According to various embodiments of the disclosure, even though the second communication processor 2430 receives configuration information for measurement of the quality of the second cellular communication (for example, configuration information (a configuration of event A2) including a condition for, if the quality of the second cellular communication is equal to or lower than a predetermined level, starting the operation of discovering another cell other than the connected second cellular communication base station) from the second node 420 in order to determine that the use of the second cellular communication is not possible in the state in which the second cellular communication is activated, the quality of the second cellular communication may not be measured. If the quality of the second cellular communication is not measured, the second communication processor 2430 may transmit a false quality measurement report. According to various embodiments of the disclosure, even when the second communication processor 2430 has a measurement value of the quality of the second cellular communication, the false quality measurement result may be transmitted.

According to various embodiments of the disclosure, the false quality measurement report may be a report on the quality lower than the quality of the second cellular communication measured regardless of the actual quality of the second cellular communication. The lower quality may be a quality that does not satisfy the quality required for performing the second cellular communication.

According to various embodiments of the disclosure, the second communication processor 2430 may make a request for transmitting a false quality measurement report to the first node 410 to the first communication processor 2420. The first communication processor 2420 may transmit the false quality measurement report to the first node 410. The first node 410 may determine that a quality of the already connected second cellular communication is low and perform an operation related to release of the connection of the second cellular communication.

According to various embodiments of the disclosure, if the second communication processor 2430 identifies that the connection of the second cellular communication is not released after a predetermined time from transmission of the false quality measurement report, the second communication processor 2430 may transmit information indicating failure of the second cellular communication to the first communication processor 2420. The first communication processor 2420 may transmit information indicating failure of the second cellular communication to the first node 410. The first node 410 may transmit a signal that makes a request for releasing the connection of the second cellular communication to the second node 420 in response to reception of the information indicating failure of the second cellular communication. Through the above scheme, the second cellular communication connected between the second node 420 and the electronic device 101 may be deactivated.

According to various embodiments of the disclosure, the second communication processor 2430 may switch the second cellular communication to the inactive state and reduce heat generated by the use of the second cellular communication. Through the various embodiments, the generation of heat may be suppressed. The second communication processor 2430 may switch to a sleep state as the second cellular communication switches to the inactive state. Alternatively, the second communication processor 2430 may switch to a power off state as the second cellular communication switches to the inactive state.

Figure 24B:
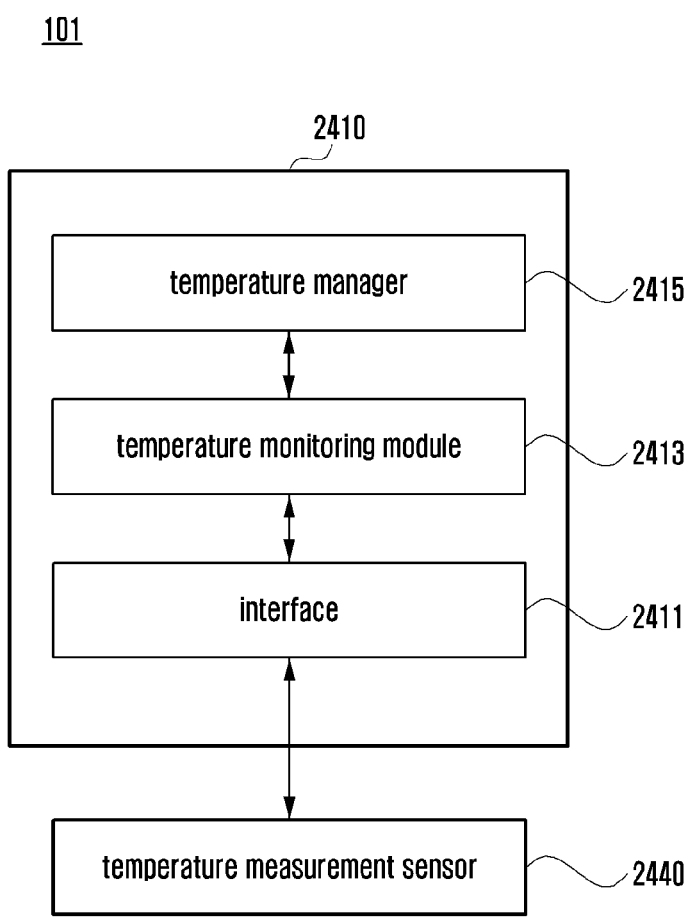
FIG. 24B illustrates a configuration in which the electronic device measures temperature and enters a heat suppression mode according to various embodiments of the disclosure.

FIG. 24B illustrates the configuration in which an electronic device measures temperature and enters a heat suppression mode according to various embodiments of the disclosure.

Referring to FIG. 24B, an electronic device (for example, the electronic device 101 of FIG. 1) according to various embodiments of the disclosure may include a temperature measurement sensor 2440, an interface 2411, a temperature monitoring module 2413, and a temperature manager 2415.

Referring to FIG. 24B, it is illustrated that the interface 2411, the temperature monitoring module 2413, and the temperature manager 2415 are implemented on the application processor 2410 but may be implemented on the application processor 2410, the first communication processor 2420, the second communication processor 2430, or a separate circuit module.

According to various embodiments of the disclosure, the temperature measurement sensor 2440 may be connected to one or more elements included in the electronic device 101. For example, the temperature measurement sensor 2440 may be connected to one or more elements of the application processor 2410, the first communication processor 2420, or the second communication processor 2430. The temperature measurement sensor 2440 may be disposed on a circuit substrate on which one or more elements of the electronic device 101 are implemented. The temperature measurement sensor 2440 may be operatively connected to the temperature monitoring module 2413 through the interface 2411. According to various embodiments of the disclosure, the temperature measurement sensor 2440 may be located on elements FIG. 2. For example, one or more temperature measurement sensors 2440 may be located on at least one module of the antenna modules 242, 244, and 245, the RFICs 222, 224, 226, and 228, the RFEEs 232, 234, and 236, the communication processors 212 and 213, and the processor 120.

According to various embodiments of the disclosure, the temperature monitoring module 2413 may determine representative temperature of the electronic device 101 on the basis of temperature of one or more elements measured by the temperature measurement sensor 2440 and transmit the determined representative temperature to the temperature manager 2415.

According to various embodiments of the disclosure, the temperature monitoring module 2413 may determine a representative temperature value of the electronic device 101 on the basis of temperature of one or more elements included in the electronic device 101. The representative temperature value of the electronic device 101 may be temperature of one of the one or more elements of the electronic device 101 or surface temperatures of a housing (not shown) of the electronic device 101 determined on the basis of temperature of one or more elements of the electronic device 101.

According to various embodiments of the disclosure, the temperature monitoring module 2413 may control the temperature measurement sensor 2440 to measure temperature by transmitting an interrupt to the temperature measurement sensor 2440. The interrupt may be generated in every set time or generated according to context information of the electronic device 101. The preset time for the generation of the interrupt may vary depending on the context information of the electronic device 101. According to various embodiments of the disclosure, the temperature measurement sensor 2440 may transmit a periodically measured temperature value to the temperature monitoring module 2413 without any additional request.

According to various embodiments of the disclosure, the temperature monitoring module 2413 may determine the surface temperature of the housing (not shown) of the electronic device 101 on the basis of temperature of one or more elements of the electronic device 101. The temperature monitoring module 2413 may determine the surface temperature on the basis of a weight value set for each of the one or more elements of the electronic device 101. The weight value may be preset by a manufacturer of the electronic device 101 and vary depending on the context information of the electronic device 101.

According to various embodiments of the disclosure, the temperature monitoring module 2413 may change a weight value corresponding to an element of the electronic device 101 that gives the greatest influence to the remaining power consumption of the electronic device 101 to be higher than weight values corresponding to other elements.

For example, the temperature monitoring module 2413 may configure a weight value corresponding to the second communication processor 2430 to be higher than a weight value corresponding to another element (for example, the application processor 2410) on the basis of the context information of the electronic device 101 (for example, context information indicating activation of the second cellular communication).

In another example, the temperature monitoring module 2413 may configure a weight value corresponding to the application processor 2410 to be higher than a weight value corresponding to another element (for example, the first communication processor 2420) on the basis of the context information of the electronic device 101 (for example, context information indicating execution of a game application which is a predetermined application).

In another example, the temperature monitoring module 2413 may configure a weight value corresponding to the second communication processor 2430 to be higher than a weight value corresponding to another element (for example, the application processor 2410) on the basis of the context information of the electronic device 101 (for example, context information indicating execution of a video streaming application which is a predetermined application).

In another example, the temperature monitoring module 2413 may configure a weight value corresponding to a battery (for example, the battery 189 of FIG. 1) to be higher than a weight value corresponding to another element (for example, the application processor 2410) on the basis of the context information of the electronic device 101 (for example, context information indicating that the electronic device 101 is being charged).

According to various embodiments of the disclosure, if the configuration of the representative temperature value is changed, the temperature monitoring module 2413 may compensate for the representative temperature value in order to prevent a rapid change in the representative temperature value. If the weight value is changed in the state in which the respective elements have temperature difference, a rapid change in the representative temperature value may be made. For example, the temperature monitoring module 2413 may configure an average value of the representative temperature value before the change and the representative temperature value after the change as the representative temperature value. In another example, the temperature monitoring module 2413 may configure an intermediate value of a compensation graph generated on the basis of the representative temperature value before the change and the representative temperature value after the change as the representative temperature value.

According to various embodiments of the disclosure, the temperature manager 2415 may determine the operation of the electronic device 101 on the basis of the representative temperature value transmitted by the temperature monitoring module 2413 and policy data.

According to various embodiments of the disclosure, the temperature manager 2415 may identify the representative temperature value and perform an operation corresponding to the representative temperature value with reference to the policy data. For example, the operation corresponding to the representative temperature value may include an operation of entering the heat suppression mode.

According to various embodiments of the disclosure, the policy data may be data to which the operation to be performed by the electronic device 101 is mapped according to the representative temperature value. The policy data may be implemented in a table form. The policy data may include an operation related to the generation of heat of the electronic device 101. For example, operations for suppressing the generation of heat of the electronic device 101 may be included in the policy data.

According to various embodiments of the disclosure, the policy data may include throttling reference temperature which refers to temperature at a time point at which the operation for suppressing heat of the electronic device 101 starts and mitigation reference temperature which refers to temperature at a time point at which the operation for suppressing heat of the electronic device 101 is released.

According to various embodiments of the disclosure, the throttling reference temperature may be configured differently according to the representative temperature value and may be equal to or lower than maximum allowable temperature of various elements included in the electronic device 101.

According to various embodiments of the disclosure, the mitigation reference temperature may be configured differently according to the representative temperature value and may be equal to or higher than proper allowable temperature of various elements included in the electronic device 101.

According to various embodiments of the disclosure, the throttling reference temperature and the mitigation reference temperature may be variously configured according to a policy of a manufacturer of the electronic device 101. For example, the throttling reference temperature and the mitigation reference temperature may include an offset according to a time required for thermal diffusion. A parameter for configuring the offset may be configured according to a policy of a manufacturer of the electronic device 101.

According to various embodiments of the disclosure, the policy data may include an operation of the electronic device 101 to be performed to suppress the heat. The temperature manager 2415 may execute various operations on the basis of the context information, the representative temperature, and the policy data. Hereinafter, the operation configured in the policy data and the parameter will be described.

According to various embodiments of the disclosure, the temperature manager 2415 may control a maximum operation frequency of an element of the electronic device 101 (for example, the application processor 2410 or a memory (for example, the memory 130 of FIG. 1)) according to the determined representative temperature in one or more stages on the basis of the policy data. If higher representative temperature is measured, the temperature manager 2415 may perform a method of controlling the maximum operation frequency of the element to be lower. If rapid cooling is needed, the temperature manager 2415 may control the maximum operation frequency of the element to be lower.

According to various embodiments of the disclosure, the temperature manager 2415 may control the size of a charging current according to the determined representative temperature in one or more stages on the basis of the policy data. If higher representative temperature is measured, the temperature manager 2415 may perform a method of controlling the size of the charging current to be lower. If rapid cooling is needed, the temperature manager 2415 may control the size of the charging current to be lower.

According to various embodiments of the disclosure, the temperature manager 2415 may control brightness of a display (for example, the display device 160 of FIG. 1) according to the determined representative temperature in one or more stages on the basis of the policy data. If higher representative temperature is measured, the temperature manager 2415 may perform a method of controlling the brightness of the display 160 to be lower. If rapid cooling is needed, the temperature manager 2415 may control the brightness of the display 160 to be lower.

According to various embodiments of the disclosure, the temperature manager 2415 may control a quality of content (for example, frames per second (FPS) of content displayed on the display 160 or a sound quality of content output through the sound output device 155) displayed on the display 160 or output through the speaker (for example, the sound output device 155 of FIG. 1) according to the determined representative temperature in one or more stages on the basis of the policy data. If higher representative temperature is measured, the temperature manager 2415 may perform a method of controlling the quality of content to be lower. If rapid cooling is needed, the temperature manager 2415 may control the quality of content to be lower.

According to various embodiments of the disclosure, the temperature manager 2415 may control an operation (for example, an operation of activating a flash) of a camera (for example, the camera module 1270) according to the determined representative temperature in one or more stages on the basis of the policy data. If higher representative temperature is measured, the temperature manager 2415 may perform a method of deactivating the flash. If rapid cooling is needed, the temperature manager 2415 may deactivate the flash.

According to various embodiments of the disclosure, the temperature manager 2415 may determine whether the second communication processor 2430 enters the heat suppression mode on the basis of the policy data. The second communication processor 2430 may receive a signal indicating entry into the heat suppression mode from the temperature manager 2415 and perform the operation illustrated in FIG. 24A.

According to various embodiments of the disclosure, the temperature manager 2415 may generate the signal indicating that the second communication processor 2430 enters the heat suppression mode on the basis of the representative temperature and the policy data and transmit the signal to the second communication processor 2430. For example, the temperature manager 2415 may generate the signal indicating that the second communication processor 2430 enters the heat suppression mode in response to identification that the representative temperature is higher than throttling reference temperature included in the policy data and transmit the signal to the second communication processor 2430. In another example, the temperature manager 2415 may generate the signal indicating that the second communication processor 2430 operating in the heat suppression mode in response to identification that the representative temperature is lower than throttling reference temperature included in the policy data and transmit the signal to the second communication processor 2430.

Figure 25:
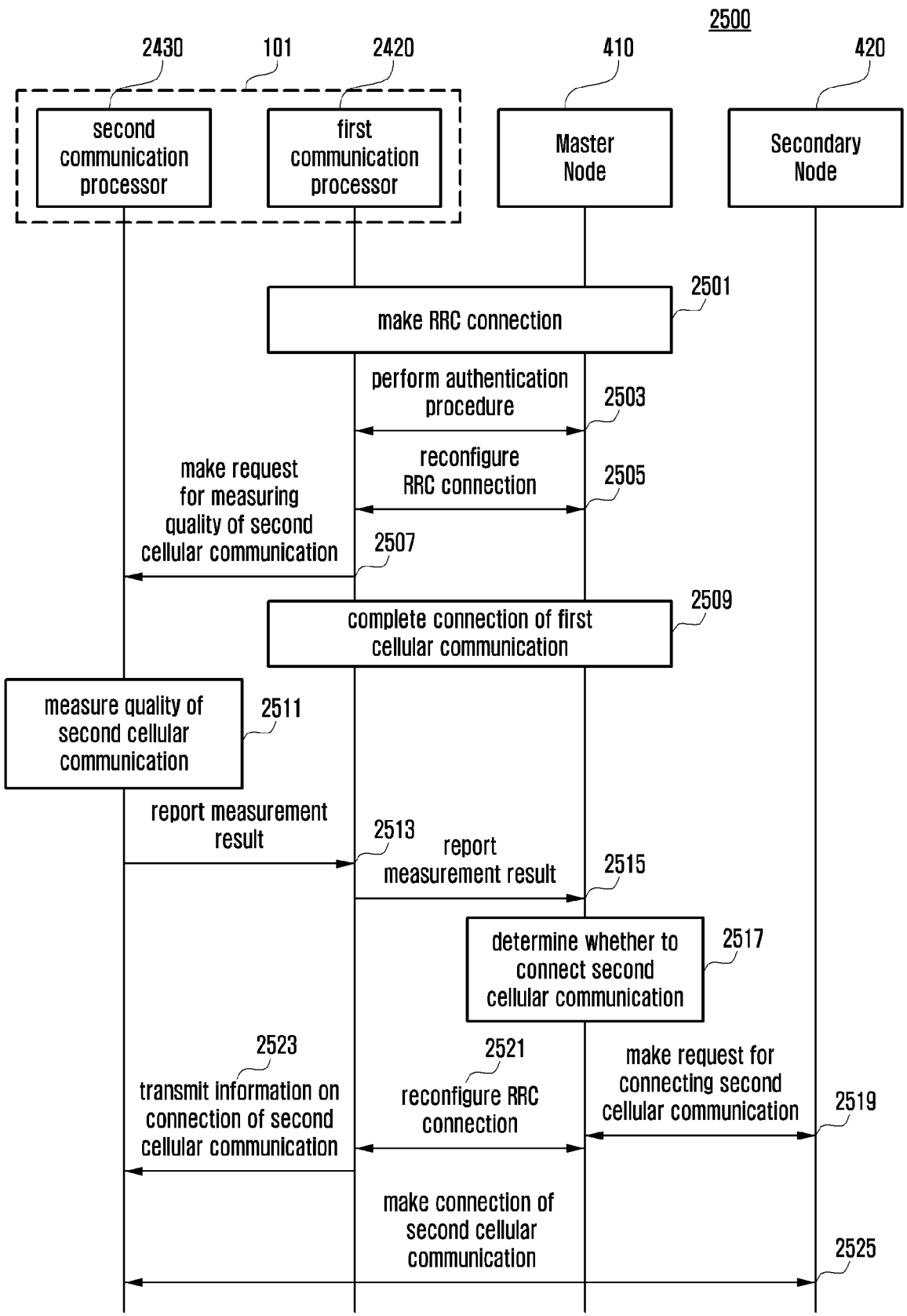
FIG. 25 is a flowchart illustrating the operation for the connection of first cellular communication and second cellular communication when the electronic device does not enter a heat suppression mode according to various embodiments of the disclosure.

FIG. 25 is a flowchart illustrating a connection operation 2502500 of first cellular communication and second cellular communication when an electronic device does not enter a heat suppression mode according to various embodiments of the disclosure.

An electronic device (for example, the electronic device 101 of FIG. 1) illustrated in FIG. 25 may be an electronic device which can support multi-radio access technology (RAT) dual connectivity (MR-DC) for the simultaneous connection of the first cellular communication and the second cellular communication. A master node (for example, the master node 410 of FIG. 4) supporting the first cellular communication and a secondary node (for example, the secondary node 420 of FIG. 4) supporting the second cellular communication may be base stations supporting MR-DC.

According to various embodiments of the disclosure, in operation 2501, the first communication processor 2420 and the master node 410 may make a radio resource control (RRC) connection of the first cellular communication. The master node supporting the first cellular communication may transmit information indicating that the master node is a base station supporting MR-DC through system information (for example, system information 1 (SIB1) and system information 2 (SIB2)).

According to various embodiments of the disclosure, the first communication processor 2420 and the master node 410 may transmit and receive a control message related to radio bearer setup, paging, or mobility management while making the RRC connection.

According to various embodiments of the disclosure, in operation 2503, the first communication processor 2420 and the master node 410 may perform an authentication procedure.

According to various embodiments of the disclosure, the authentication procedure may be procedure for providing an identification of whether the electronic device 101 is the electronic device 101 which can use the first cellular communication or the second cellular communication to a server of a service provider which provides the first cellular communication or the second cellular communication.

According to various embodiments of the disclosure, in operation 2505, the first communication processor 2420 and the master node 410 may reconfigure the RRC connection.

According to various embodiments of the disclosure, the master node 410 may reconfigure the RRC connection to include a configuration of an event (event 131) that makes a request for measuring a quality of the second cellular communication for the connection of the second cellular communication and transmit the same to the first communication processor 2420.

According to various embodiments of the disclosure, in operation 2507, the first communication processor 2420 may transmit the request for measuring the quality of the second cellular communication to the second communication processor 2430.

According to various embodiments of the disclosure, in operation 2509, the first communication processor 2420 may complete the connection of the first cellular communication with the master node 410. Operation 2509 may be generated by operations 2501 and 2503 and may be performed separately from operations 2505 and 2507.

According to various embodiments of the disclosure, in operation 2511, the second communication processor 2430 may receive a signal that makes a request for measuring the quality of the second cellular communication transmitted by the first communication processor 2420 and measure the quality of the second cellular communication.

According to various embodiments of the disclosure, in operation 2513, the second communication processor 2430 may transmit a result of the measurement of the quality of the second cellular communication to the first communication processor 2420.

According to various embodiments of the disclosure, in operation 2515, the first communication processor 2420 may transmit the result of the measurement of the quality of the second cellular communication to the master node 410.

According to various embodiments of the disclosure, in operation 2517, the master node 410 may identify the result of the measurement of the quality of the second cellular communication and determine whether the second cellular communication is connected between the secondary node 420 and the electronic device 101.

According to various embodiments of the disclosure, the master node 410 may identify the result of the measurement of the quality of the second cellular communication measured in operation 2513 and, if the quality of the second cellular communication measured by the electronic device 101 is higher than or equal to a preset value, determine that the second cellular communication is connected.

According to various embodiments of the disclosure, in operation 2519, the master node 410 may transmit a request for connecting the second cellular communication to the secondary node 420. Operation 2519 may be generated by operation 2517 and may be performed separately from operations 2521 and 2523. For example, operation 2519 may be performed before or after operations 2521 and 2523 or performed at the same time.

According to various embodiments of the disclosure, in operation 2521, the master node 410 may transmit information on the connection of the second cellular communication to the electronic device 101 while reconfiguring the RRC connection. The information on the connection may include a configuration of an event (event A2) that makes a request for measuring the quality of the second cellular communication. The information on the connection of the second cellular communication transmitted by the master node 410 may be transmitted to the first communication processor 2420. The information on the connection may include information used for the connection of the electronic device 101 to the secondary node 420 and transmitted to the first communication processor 2420.

According to various embodiments of the disclosure, in operation 2523, the first communication processor 2420 may transmit the received information on the connection of the second cellular communication to the second communication processor 2430.

According to various embodiments of the disclosure, in operation 2525, the second communication processor 2430 and the secondary node 420 may make the connection of the second cellular communication on the basis of the information on the connection.

Figure 26:
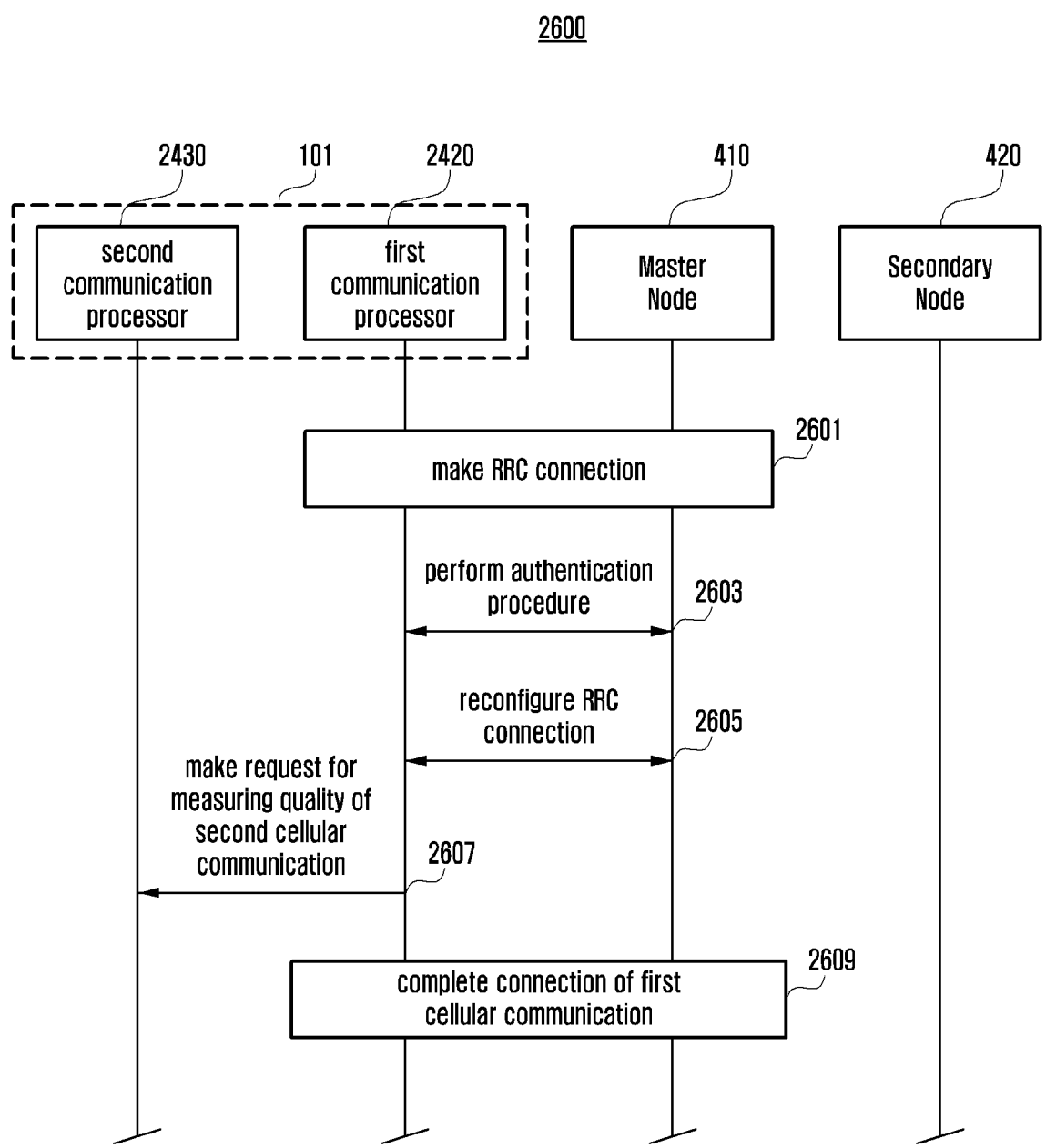
FIG. 26 is a flowchart illustrating the operation for the connection of the first cellular communication and the second cellular communication when the electronic device enters the heat suppression mode according to various embodiments of the disclosure.
Figure 27:
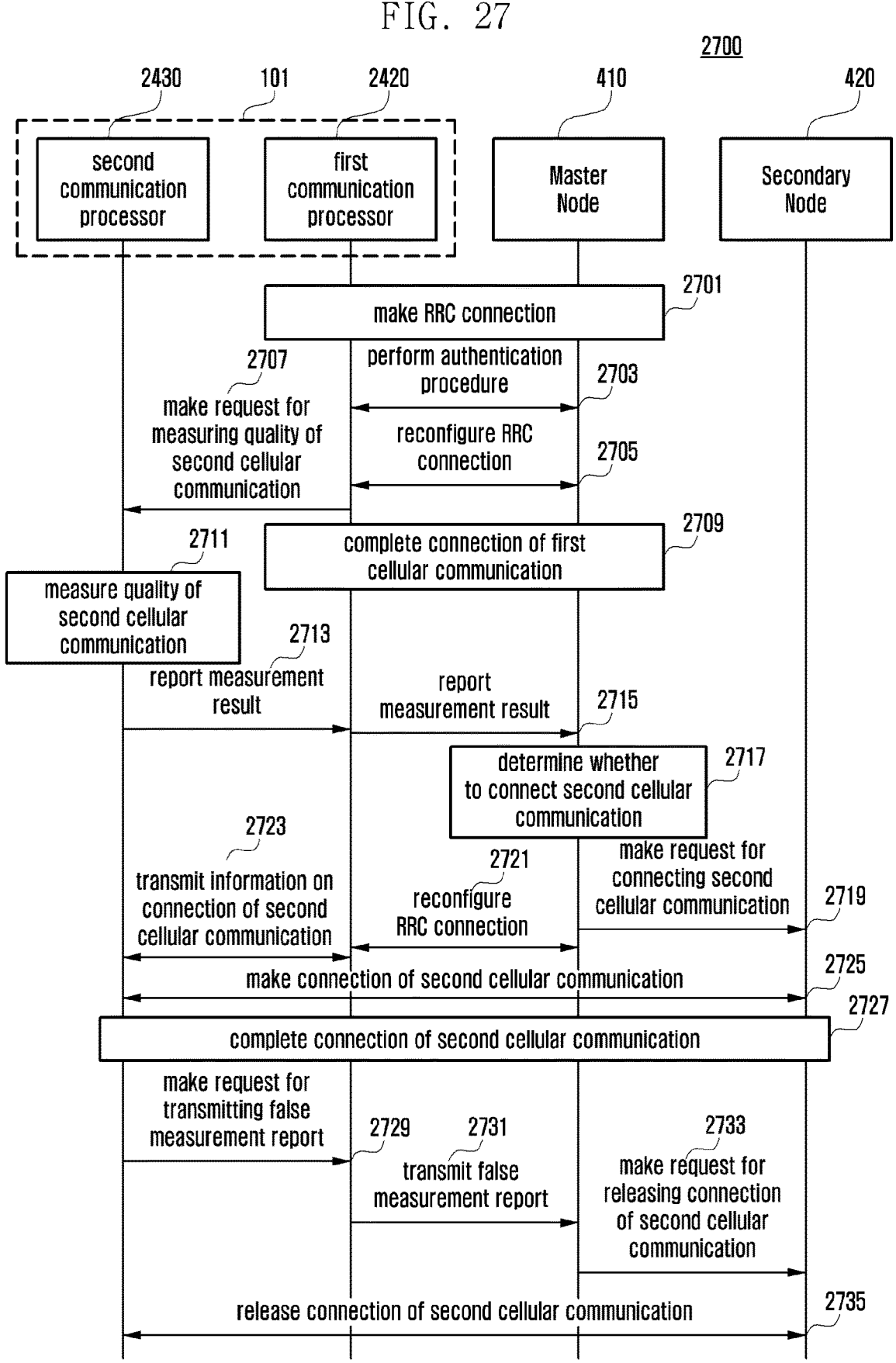
FIG. 27 is a flowchart illustrating the operation in which the electronic device enters the heat suppression mode in the state in which first cellular communication and second cellular communication are connected according to various embodiments of the disclosure.

The operation for the connection of the first cellular communication and the second cellular communication illustrated in FIG. 25 may be performed when entry into the heat suppression mode is not made. FIGS. 26 and 27 below illustrate the operation for the connection of the first cellular communication and the second cellular communication when entry into the heat suppression mode is made.

FIG. 26 is a flowchart illustrating the connection of the first cellular communication and the second cellular communication when the electronic device enters the heat suppression mode according to various embodiments of the disclosure.

According to various embodiments of the disclosure, an operation method 2600 of the electronic device illustrated in FIG. 26 may be applied to the case in which the first communication processor 2420 and the second communication processor 2430 of the electronic device 101 switches from a power-off state to a power-on state or the case in which first cellular communication is activated (for example, RRC_Connected) but second cellular communication is deactivated. If the first cellular communication is activated but the second cellular communication is deactivated, operations 2601, 2603, 2605, and 2606 may be omitted.

According to various embodiments of the disclosure, in operation 2601, the first communication processor 2420 and the master node 410 may make a radio resource control (RRC) connection of the first cellular communication. The master node supporting the first cellular communication may transmit information indicating that the master node is a base station supporting MR-DC through system information (for example, system information 1 (SIB1) and system information 2 (SIB2)).

According to various embodiments of the disclosure, the first communication processor 2420 and the master node 410 may transmit and receive a control message related to radio bearer setup, paging, or mobility management while making the RRC connection.

According to various embodiments of the disclosure, in operation 2603, the first communication processor 2420 and the master node 410 may perform an authentication procedure.

According to various embodiments of the disclosure, the authentication procedure may be a procedure for providing an identification of whether the electronic device 101 is the electronic device 101 which can use the first cellular communication or the second cellular communication to a server of a service provider which provides the first cellular communication or the second cellular communication.

According to various embodiments of the disclosure, in operation 2605, the first communication processor 2420 and the master node 410 may reconfigure the RRC connection.

According to various embodiments of the disclosure, the master node 410 may transmit an event that makes a request for measuring the quality of the second cellular communication for the connection of the second cellular communication to the first communication processor 2420 while reconfiguring the RRC connection.

According to various embodiments of the disclosure, in operation 2607, the first communication processor 2420 may transmit a request (event B1) for measuring the quality of the second cellular communication to the second communication processor 2430.

According to various embodiments of the disclosure, in operation 2609, the first communication processor 2420 may complete the connection of the first cellular communication with the master node 410. Operation 2609 may be generated by operations 2601 and 2603 and may be performed separately from operations 2605 and 2607.

According to various embodiments of the disclosure, even though the second communication processor 2430 having entered the heat suppression mode receives a configuration for the measurement of the quality of communication with the secondary node 420 supporting second cellular communication for the connection with a second cellular base station (for example, a configuration (a configuration of event B1) including reference for the quality of communication with the secondary node 420 to be included in a report transmitted to the master node 410 for the connection with the secondary node 420) from the master node 410, the second communication processor 2430 may not measure the quality of the communication with the secondary node 420. For example, the second communication processor 2430 may not perform operations 2511 illustrated in FIG. 25.

According to various embodiments of the disclosure, the second communication processor 2430 may not measure the quality of the second cellular communication and not transmit the measurement result to the master node 410. According to various embodiments of the disclosure, the second communication processor 2430 may measure the quality of the communication with the second cellular base station but not transmit the measurement result to the first node. Since the master node 410 has not received the measurement result, it may be determined that the second cellular communication is not connected with the electronic device 101. For example, if the second communication processor 2430 enters the heat suppression mode in the state in which the second cellular communication is deactivated, operations 2511 to 2521 illustrated in FIG. 25 may be omitted.

According to various embodiments of the disclosure, the second communication processor 2430 may switch the second cellular communication to the inactive state and reduce heat generated due to the use of the second cellular communication. Through the various embodiments, the generation of heat may be suppressed. The second communication processor 2430 may switch to a sleep state as the second cellular communication switches to the inactive state. Alternatively, the second communication processor 2430 may switch to a power off state as the second cellular communication switches to the inactive state.

FIG. 27 is a flowchart illustrating an operation in which the electronic device enters the heat suppression mode in the state in which first cellular communication and second cellular communication are connected according to various embodiments of the disclosure.

According to various embodiments of the disclosure, an operation method 2700 of the electronic device illustrated in FIG. 27 may be applied to the case in which the second communication processor 2430 enters the heat suppression mode in the state in which the first cellular communication and the second cellular communication are activated.

According to various embodiments of the disclosure, in operation 2701, the first communication processor 2420 and the master node 410 may make a radio resource control (RRC) connection of the first cellular communication.

According to various embodiments of the disclosure, the first communication processor 2420 and the master node 410 may transmit and receive a control message related to radio bearer setup, paging, or mobility management while making the RRC connection.

According to various embodiments of the disclosure, in operation 2703, the first communication processor 2420 and the master node 410 may perform an authentication procedure.

According to various embodiments of the disclosure, the authentication procedure may be a procedure for providing an identification of whether the electronic device 101 is the electronic device 101 which can use the first cellular communication or the second cellular communication to a server of a service provider which provides the first cellular communication or the second cellular communication.

According to various embodiments of the disclosure, in operation 2705, the first communication processor 2420 and the master node 410 may reconfigure the RRC connection.

According to various embodiments of the disclosure, the master node 410 may transmit an event that makes a request for measuring the quality of the second cellular communication for the connection of the second cellular communication to the first communication processor 2420 while reconfiguring the RRC connection.

According to various embodiments of the disclosure, in operation 2707, the first communication processor 2420 may transmit the request for measuring the quality of the second cellular communication to the second communication processor 2430.

According to various embodiments of the disclosure, in operation 2709, the first communication processor 2420 may complete the connection of the first cellular communication with the master node 410. Operation 2709 may be generated by operations 2701 and 2703 and may be performed separately from operations 2705 and 2707.

According to various embodiments of the disclosure, in operation 2711, the second communication processor 2430 may receive a signal that makes a request for measuring the quality of the second cellular communication transmitted by the first communication processor 2420 and measure the quality of the second cellular communication.

According to various embodiments of the disclosure, in operation 2713, the second communication processor 2430 may transmit a result of the measurement of the quality of the second cellular communication to the first communication processor 2420.

According to various embodiments of the disclosure, in operation 2715, the first communication processor 2420 may transmit the result of the measurement of the quality of the second cellular communication to the master node 410.

According to various embodiments of the disclosure, in operation 2717, the master node 410 may identify the result of the measurement of the quality of the second cellular communication and determine whether the second cellular communication is connected between the secondary node 420 and the electronic device 101.

According to various embodiments of the disclosure, the master node 410 may identify the result of the measurement of the quality of the second cellular communication and, if the quality of the second cellular communication measured by the electronic device 101 is higher than or equal to a preset value, determine to connect the second cellular communication.

According to various embodiments of the disclosure, in operation 2719, the master node 410 may transmit a request for connecting the second cellular communication to the secondary node 420. Operation 2719 may be generated by operation 2717 and may be performed separately from operations 2721 and 2723. For example, operation 2719 may be performed before or after operations 2721 and 2723 or performed at the same time.

According to various embodiments of the disclosure, in operation 2721, the master node 410 may transmit information on the connection of the second cellular communication to the electronic device 101 while reconfiguring the RRC connection. The information on the connection may include a configuration of an event (event A2) that makes a request for measuring the quality of the second cellular communication. The information on the connection of the second cellular communication transmitted by the master node 410 may be transmitted to the first communication processor 2420. The information on the connection may include information used for the connection of the electronic device 101 to the secondary node 420 and transmitted to the first communication processor 2420.

According to various embodiments of the disclosure, in operation 2723, the first communication processor 2420 may transmit the received information on the connection of the second cellular communication to the second communication processor 2430.

According to various embodiments of the disclosure, in operation 2725, the second communication processor 2430 and the secondary node 420 may make the connection of the second cellular communication on the basis of the information on the connection.

According to various embodiments of the disclosure, in operation 2727, the electronic device 101 and the secondary node 420 may complete the connection of the second cellular communication through a series of operations performed in operation 2721.

According to various embodiments of the disclosure, the second communication processor 2430 may receive a signal indicating entry into the heat suppression mode from an application processor (for example, the application processor 2410 of FIG. 24A) in the state in which the connection of the first cellular communication and the second cellular communication is activated. As the second communication processor 2430 receives the signal indicating entry into the heat suppression mode, operations after operation 2729 may be performed. According to various embodiments of the disclosure, in operation 2729, the second communication processor 2430 may transmit a false report on the measurement of the quality of the second cellular communication to the first communication processor 2420.

According to various embodiments of the disclosure, even though the second communication processor 2430 receives configuration information for measurement of the quality of the second cellular communication (for example, configuration information (a configuration of event A2) including a condition for, if the quality of the second cellular communication is equal to or lower than a predetermined level, starting the operation of discovering another cell other than the connected second cellular communication base station) from the second node 420 in order to determine that the use of the second cellular communication is not possible in the state in which the second cellular communication is activated, the quality of the second cellular communication may not be measured. If the quality of the second cellular communication is not measured, the second communication processor 2430 may transmit a false quality measurement report. According to various embodiments of the disclosure, even when the second communication processor 2430 has a measurement value of the quality of the second cellular communication, the false quality measurement result may be transmitted.

According to various embodiments of the disclosure, the false quality measurement report may be a report on the quality lower than the quality of the second cellular communication measured regardless of the actual quality of the second cellular communication. The lower quality may be a quality that does not satisfy the quality required for performing the second cellular communication.

According to various embodiments of the disclosure, in operation 2731, the first communication processor 2420 may transmit the false quality measurement report to the master node 410.

According to various embodiments of the disclosure, the first node 410 may determine that the quality of the already connected second cellular communication is low and perform an operation related to release of the connection of the second cellular communication.

According to various embodiments of the disclosure, in operation 2733, the master node 410 may transmit a request for releasing the connection of the second cellular communication to the secondary node 420.

According to various embodiments of the disclosure, in operation 2735, the electronic device 101 and the secondary node 420 may release the connection of the second cellular communication.

According to various embodiments of the disclosure, if the second communication processor 2430 identifies that the connection of the second cellular communication is not released after a predetermined time from transmission of the false quality measurement report, the second communication processor 2430 may transmit information indicating failure of the second cellular communication to the first communication processor 2420. The first communication processor 2420 may transmit information indicating failure of the second cellular communication to the first node 410. The first node 410 may transmit a signal that makes a request for releasing the connection of the second cellular communication to the second node 420 in response to reception of the information indicating failure of the second cellular communication. Through the various embodiments, the second cellular communication connected between the second node 420 and the electronic device 101 may be deactivated.

According to various embodiments of the disclosure, the second communication processor 2430 may switch the second cellular communication to the inactive state and reduce heat generated by the use of the second cellular communication. Through the various embodiments, the generation of heat may be suppressed. The second communication processor 2430 may switch to a sleep state as the second cellular communication switches to the inactive state. Alternatively, the second communication processor 2430 may switch to a power off state as the second cellular communication switches to the inactive state.

An electronic device according to various embodiments of the disclosure may include: an application processor; a first communication processor configured to perform first cellular communication with a first node; and a second communication processor configured to perform second cellular communication with a second node, wherein the second communication processor is configured to receive signal indicating whether to enter a heat suppression mode from the application processor, receive a signal making a request for measuring a quality of the second cellular communication for a connection of the second cellular communication from the first node or the second node, and when entering the heat suppression mode in response to reception of the signal indicating whether to enter the heat suppression mode, not measure the quality of the second cellular communication in response to reception of the signal making the request.

In the electronic device to various embodiments of the disclosure, the application processor may be configured to determine whether to enter the heat suppression mode on the basis of context information of the electronic device, generate a signal indicating whether to enter the heat suppression mode in response to the determination of entry into the heat suppression mode, and transmit the generated signal to the second communication processor.

In the electronic device to various embodiments of the disclosure, the application processor may be configured to determine whether to enter the heat suppression mode, on the basis of information related to temperature collected by a temperature measurement sensor included in the electronic device.

In the electronic device to various embodiments of the disclosure, the application processor may be configured to determine whether to enter the heat suppression mode on the basis of attributes of an application being executed.

In the electronic device to various embodiments of the disclosure, the application processor may be configured to analyze a profile of the application, identify whether a service capable of providing the application is a service requiring a connection of a second cellular network on the basis of an analysis result, and determine whether to enter the heat suppression mode on the basis of an identification result.

In the electronic device to various embodiments of the disclosure, if entry into the heat suppression mode is performed while the second cellular communication is performed, the second communication processor may be configured to transmit, to the first communication processor, a signal making a request for transmitting a signal for inducing the second node to release the connection of the second cellular communication to the first node.

In the electronic device to various embodiments of the disclosure, the signal inducing the second node to release the connection of the second cellular communication may be a signal transmitted by the first communication process to make a request for transmitting a false measurement result of the second cellular communication to the first node.

In the electronic device to various embodiments of the disclosure, the false measurement result of a parameter may include a value corresponding to a quality lower than the measured quality of the second cellular communication.

In the electronic device to various embodiments of the disclosure, the second communication processor may be configured to make a request for transmitting, to the first node, information indicating failure of the second cellular communication to the first communication processor in response to the identification that the connection of the second cellular communication is not released within a preset time after the false measurement result of a parameter is transmitted to the first node.

In the electronic device to various embodiments of the disclosure, the second communication processor may be configured to, if entry into the heat suppression mode is performed while the second cellular communication is in an inactive state, not measure a parameter related to a quality of a signal of the second cellular communication in response to generation of an event for connecting the second cellular communication.

The application processor of the electronic device according to various embodiments of the disclosure may be configured to switch to the heat suppression mode and then perform first cellular communication through the first communication processor.

Figure 28:
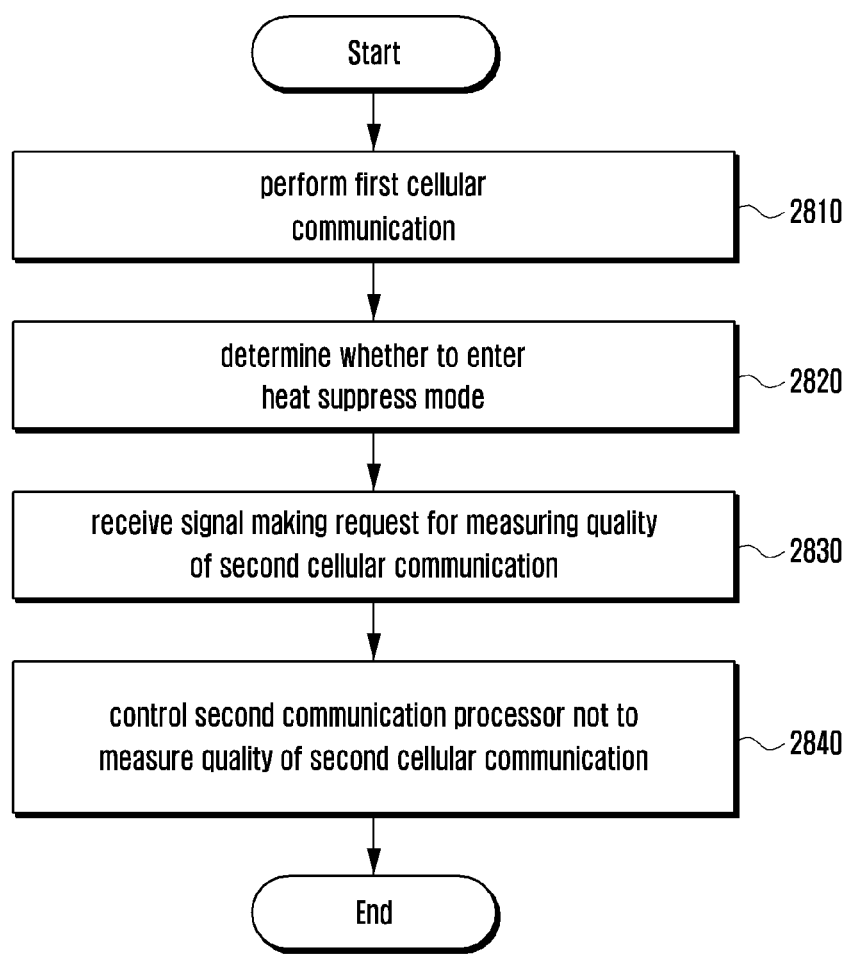
FIG. 28 is a flowchart illustrating a method of operating the electronic device according to various embodiments of the disclosure.

FIG. 28 is a flowchart illustrating a method 900 of operating the electronic device according to various embodiments of the disclosure.

According to various embodiments of the disclosure, in operation 2810, the electronic device 101 may perform first cellular communication.

According to various embodiments of the disclosure, the first cellular communication may be in an active state and the second cellular communication may be in an inactive state.

According to various embodiments of the disclosure, in operation 2820, the electronic device 101 may determine whether to enter a heat suppression mode.

According to various embodiments of the disclosure, the electronic device 101 may determine whether to enter the heat suppression mode on the basis of context information of the electronic device. The context information may include various pieces of information used to determine whether to enter the heat suppression mode, and corresponds to various pieces of information collected by the electronic device 101.

According to various embodiments of the disclosure, in operation 2830, the electronic device 101 having entered the heat suppression mode may receive a signal that makes a request for measuring a quality of the second cellular communication.

According to various embodiments of the disclosure, the signal from the first node that makes a request for measuring the quality of the second cellular communication may include a configuration for the measurement of the quality of communication with a second cellular base station (for example, the second node 420) supporting the second cellular communication for the connection with the second cellular base station (for example, a configuration (a configuration of event B1) including reference for the quality of the communication with the second cellular base station to be included in a report transmitted to the first node for the connection with the second cellular base station).

According to various embodiments of the disclosure, in operation 2840, the electronic device 101 may control the second communication processor not to measure the quality of the second cellular communication.

According to various embodiments of the disclosure, the electronic device 101 may not measure the quality of the second cellular communication and not transmit the measurement result to the first node. According to various embodiments, the second communication processor 2430 may measure the quality of the communication with the second cellular base station but not transmit the measurement result to the master node 410. Since the master node 410 has not received the measurement result, the connection of the second cellular communication with the electronic device 101 may not be made.

According to various embodiments of the disclosure, the second communication processor 2430 may switch the second cellular communication to the inactive state and reduce heat generated by the use of the second cellular communication. Through the various embodiments, the generation of heat may be suppressed. The second communication processor 2430 may switch to a sleep state as the second cellular communication switches to the inactive state. Alternatively, the second communication processor 2430 may switch to a power off state as the second cellular communication switches to the inactive state.

Figure 29:
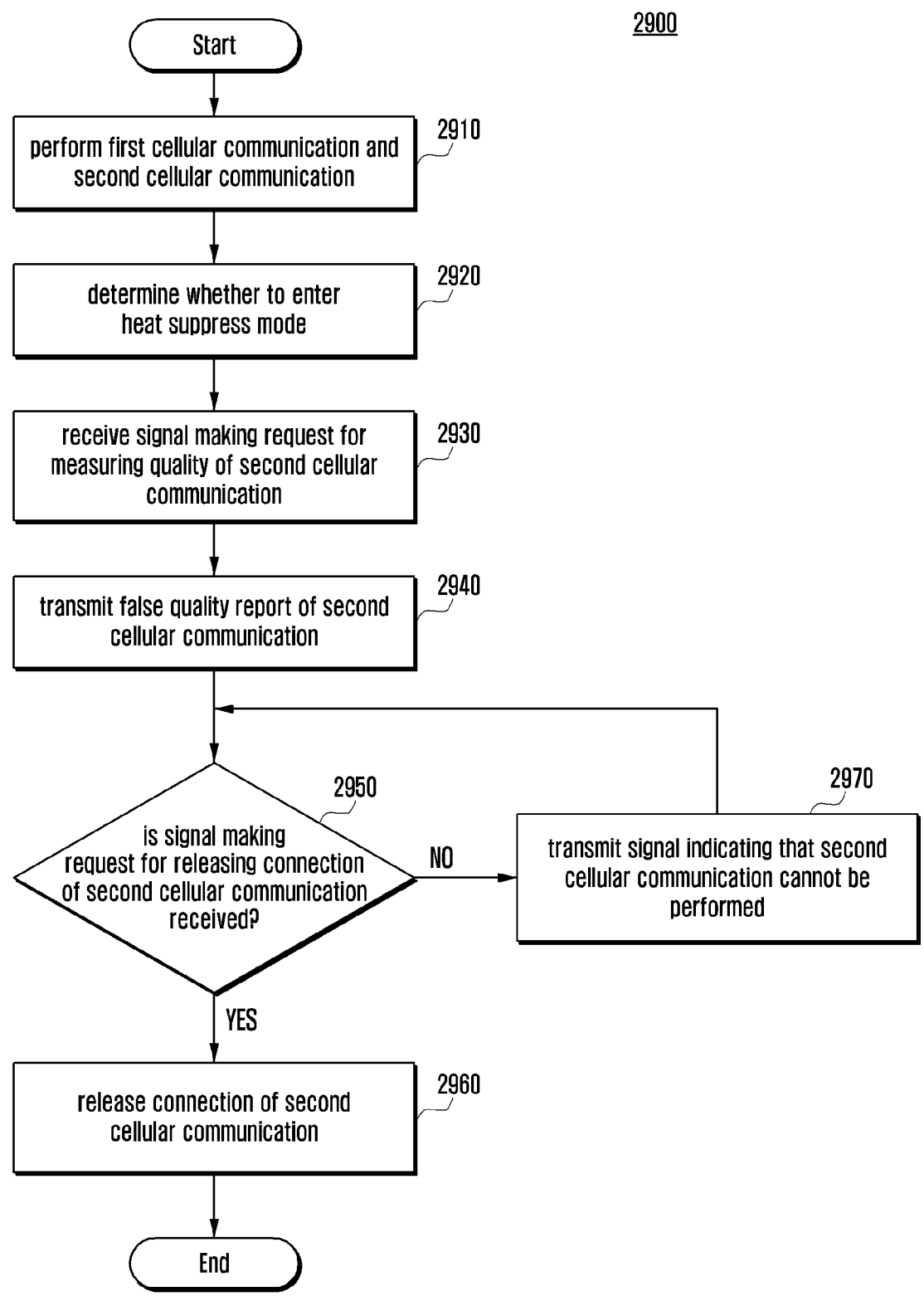
FIG. 29 is a flowchart illustrating a method of operating the electronic device according to various embodiments of the disclosure.

FIG. 29 is a flowchart illustrating a method 2900 of operating the electronic device according to various embodiments of the disclosure.

According to various embodiments of the disclosure, in operation 2910, the electronic device 101 may perform first cellular communication and second cellular communication.

According to various embodiments of the disclosure, the first cellular communication and the second cellular communication may be in an active state.

According to various embodiments of the disclosure, in operation 2920, the electronic device 101 may determine whether to enter a heat suppression mode.

According to various embodiments of the disclosure, the electronic device 101 may determine whether to enter the heat suppression mode on the basis of context information of the electronic device. The context information may include various pieces of information used to determine whether to enter the heat suppression mode and various pieces of information collected by the electronic device 101.

According to various embodiments of the disclosure, in operation 2930, the electronic device 101 having entered the heat suppression mode may receive a signal that makes a request for measuring a quality of the second cellular communication.

According to various embodiments of the disclosure, if a condition indicating that the quality of the second cellular communication reduces to be equal to or lower than a predetermined level is satisfied, the signal that makes a request, for measuring the quality of the second cellular communication may be a signal corresponding to an event (measurement of event A2) for transmitting data indicating that the condition is satisfied.

According to various embodiments of the disclosure, in operation 2940, the electronic device 101 may transmit a false quality report of the second cellular communication to the master node 410.

According to various embodiments of the disclosure, if the electronic device 101 having entered the heat suppression mode receives an event that makes a request for measuring the quality of the second cellular communication for the connection of the second cellular communication (for example, an event (measurement of event A2) for, if a condition indicating that, the quality of the second cellular communication reduces to be equal to or lower than a predetermined level is satisfied, transmitting data indicating that the condition is satisfied to the base station of the second cellular communication) from the second node 420 in the state in which the second cellular communication is activated, the quality of the second cellular communication may not be measured. The electronic device 101 may not transmit a false quality measurement report without measuring the quality of the second cellular communication.

According to various embodiments of the disclosure, the false quality measurement report may include information indicating that the quality of the second cellular communication does not satisfy the quality required for performing the second cellular communication regardless of the actual quality of the second cellular communication.

According to various embodiments of the disclosure, in operation 2950, the electronic device 101 may identify whether a signal that makes a request for releasing the connection of the second cellular communication is received from the master node 410 within a preset time.

According to various embodiments of the disclosure, the master node 410 may determine that the quality of the already connected second cellular communication is low and perform an operation related to the release of the connection of the second cellular communication. The master node 410 may determine to release the connection of the second cellular communication and transmit the signal that makes the request for releasing the connection of the second cellular communication to the electronic device 101.

According to various embodiments of the disclosure, in operation 2960, the electronic device 101 may release the connection of the second cellular communication in response to reception of the signal that makes the request for releasing the connection of the second cellular communication.

According to various embodiments of the disclosure, in operation 2970, the electronic device 101 may transmit a signal indicating that the second cellular communication cannot be performed to the master node 410 in response to non-reception of the signal that makes the request for releasing the connection of the second cellular communication. According to various embodiments, the signal indicating that the second cellular communication cannot be performed may include a secondary node failure signal (SCG failure). According to various embodiments, the operation of transmitting the signal indicating that the second cellular communication cannot be performed to the master node 410 may include an operation of transmitting an RRC connection reestablishment request signal (RRCReestablishmentRequest) to the first node.

According to various embodiments of the disclosure, the master node 410 may receive a false report on the quality of the second cellular communication but may not release the connection of the second cellular communication. As the signal indicating that the second cellular communication cannot be performed is transmitted to the master node 410, the electronic device 101 may make a request for releasing the connection of the second cellular communication.

Figure 30:
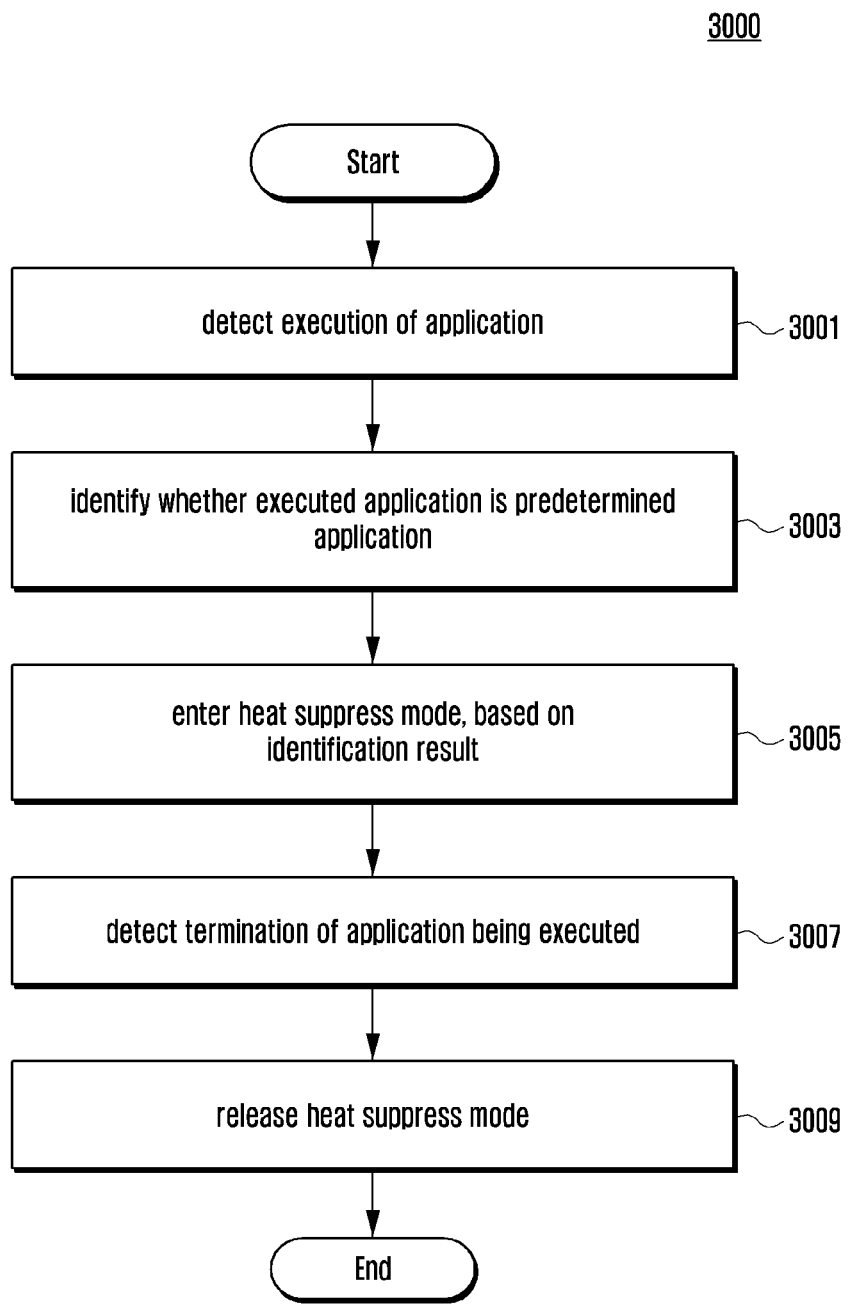
FIG. 30 is a flowchart illustrating a method of operating the electronic device according to various embodiments of the disclosure.

FIG. 30 is a flowchart illustrating a method 3000 of operating the electronic device according to various embodiments of the disclosure.

According to various embodiments of the disclosure, in operation 3001, the electronic device 101 may detect execution of an application.

According to various embodiments of the disclosure, in operation 3003, the electronic device 101 may identify whether the executed application is a predetermined application.

The predetermined application may be determined by an input of a designer or a user of the electronic device 101 and may be an application that cause the application processor 2410 to generate much heat. For example, the predetermined application may include an application (for example, a game application) that causes the application processor 2410 to generate much heat when executed. In another example, the predetermined application may be a voice service application (Volte) through the first cellular communication. The electronic device may be configured to enter the heat suppression mode while the voice service application is being executed.

According to various embodiments of the disclosure, in operation 3005, the electronic device 101 may enter the heat suppression mode on the basis of the identification result.

According to various embodiments of the disclosure, if the predetermined application is executed, the electronic device 101 may determine whether to enter the heat suppression mode.

According to various embodiments of the disclosure, the heat suppression mode is a mode for reducing heat generated by the electronic device 101 and may be the operation illustrated in FIG. 28.

According to various embodiments of the disclosure, in operation 3007, the electronic device 101 may detect termination of the application being executed.

According to various embodiments of the disclosure, in operation 3009, the electronic device 101 may release the heat suppression mode in response to detection of the termination of the application being executed.

A method of operating an electronic device according to various embodiments of the disclosure may include: an operation of performing first cellular communication with a first node by a first communication processor; an operation of determining whether to enter a heat suppression mode on the basis of context information, by an application processor; an operation of receiving a signal indicating whether to enter the heat suppression mode, transmitted by the application processor, by a second communication processor performing second cellular communication with a second node; an operation of receiving a signal making a request for measuring a quality of the second cellular communication for a connection of the second cellular communication from the first node or the second node by the second communication processor; and an operation of controlling the second communication processor to not measure the quality of the second cellular communication in a state in which entry into the heat suppression mode is performed, by the application processor.

The method of operating the electronic device according to various embodiments of the disclosure may further include an operation of generating a signal indicating whether to enter the heat suppression mode in response to the determination of entry into the heat suppression mode by the application processor; and an operation of transmitting the generated signal to the second communication processor by the application processor.

In the method of operating the electronic device according to various embodiments of the disclosure, the operation of determining whether to enter the heat suppression mode may include an operation of determining whether to enter the heat suppression mode on the basis of information related to temperature collected by a temperature measurement sensor included in the electronic device.

In the method of operating the electronic device according to various embodiments of the disclosure, the operation of determining whether to enter the heat suppression mode may include an operation of determining whether to enter the heat suppression mode on the basis of attributes of an application being executed.

The method of operating the electronic device according to various embodiments of the disclosure may further include an operation of, if entry into the heat suppression mode is performed while the second cellular communication is performed, transmitting, to the first communication processor, a signal making a request for transmitting a signal for inducing the second node to release the connection of the second cellular communication to the first node by the second communication processor.

In the method of operating the electronic device according to various embodiments of the disclosure, the signal for inducing the second node to release the connection of the second cellular communication may be a signal transmitted by the first communication process to make a request for transmitting a false measurement result of the second cellular communication to the first node.

In the method of operating the electronic device according to various embodiments of the disclosure, the false measurement result of a parameter may include a value corresponding to a quality lower than the measured quality of the second cellular communication.

The method of operating the electronic device according to various embodiments of the disclosure may further include an operation of transmitting, to the first communication processor, a signal making a request for transmitting, to the first node, information indicating failure of the second cellular communication to the first communication processor by the second communication processor in response to the identification that the connection of the second cellular communication is not released within a preset time after the false measurement result of a parameter is transmitted to the first node.

The method of operating the electronic device according to various embodiments of the disclosure may further include an operation of the first cellular communication through the first communication processor after switching to the heat suppression mode.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Various embodiments of the present disclosure provide an electronic device including a communication processor and an application processor. The communication processor includes a first communication circuitry configured to support a first cellular communication, a second communication circuitry configured to support a second cellular communication, and a temperature sensor configured to sense a temperature of at least one of the first communication circuitry or the second communication circuitry. The application processor is configured to receive, by the application processor, information related to the temperature sensed by the temperature sensor and information related to data transmission via the second communication circuitry, and determine, by the application processor, whether to request the communication processor to change from a first mode to a second mode based on the information related to the sensed temperature and the information related to data transmission via the second communication circuitry. The communication processor is configured to receive, by the communication processor, a signal indicating to change from the first mode to the second mode from the application processor, wherein, while the communication processor is in the first mode, the second communication circuitry is in a radio resource control (RRC) connected state capable of performing data transmission through the first cellular communication and the second cellular communication, in response to changing to the second mode, perform, by the second communication circuitry, at least one operation for releasing RRC connection between the electronic device and a base station supporting the second cellular communication, and control, by the communication processor, the second communication circuitry to enter a sleep state after the RRC connection is released.

In some embodiments, the first cellular communication corresponds to long term evolution (LTE) communication and the second cellular communication corresponds to 5G communication, when the communication processor is in the first mode, both the first communication circuitry and the second communication circuitry are in an active state, and when the communication processor is in the second mode, the first communication circuitry is in the active state and the second communication circuitry is in the sleep state.

In some embodiments, the application processor is configured to determine to change the communication processor from the first mode to the second mode based on a first condition corresponding to a temperature value of the communication processor indicated by the information related to the sensed temperature, a second condition corresponding to data throughput indicated by the information related to data transmission of the second communication circuitry, and a third condition corresponding to information related to a remaining battery power.

In some embodiments, the application processor is configured to change the communication processor from the first mode to the second mode based on at least one of a first condition being satisfied where a temperature value of the communication processor, as indicated by the information related to the sensed temperature, is greater than a first threshold value, or a second condition being satisfied where data throughput, as indicated by the information related to data transmission of the second communication circuitry, is less than a second threshold value.

In some embodiments, the communication processor is further configured to, in response to determining that the second condition is satisfied, perform the at least one operation for releasing RRC connection between the electronic device and a base station supporting the second cellular communication after completion of data transmission.

In some embodiments, the application processor is further configured to determine not to enter the second mode when a display of the electronic device is an active state.

In some embodiments, the at least one operation for releasing RRC connection between the electronic device and the base station comprises an operation of transmitting an A2 measurement event report to the base station through a network when a strength of signal transmitted from the base station is lower than a specified value.

In some embodiments, the at least one operation for releasing RRC connection between the electronic device and the base station comprises an operation of transmitting a measurement report that a measurement result related to a status of a channel connected through a network is set below a threshold value.

In various embodiments, an electronic device includes a communication processor and an application processor. The communication processor includes a first communication circuitry configured to support a first cellular communication, a second communication circuitry configured to support a second cellular communication, and a temperature sensor configured to sense a temperature of at least one of the first communication circuitry or the second communication circuitry. The application processor is configured to receive, by the application processor, information related to the temperature sensed by the temperature sensor and determine, by the application processor, whether to request the communication processor to change from a first mode to a second mode based at least on the information related to the sensed temperature. The communication processor is configured to receive, by the communication processor, a signal indicating to change from the first mode to the second mode from the application processor, wherein, while the communication processor is in the first mode, the second communication circuitry is in a radio resource control (RRC) connected state capable of performing data transmission through the first cellular communication and the second cellular communication, in response to changing to the second mode, perform, by the second communication circuitry, at least one operation for releasing RRC connection between the electronic device and a base station supporting the second cellular communication, and control, by the communication processor, the second communication circuitry to enter a sleep state after the RRC connection is released.

In various embodiments, an electronic device includes a communication processor and an application processor. The communication processor includes a first communication circuitry configured to support a first cellular communication, a second communication circuitry configured to support a second cellular communication, and a temperature sensor configured to sense a temperature of at least one of the first communication circuitry or the second communication circuitry. The application processor is configured to receive, by the application processor, information related to the temperature sensed by the temperature sensor and information related to data transmission via the second communication circuitry and determine, by the application processor, whether to request the communication processor to change from a first mode to a second mode based on the information related to the sensed temperature and the information related to data transmission via the second communication circuitry. The communication processor is configured to receive, by the communication processor, a signal indicating to change from the first mode to the second mode from the application processor, wherein, while the communication processor is in the first mode, the second communication circuitry is in a radio resource control (RRC) release state not being capable of performing data transmission through the first cellular communication and the second cellular communication, in response to changing to the second mode, ignore, by the second communication circuitry, a signal indicating at least one measurement associated with the second cellular communication, and control, by the communication processor, the second communication circuitry to enter a sleep state or maintain the sleep state.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a display;
a temperature sensor configured to sense a temperature of at least part of the electronic device; and
a communication processor including:
a first communication circuitry configured to support long term evolution (LTE) communication network, and
a second communication circuitry configured to support new radio (NR) communication network,
an application processor configured to:
obtain information related to the temperature sensed by the temperature sensor and information related to data throughput by the electronic device, and
determine, by the application processor, whether to request the communication processor to change from a first mode to a second mode based on at least one of:
a first condition being satisfied in which a temperature value, as indicated by the information related to the sensed temperature, is greater than a first reference temperature, or
a second condition being satisfied in which the data throughput indicated by the information related to data throughput is less than a first threshold value while the display is in an inactive state,
wherein the communication processor is configured to:
receive a signal indicating to change from the first mode to the second mode from the application processor, wherein, while the communication processor is in the first mode, the first communication circuitry and the second communication circuitry are respectively connected to the LTE communication network and the NR communication network,
in response to receiving the signal indicating to change from the first mode to the second mode, perform at least one operation for releasing the connection of the NR communication network, and
control, by the communication processor in the second mode, the second communication circuitry to maintain the release of the connection with the NR communication network by not transmitting, to the LTE communication network, a measurement report related to the NR communication network, and
change, after the release of the connection with the NR communication network, from the second mode to the first mode when the application processor determines that the second condition is not satisfied and a third condition in which the temperature value is lower than a second reference temperature is satisfied.

2. The electronic device of claim 1, wherein:
when the communication processor is in the first mode, both the first communication circuitry and the second communication circuitry are in an active state, and
when the communication processor is in the second mode, the first communication circuitry is in the active state and the second communication circuitry is in a sleep state.

3. The electronic device of claim 1, wherein the application processor is further configured to determine to change the communication processor from the first mode to the second mode based on:
a fourth condition corresponding to information related to a remaining battery power.

4. The electronic device of claim 1, wherein the communication processor is configured to, in the second mode, in response to receiving from a first base station an indication of the measurement report related to a second base station, ignore the indication and not transmit the measurement report to the LTE communication network.

5. The electronic device of claim 1, wherein the communication processor is further configured to:
in response to determining that the first condition or the second condition is satisfied, perform the at least one operation for releasing the connection of the NR communication network after completion of data transmission.

6. The electronic device of claim 1, wherein the application processor is further configured to:
determine not to enter the second mode when the display is in an active state.

7. The electronic device of claim 1, wherein the at least one operation for releasing the connection of the NR communication network includes transmitting a secondary cell group failure signal to the LTE communication network.

8. The electronic device of claim 1, wherein the first reference temperature is a throttling reference temperature at which the electronic device is switched from the first mode to the second mode, and
wherein the second reference temperature is a mitigation reference temperature at which the electronic device is switched from the second mode to the first mode.

9. A method of operating an electronic device comprising an application processor, a communication processor, a first communication circuitry, a second communication circuitry, a temperature sensor and a display, the method comprising:
obtaining, by the application processor, information related to a temperature sensed by the temperature sensor and information related to data throughput by the electronic device;
determining, by the application processor, whether to request the communication processor to change from a first mode to a second mode based on at least one of:

a first condition being satisfied in which a temperature value, as indicated by the information related to the sensed temperature, is greater than a first reference temperature, or a second condition being satisfied in which the data throughput indicated by the information related to data throughput is less than a first threshold value while the display is in an inactive state;

receiving, by the communication processor, a signal indicating to change from the first mode to the second mode from the application processor, wherein, while the communication processor is in the first mode, the first communication circuitry and the second communication circuitry are respectively connected to an LTE communication network and an NR communication network;

in response to receiving the signal indicating to change from the first mode to the second mode, performing, by the communication processor, at least one operation for releasing the connection of the NR communication network;

controlling, by the communication processor in the second mode, the second communication circuitry to maintain the release of the connection with the NR communication network by not transmitting, to the LTE communication network, a measurement report related to the NR communication network; and changing, by the communication processor, from the second mode to the first mode when the application processor determines that the second condition is not satisfied and a third condition in which the temperature value is lower than a second reference temperature is satisfied, after the release of the connection with the NR communication network.

10. The method of claim 9, wherein:

when the communication processor is in the first mode, both the first communication circuitry and the second communication circuitry are in an active state, and when the communication processor is in the second mode, the first communication circuitry is in the active state and the second communication circuitry is in a sleep state.

11. The method of claim 9, further comprising:

determining, by the application processor, to change the communication processor from the first mode to the second mode based on:

a fourth condition corresponding to information related to a remaining battery power.

12. The method of claim 9, further comprising:

in response to receiving from a first base station an indication of the measurement report related to a second base station in the second mode, ignoring, by the communication processor, the indication and not transmit the measurement report to the LTE communication network.

13. The method of claim 9, further comprising:

in response to determining that the first condition or the second condition is satisfied, performing, by the communication processor, the at least one operation for releasing the connection of the NR communication network after completion of data transmission.

14. The method of claim 9, further comprising:

determining, by the application processor, not to enter the second mode when the display is in an active state.

15. The method of claim 9, wherein the at least one operation for releasing the connection of the NR communication network includes transmitting a secondary cell group failure signal to the LTE communication network.

16. The method of claim 9, wherein the first reference temperature is a throttling reference temperature at which the electronic device is switched from the first mode to the second mode, and wherein the second reference temperature is a mitigation reference temperature at which the electronic device is switched from the second mode to the first mode.

17. An electronic device comprising:

a communication processor including:

a first communication circuitry configured to support a long term evolution (LTE) communication, a second communication circuitry configured to support a new radio (NR) communication, and a temperature sensor configured to sense a temperature of at least part of the electronic device; and an application processor configured to:

receive, by the application processor, information related to the temperature sensed by the temperature sensor or data throughput indicated by information related to data transmission via the second communication circuitry, and determine, by the application processor, whether to request the communication processor to change from a first mode to a second mode based on an identification that the data throughput is less than a first threshold value or the information related to the sensed temperature, wherein the communication processor is configured to:

receive, by the communication processor, a signal indicating to change from the first mode to the second mode from the application processor while the communication processor is in the first mode, wherein the electronic device in the first mode is in a radio resource control (RRC) connected state being capable of performing data transmission through the LTE communication and the NR communication, in response to receiving the signal indicating to change from the first mode to the second mode, ignore, by the second communication circuitry, a signal indicating at least one measurement associated with the NR communication, and control, by the communication processor, the second communication circuitry to enter a sleep state or maintain the sleep state.

18. The electronic device of claim 17, wherein:

when the communication processor is in the first mode, both the first communication circuitry and the second communication circuitry are in an active state, and when the communication processor is in the second mode, the first communication circuitry is in the active state and the second communication circuitry is in the sleep state.

19. The electronic device of claim 17, wherein the application processor is configured to change the communication processor from the first mode to the second mode based on a third condition being satisfied where a remaining battery power is equal to or smaller than a preset value.

20. The electronic device of claim 17, wherein the application processor is further configured to:

determine not to request the communication processor to change from the first mode to the second mode when a display of the electronic device is an active state.

* * * * *